United States Patent
Shimomura

(10) Patent No.: US 9,716,829 B2
(45) Date of Patent: Jul. 25, 2017

(54) ZOOM LENSES AND IMAGE PICKUP APPARATUS INCLUDING THE ZOOM LENSES

(71) Applicant: CANON KABUSHIKI KAISHA, Tokyo (JP)

(72) Inventor: Kazuya Shimomura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 14/959,151

(22) Filed: Dec. 4, 2015

(65) Prior Publication Data

US 2016/0161725 A1 Jun. 9, 2016

(30) Foreign Application Priority Data

Dec. 9, 2014 (JP) ................................ 2014-248569

(51) Int. Cl.
| | | |
|---|---|---|
| G02B 15/00 | (2006.01) | |
| H04N 5/232 | (2006.01) | |
| G02B 15/16 | (2006.01) | |
| G02B 27/64 | (2006.01) | |

(52) U.S. Cl.
CPC ....... *H04N 5/23238* (2013.01); *G02B 15/161* (2013.01); *G02B 27/646* (2013.01)

(58) Field of Classification Search
CPC ........ G02B 13/00–13/0095; G02B 9/00–9/64; G02B 15/00–15/28; H04N 5/232–5/238
USPC ................. 359/676–677, 680–684, 691, 695
See application file for complete search history.

(56) References Cited

U.S. PATENT DOCUMENTS

| 3,912,373 A | 10/1975 | Macher |
| 9,264,638 B2 | 2/2016 | Nakamura et al. |
| 9,268,120 B2 | 2/2016 | Shimomura et al. |
| 9,310,592 B2 | 4/2016 | Wakazono et al. |
| 9,329,372 B2 | 5/2016 | Shimomura |
| 2010/0033836 A1* | 2/2010 | Ohtake ................ G02B 15/173 359/683 |
| 2011/0279898 A1* | 11/2011 | Takemoto ............ G02B 15/173 359/557 |
| 2014/0204252 A1 | 7/2014 | Yoshimi et al. |

(Continued)

FOREIGN PATENT DOCUMENTS

JP H03161729 A 7/1991

*Primary Examiner* — Bumsuk Won
*Assistant Examiner* — Jeffrey Madonna
(74) *Attorney, Agent, or Firm* — Carter, DeLuca, Farrell & Schmidt, LLP

(57) ABSTRACT

A zoom lens include, from an object side, a first magnification-varying group, an aperture stop and a second magnification-varying group, the first magnification-varying group including: a positive first lens unit configured not to move for zooming; a negative second lens unit configured to move during zooming; and one or more magnification-varying lens units configured to move during zooming, the magnification-varying lens units having a positive combined refractive power, the second magnification-varying group including: a negative first sub lens unit configured not to move for zooming; a negative second sub lens unit configured to move during zooming; and a positive third sub lens unit, the second magnification-varying group moving the second sub lens unit to the image side to displace a focal length range of the entire system toward a long focal length side.

9 Claims, 28 Drawing Sheets

(56) References Cited

U.S. PATENT DOCUMENTS

| | | | |
|---|---|---|---|
| 2015/0131165 A1 | 5/2015 | Nakamura et al. | |
| 2015/0168697 A1* | 6/2015 | Ogata | G02B 15/173 359/684 |
| 2015/0338622 A1* | 11/2015 | Kuzuhara | G02B 15/173 348/240.3 |
| 2016/0116721 A1* | 4/2016 | Ogata | G02B 27/64 359/684 |
| 2016/0209630 A1* | 7/2016 | Kawamura | H04N 5/2254 |

* cited by examiner

ZOOM LENSES AND IMAGE PICKUP APPARATUS INCLUDING THE ZOOM LENSES

BACKGROUND OF THE INVENTION

Field of the Invention

The present invention relates to zoom lenses and an image pickup apparatus including the zoom lenses, and particularly, is suitable for a broadcasting TV camera, a cinema camera, a video camera, a digital still camera and a silver-halide film camera.

Description of the Related Art

In recent years, zoom lenses with a high zoom ratio and high optical performance are demanded for an image pickup apparatus, such as a TV camera, a cinema camera, a film camera and a video camera. Particularly, to handle various photographic scenes, a wide focal length range is desired for zoom lenses attached to a TV camera or a cinema camera as a professional video imaging system.

An example of a method of increasing the zoom ratio includes a method of displacing the focal length range of the zoom lenses. To realize this, proposed systems further include magnification-varying groups in a relay unit of the zoom lenses.

For example, Japanese Patent Application Laid-Open No. S49-66354 discloses zoom lenses including, from an object side to an image side, a positive first lens unit, a negative second lens unit, a negative third lens unit, a positive fourth lens unit, a negative fifth lens unit, a negative sixth lens unit and a positive seventh lens unit. The second lens unit and the third lens unit both serving as a first magnification-varying group move. The fifth lens unit and the sixth lens unit both serving as a second magnification-varying group move. Japanese Patent Application Laid-Open No. H03-161729 discloses zoom lenses including, from the object side to the image side, a focusing lens unit, a zooming lens unit and a relay lens unit, wherein the relay lens unit includes, from the object side to the image side, three lens units having a positive refractive power, a negative refractive power and a positive refractive power. The zooming lens unit moves in a first magnification-varying group. In a second magnification-varying group, the lens unit having a negative refractive power in the relay lens unit moves on an optical axis, between two positions that are the same image plane position.

Positive-lead type zoom lenses are known as zoom lenses with a high aperture ratio and high zoom ratio, the zoom lenses including, from the object side to the image side, a first lens unit having a positive refractive power, a second lens unit having a negative refractive power for varying magnification, a third lens unit having a positive refractive power for varying magnification, and a fourth lens unit having a positive refractive power. A convergent ray enters the fourth lens unit in the zoom lenses.

A case in which the fourth lens unit further includes magnification-varying groups to displace the focal length range of the zoom lenses will be described.

In Japanese Patent Application Laid-Open No. S49-66354 and Japanese Patent Application Laid-Open No. H03-161729, a lens unit (first sub lens unit) on the image side next to the lens unit that moves when the first magnification-varying group changes the magnification has a positive refractive power. When the first sub lens unit having a positive refractive power is provided to the fourth lens unit of the positive-lead type zoom lenses as in Japanese Patent Application Laid-Open No. S49-66354 and Japanese Patent Application Laid-Open No. H03-161729, the degree of convergence of a ray incident on a lens unit (second sub lens unit) that moves when the second magnification-varying group changes the magnification is high. As a result, the refractive power of the second sub lens unit needs to be strong to displace the focal length range of the zoom lenses toward the long focal length side based on the movement of the second sub lens unit, and it is difficult to realize high optical performance. The negative refractive power of the second sub lens unit is strong, and the lens diameter of the lens unit on the image side of the second sub lens unit increases.

SUMMARY OF THE INVENTION

An object of the present invention is to provide small zoom lenses with high optical performance having a function of moving part of lens units of the zoom lenses to displace a focal length range of the zoom lenses toward a long focal length side and to provide an image pickup apparatus including the zoom lenses. Another object of the present invention is to provide zoom lenses having a function of displacing the focal length range of the zoom lenses toward the long focal length side by about 1.5 to 3 times.

To attain the objects, the present invention provides a zoom lens and an image pickup apparatus including the zoom lens, the zoom lens including, from an object side to an image side, a first magnification-varying group, an aperture stop and a second magnification-varying group, the first magnification-varying group including, from the object side to the image side: a first lens unit having a positive refractive power configured not to move for zooming; a second lens unit having a negative refractive power configured to move during zooming; and one or more magnification-varying lens units configured to move during zooming, the magnification-varying lens units having a positive combined refractive power, the second magnification-varying group including, from the object side to the image side: a first sub lens unit having a negative refractive power configured not to move for zooming; a second sub lens unit having a negative refractive power configured to move during zooming; and a third sub lens unit having a positive refractive power, the second magnification-varying group moving the second sub lens unit from the object side to the image side to displace a focal length range of the zoom lenses toward a long focal length side.

Small zoom lenses with high optical performance and an image pickup apparatus including the zoom lenses can be obtained, the zoom lenses having a function of moving part of the lens units of the zoom lenses to displace the focal length range of the zoom lenses toward the long focal length side.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Features of zoom lenses according to the present invention will be described along with conditional expressions. The present invention defines a lens configuration for realizing small zoom lenses with high optical performance having a function of displacing a focal length range toward a long focal length side.

The zoom lenses of the present invention include, from an object side to an image side, a first magnification-varying group, an aperture stop and a second magnification-varying group. The first magnification-varying group includes: a first lens unit having a positive refractive power configured not to move for zooming; a second lens unit having a negative refractive power configured to move during zooming; and at least one or more magnification-varying lens units configured to move during zooming, the magnification-varying lens units having a positive combined refractive power.

The second magnification-varying group includes: a first sub lens unit having a negative refractive power configured not to move for zooming; a second sub lens unit having a negative refractive power configured to move during zooming; and a third sub lens unit having a positive refractive power, wherein the second sub lens unit moves toward the image side to displace the focal length range of the entire system toward the long focal length side.

Figure 1:
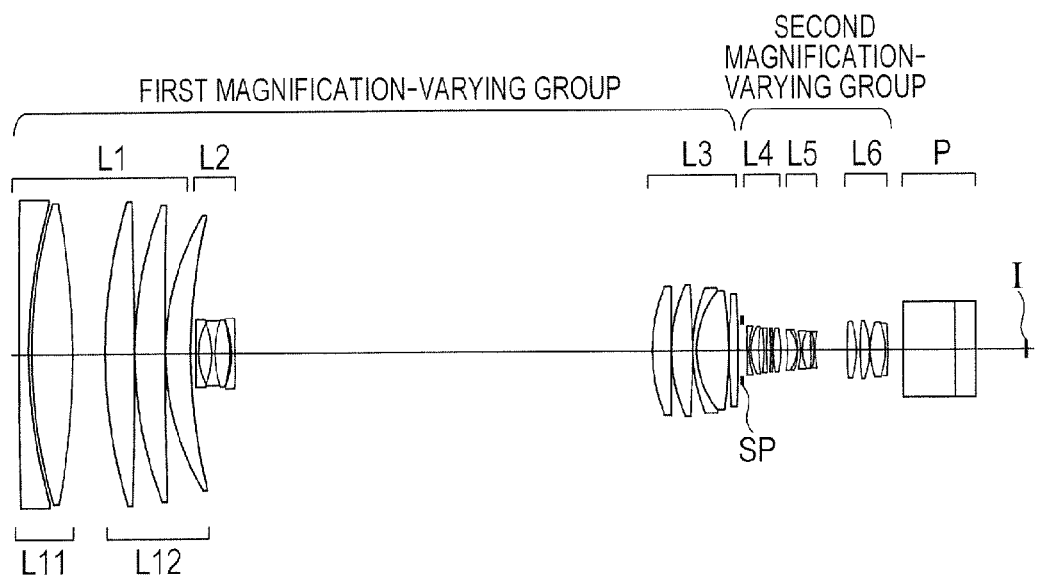
FIG. 1 is a cross-sectional view of lenses at a wide angle end with a focal length range in a reference state according to a first numerical embodiment.
Figure 48A:
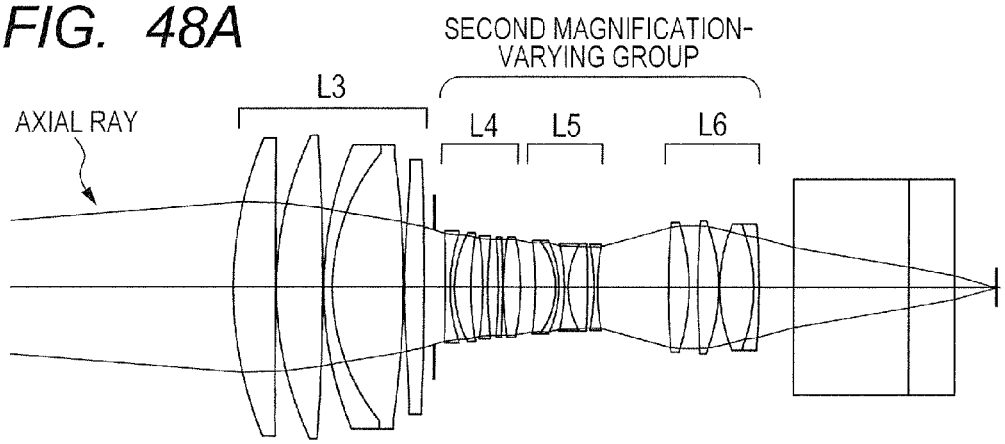
FIG. 48A is an optical path diagram of the wide angle end with the focal length range in the reference state according to the first numerical embodiment.
Figure 48B:
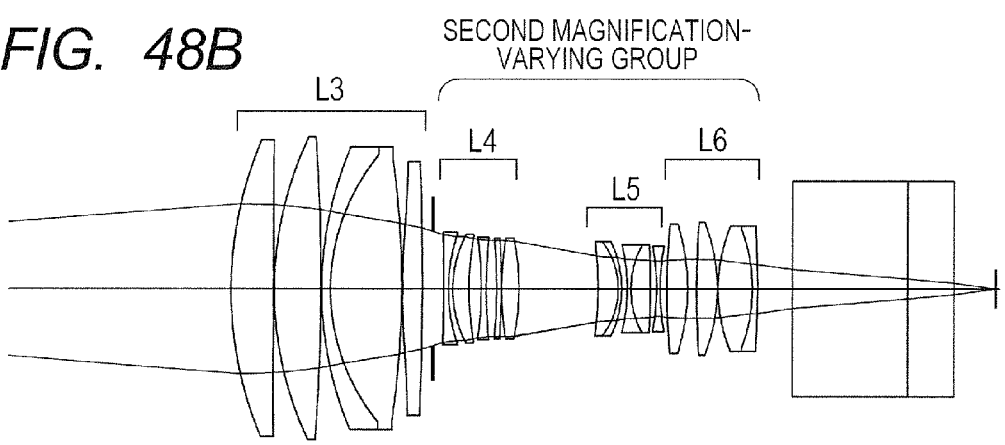
FIG. 48B is an optical path diagram of the wide angle end with the focal length range in the reference state according to the first numerical embodiment.

An optical configuration of the present invention with the lens configuration described above will be described with reference to FIGS. 1, 48A and 48B. FIG. 1 illustrates a cross-sectional view of the zoom lenses according to a first embodiment (first numerical embodiment) of the present invention. FIGS. 48A and 48B illustrate optical path diagrams, enlarging the vicinity of the second magnification-varying group. The first magnification-varying group includes, from the object side to the image side: a first lens unit (focus lens unit) L1 having a positive refractive power; and a second lens unit (variator) L2 for zooming having a negative refractive power configured to move from the object side to the image side during zooming from a wide angle end to a telephoto end. The first magnification-varying group further includes a third lens unit (compensator) L3 having a positive refractive power configured to move on an optical axis in conjunction with the movement of the second unit L2, the third lens unit L3 non-linearly moving when zooming from the wide angle end to the telephoto end, to correct an image plane variation associated with the zooming.

The second magnification-varying group includes, from the object side to the image side: a fourth lens unit L4 (first sub lens unit) having a negative refractive power; a fifth lens unit L5 (second sub lens unit) having a negative refractive power configured to move to displace the focal length range toward the long focal length side; and a sixth lens unit L6 (third sub lens unit) having a positive refractive power. The fourth lens unit L4 appropriately sets an image point position of the fourth lens unit L4 with respect to a converging ray incident on the fourth lens unit L4. If the image point position is not appropriate, it is difficult to attain both of suppression of the movement of the fifth lens unit L5 in the displacement of the focal length range of the zoom lenses toward the long focal length side and high optical performance. When the fifth lens unit L5 moves from the object side to the image side to approach an object point of the fifth lens unit L5 (image point of the fourth lens), the focal length range of the zoom lens is displaced toward the long focal length side. The sixth lens unit L6 has an effect of imaging a diverging ray emitted from the fifth lens unit L5 on an image pickup surface I. In this way, the lens configuration of the second magnification-varying group is appropriately set with respect to the lens configuration of the first magnification-varying group to displace the focal length range of the zoom lenses toward the long focal length side, and small zoom lenses with high optical performance are realized.

In another mode of the zoom lenses according to the present invention, the third sub lens unit is configured not to move when the second sub lens unit moves during zooming. A changed magnification m of the focal length range is defined as follows, $$m = fex/f \qquad (5)$$

where f is a focal length at the wide angle end with the focal length range of the zoom lenses in a reference state (state in which the focal length range is closest to the short focal length side, hereinafter, the state will be written in the same way) (FIG. 48A), and fex is a focal length at the wide angle end in a state after displacement toward the long focal length side (FIG. 48B).

A lateral magnification of the second sub lens unit when an axial ray enters from the infinity while focusing on the infinity with the focal length range of the zoom lenses in the reference state will be referred to as βn2w, and a lateral magnification in the state after the displacement of the focal length range toward the long focal length will be referred to as βn2t. If the refractive power arrangement of the second magnification-varying group is set to satisfy the following expressions, an image can be formed on the same image pickup surface without moving the third sub lens unit when the second sub lens unit is moved between two positions along the optical axis. The focal length range of the zoom lenses can be displaced toward the long focal length side just by moving the second sub lens unit between two positions along the optical axis, and excellent operability and mechanistic structure are realized.

$$\beta n2w = -\frac{1}{\sqrt{m}} \quad (6)$$

$$\beta n2t = -\sqrt{m} \quad (7)$$

In another mode of the zoom lenses according to the present invention, the third sub lens unit or part of the third sub lens unit moves when the second sub lens unit moves during zooming. The movement of the third sub lens unit corrects the variation of the imaging plane caused by the movement of the second sub lens unit, and the image can be formed on the same image pickup surface regardless of the position of the second sub lens unit in the movable range. Although the magnification of the focal length range is changed in one step if the third sub lens unit does not move when the second sub lens unit moves during zooming, the focal length range of the zoom lenses can be steplessly displaced if the third sub lens unit or part of the third sub lens unit moves.

In another aspect of the zoom lenses according to the present invention, a lateral magnification of the first sub unit is defined. The following conditional expression is satisfied, $$1.0 < \beta n1 < 3.0 \quad (1)$$

where βn1 is the lateral magnification of the first sub lens unit when the axial ray enters from the infinity while focusing on the infinity.

The satisfaction of expression (1) realizes downsizing of the zoom lenses and high optical performance. If the condition of the upper limit of expression (1) is not satisfied, the degree of convergence of the emission ray from the first sub lens unit is low, and the object point of the second sub lens unit separates from the second sub lens unit. As a result, the amount of movement of the second sub lens unit in the displacement of the focal length range of the zoom lenses toward the long focal length side is large, and downsizing of the zoom lenses is difficult. If the condition of the lower limit of expression (1) is not satisfied, the degree of convergence of the ray from the first sub lens unit is high, and the refractive power of the second sub lens unit needs to be strong to displace the focal length range of the zoom lenses toward the long focal length side. As a result, not only the absolute amount of aberration increases, but also a large number of high-order aberrations are generated. It is difficult to correct the aberrations and to realize high optical performance. The expression (1) in the entire area can be satisfied if βn1 varies when the focal length range of the zoom lenses is displaced. However, at least when the focal length range of the zoom lenses is in the reference state or when the focal length range is on the long focal length side, conditional expression (1) may be satisfied.

Furthermore, expression (1) can be set as follows.

$$1.05 < \beta n1 < 2.50 \quad (1a)$$

In another mode of the zoom lenses according to the present invention, a ratio of the focal length of the second magnification-varying group and the focal length of the second sub lens unit is restricted as follows, $$-1.5 < fn2/fn < -0.3 \quad (2)$$

where fn is the focal length of the second magnification-varying group when the second sub lens unit is arranged closest to the object, and fn2 is the focal length of the second sub lens unit.

The satisfaction of expression (2) realizes downsizing of the zoom lenses and high optical performance. If the condition of the upper limit of expression (2) is not satisfied, the amount of movement of the second sub lens unit in the displacement of the focal length range of the zoom lenses toward the long focal length side increases, and downsizing of the zoom lenses is difficult. If the condition of the lower limit of expression (2) is not satisfied, the refractive power of the second sub lens unit is strong. As a result, not only the absolute amount of aberration increases, but also a large number of high-order aberrations are generated. It is difficult to correct the aberrations and to realize high optical performance.

Furthermore, expression (2) can be set as follows.

$$-1.20 < fn2/fn < -0.45 \quad (2a)$$

In another mode of the zoom lenses according to the present invention, refractive indices of optical material used for concave lenses included in the second sub lens unit are restricted as follows, $$1.75 < n2 \quad (3)$$

where n2 is an average value of the refractive indexes of the concave lenses included in the second sub lens unit.

The satisfaction of expression (3) realizes high optical performance. If the condition of the lower limit of expression (3) is not satisfied, the refractive indexes of the concave lenses included in the second sub lens unit are low with respect to the second sub lenses having a relatively strong refractive power. Therefore, the curvature of each lens is strong, and a large number of high-order aberrations are generated. It is difficult to correct the aberrations. Furthermore, it is more preferable to restrict the numerical range of the expression (3) as follows.

$$1.80 < n2 < 2.10 \quad (3a)$$

In another mode of the zoom lenses according to the present invention, part of the third sub lens unit can move in an optical axis direction for macro image taking or flange back adjustment. The third sub lens unit includes an N31 sub lens unit that can move in the optical axis direction for macro image taking or flange back adjustment, and the following is satisfied, $$-0.30 < \beta n31 < 0.75 \quad (4)$$

where βn31 is a lateral magnification of the N31 sub lens unit when a ray enters from the infinity.

Expression (4) defines the lateral magnification of the N31 sub lens unit. The satisfaction of expression (4) attains position sensitivity for proper back focus in the macro image taking or flange back adjustment of the N31 sub lens unit and attains high optical performance. Here, skn31 is substantially expressed by the following expression, where skn31 is a back focus change amount per amount of movement of the N31 sub lens unit in the optical axis direction.

$$skn31 = 1 - \beta n2^2 \quad (8)$$

If the upper limit of expression (4) is not satisfied, the value of skn2 in expression (8) is small, and it is difficult for the N31 sub lens unit to have position sensitivity for proper back focus. As a result, the amount of movement of the N31 sub lens unit in the optical axis direction in the macro image taking or flange back adjustment is large, leading to an enlargement of the second magnification-varying group. If the lower limit of expression (4) is not satisfied, the ray incident on the N31 sub lens unit is divergent, and the lens diameter of the N31 sub lens unit increases. Therefore, the refractive power of the lenses included in the N31 sub lens unit is strong, and it is difficult to correct high-order aberrations. It is preferable to satisfy the expression (4) in the entire area if βn31 varies when the focal length range of the zoom lenses is displaced. However, at least when the focal length range of the zoom lenses is in the reference state or when the focal length range is on the long focal length side, conditional expression (4) may be satisfied.

Furthermore, it is more preferable to restrict the numerical range of the expression (4) as follows.

$$-0.20 < \beta n31 < 0.70 \quad (4a).$$

In another mode of the zoom lenses of the present invention, the first sub lens unit that is a lens unit closest to the object in the second magnification-varying group or part of the first sub lenses is set as a vibration lens unit. The first sub lens unit or the part of the first sub lens unit is configured to move with a component in a direction perpendicular to the optical axis to correct a blur of a photographic image when the entire zoom lenses are vibrated.

The first sub lens unit, which is a lens unit closer to the object than the second sub lens unit that is a lens unit configured to move during zooming by the second magnification-varying group, or part of the first sub unit is set as an anti-vibration lens unit. It is not necessary to change the control of the anti-vibration lens unit before and after changing the focal length range of the zoom lenses between in the reference state and in a state in which the focal length range is displaced toward the long focal length side. The arrangement on the object side of the anti-vibration lens unit does not change before and after the displacement of the focal length range. Therefore, the eccentricity of the anti-vibration lens unit for obtaining a predetermined correction angle does not change, and the control of the anti-vibration lens unit does not have to be changed.

An image pickup apparatus of the present invention includes: the zoom lenses according to the embodiments; and a solid-state image pickup element with a predetermined effective image pickup range configured to receive an image formed by the zoom lenses.

Specific configurations of the zoom lenses of the present invention will be described based on features of lens configurations of first to seventh numerical embodiments equivalent to first to seventh embodiments.

First Embodiment

Figure 2:
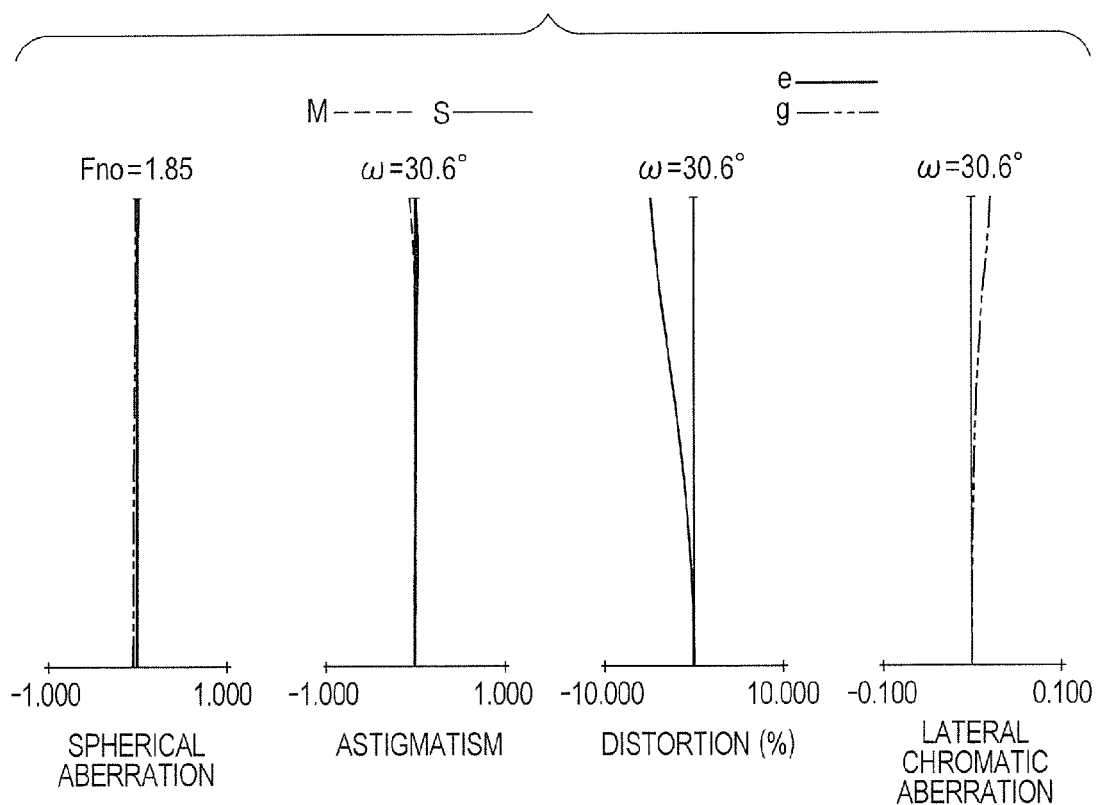
FIG. 2 is a longitudinal aberration diagram of the wide angle end with the focal length range in the reference state according to the first numerical embodiment.
Figure 3:
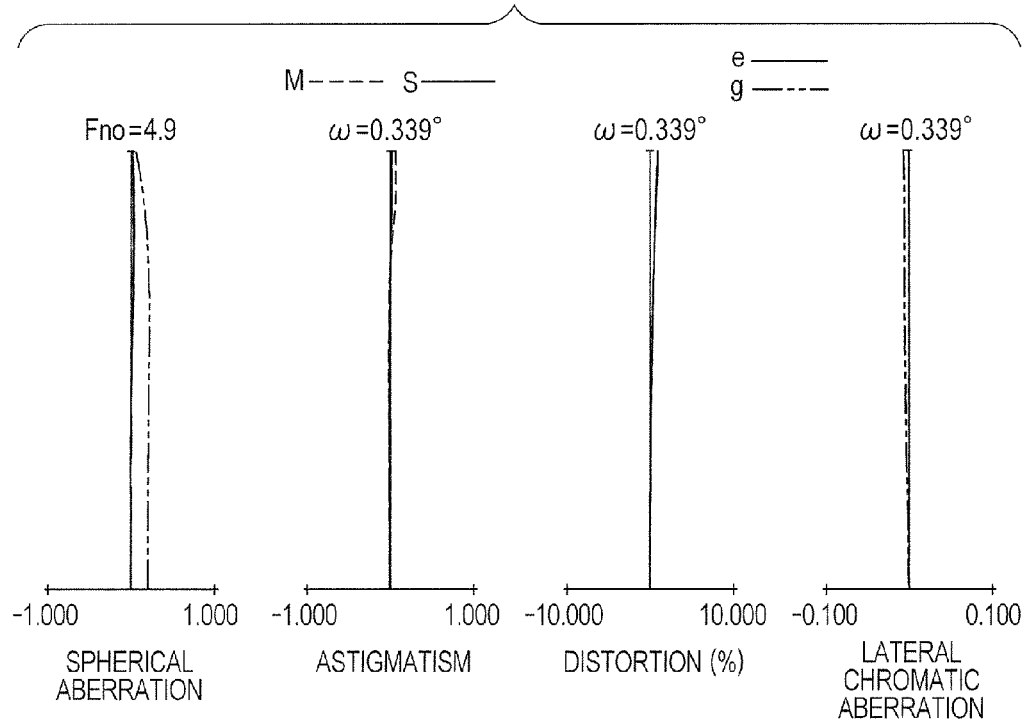
FIG. 3 is a longitudinal aberration diagram of a telephoto end with the focal length range in the reference state according to the first numerical embodiment.
Figure 4:
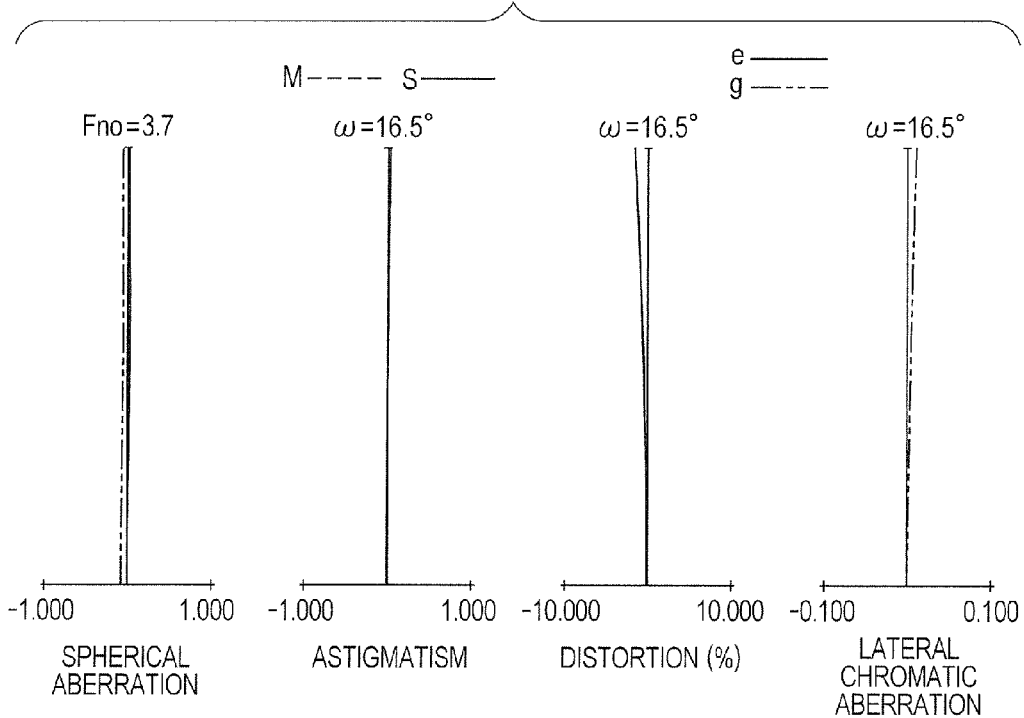
FIG. 4 is a longitudinal aberration diagram of the wide angle end in a state after displacement of the focal length range toward a long focal length side according to the first numerical embodiment.
Figure 5:
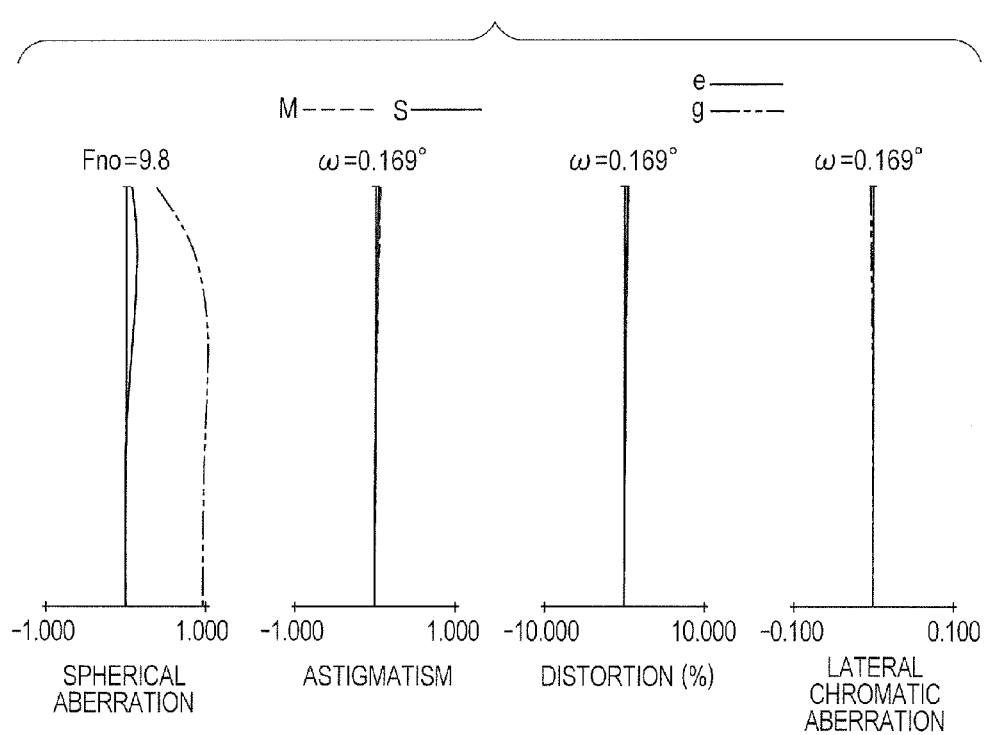
FIG. 5 is a longitudinal aberration diagram of the telephoto end in the state after the displacement of the focal length range toward the long focal length side according to the first numerical embodiment.

FIG. 1 is a cross-sectional view of lenses when focusing on infinity at the wide angle end in the zoom lenses according to the first embodiment (first numerical embodiment) of the present invention. FIGS. 2 and 3 are longitudinal aberration diagrams of the wide angle end and the telephoto end with the focal length range in the reference state according to the first numerical embodiment. FIGS. 4 and 5 are longitudinal aberration diagrams of the wide angle end and the telephoto end in a state after displacement of the focal length range toward the long focal length side according to the first numerical embodiment. The aberration diagrams are longitudinal aberration diagrams when focusing on an object at a distance of 13 m. Values of the focal length are values expressing the numerical embodiments described later in mm. The same applies to the following numerical embodiments.

In FIG. 1, the first magnification-varying group includes, from the object side to the image side: a first lens unit (focus lens unit) L1 having a positive refractive power; and a second lens unit (variator) L2 for zooming having a negative refractive power configured to move toward the image side during zooming from the wide angle end to the telephoto end. The first magnification-varying group further includes a third lens unit (compensator) L3 having a positive refractive power configured to move on the optical axis in conjunction with the movement of the second unit L2, the third lens unit L3 non-linearly moving with respect to zooming from the wide angle end to the telephoto end, to correct an image plane variation associated with zooming.

The second magnification-varying group includes, from the object side to the image side: a fourth lens unit L4 (first sub lens unit) having a negative refractive power; a fifth lens unit L5 (second sub lens unit) having a negative refractive power configured to move to displace the focal length range toward the long focal length side; and a sixth lens unit L6 (third sub lens unit) having a positive refractive power. The first magnification-varying group and the second magnification-varying group are magnification-varying groups independent of each other.

An aperture stop SP is arranged on the object side of the fourth lens unit L4. A glass block P is a color separation optical system or an optical filter. An image pickup surface I is equivalent to an image pickup surface of the solid-state image pickup element.

In the longitudinal aberration diagrams, the spherical aberration indicates an e-line (solid line) and a g-line (alternate long and two short dashes line). The astigmatism indicates a meridional image plane (meri) (dotted line) and a sagittal image plane (Sagi) (solid line) of the e-line. The lateral chromatic aberration is expressed by the g-line (alternate long and two short dashes line). Fno indicates an f-number, and a indicates a half angle of view. The lateral aberration expresses the meridional image plane (meri) (solid line) of the e-line, the sagittal image plane (Sagi) (dotted line) of the e-line, and the g-line (alternate long and two short dashes line).

In the longitudinal aberration diagrams, the spherical aberration is depicted by a scale of 1.0 mm, the astigmatism is depicted by a scale of 1.0 mm, the distortion is depicted by a scale of 10%, and the lateral chromatic aberration is depicted by a scale of 0.1 mm. The lateral aberration is depicted by a scale of 0.1 mm. In the following embodiments, the wide angle end and the telephoto end indicate zoom positions where the second lens unit L2 for zooming is positioned at both ends of a movable range on the optical axis with respect to the mechanism.

The first to sixth lens units L1 to L6 according to the present embodiment will be described. The first lens unit L1 corresponds to first to tenth surfaces. The first lens unit L1 includes, from the object side to the image side: a first sub lens unit L11 configured not to move for focusing; and a second sub lens unit L12 configured to perform focusing by moving toward the object side in focusing from an infinity object to a short-distance object. The second lens unit L2 corresponds to eleventh to seventeenth surfaces and comprises four lenses including convex lenses and concave lenses. The third lens unit L3 corresponds to eighteenth to twenty-sixth surfaces and comprises five lenses including convex lenses and concave lenses.

The fourth lens unit L4 corresponds to twenty-eighth to thirty-seventh surfaces. The fourth lens unit L4 includes, from the object side to the image side, a biconcave lens G1, a meniscus convex lens G2 having a concave surface facing object side, a biconcave lens G3, a meniscus concave lens G4 having a convex surface facing image side, and a biconvex lens G5. The fifth lens unit L5 corresponds to thirty-eighth to forty-fifth surfaces. The fifth lens unit L5 includes, from the object side to the image side: a cemented lens of a meniscus convex lens G6 having a concave surface facing object side and a meniscus concave lens G7 having a convex surface facing image side; a cemented lens of a biconcave lens G8 and a biconvex lens G9; and a biconcave lens G10. The sixth lens unit corresponds to forty-sixth to fifty-second surfaces. The sixth lens unit L6 includes, from the object side to the image side: a biconvex lens G11; a biconvex lens G12; and a cemented lens of a biconvex lens G13 and a meniscus concave lens G14 having a convex surface facing image side.

Figure 6A:
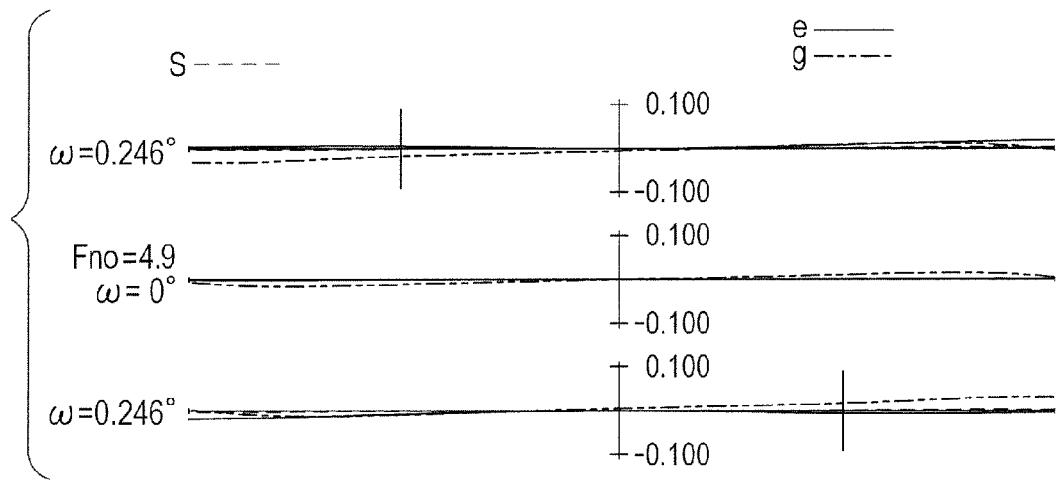
FIG. 6A is a lateral aberration diagram without anti-vibration at the telephoto end with the focal length range in the reference state according to the first numerical embodiment.
Figure 6B:
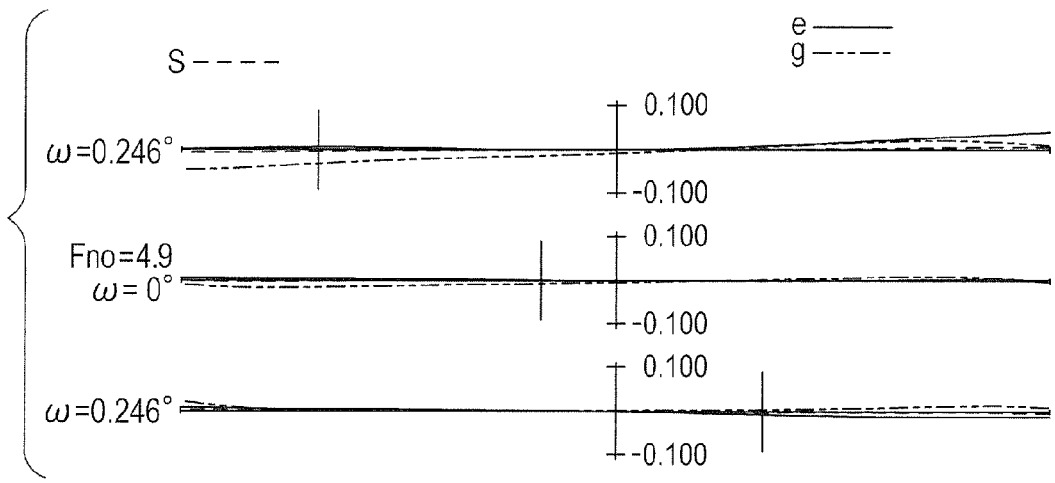
FIG. 6B is a lateral aberration diagram with anti-vibration at the telephoto end with the focal length range in the reference state according to the first numerical embodiment.

In the present numerical embodiment, the fifth lens unit L5 is moved between two positions along the optical axis to displace the focal length range of the zoom lenses toward the long focal length side by 2 times. G1 to G3 of the fourth lens unit L4 form an anti-vibration lens unit, and G1 to G3 are configured to move with components in the direction perpendicular to the optical axis to correct a blur of a photographic image when the entire zoom lenses are vibrated. FIG. 6A is a lateral aberration diagram without anti-vibration at the telephoto end with the focal length range in the reference state according to the present numerical embodiment. FIG. 68B is a lateral aberration diagram when the anti-vibration lens unit is decentered by 1.5 mm in the direction perpendicular to the optical axis, at the telephoto end with the focal length range in the reference state according to the present numerical embodiment. The aberration diagrams are lateral aberration diagrams when focusing on an object at a distance of 13 m. G12 to G14 of the sixth lens unit L6 can be moved in the optical axis direction to perform macro image taking or flange back adjustment.

Table 1 indicates values of the conditional expressions in case of the present embodiment. The present embodiment satisfies conditional expressions (1) to (4) and has a function of appropriately setting the refractive power arrangement of the second magnification-varying group and the configuration of the lens units to displace the focal length range of the zoom lenses toward the long focal length side. The present embodiment realizes small zoom lenses with high optical performance.

The effective diameter of the anti-vibration lens unit of the present invention is a value obtained by adding the eccentricity of the anti-vibration lens unit to the effective diameter without anti-vibration. In the present embodiment, the anti-vibration lens unit is decentered by 1.5 mm in the direction perpendicular to the optical axis, and the effective diameter of the anti-vibration lens unit of the present embodiment is set to a value obtained by adding 3.0 mm to the original effective diameter. The effective diameter of the anti-vibration lens unit is determined by the same manner in the second and subsequent numerical embodiments.

The first numerical embodiment corresponding to the first embodiment of the present invention is illustrated below. In the numerical embodiments, i is an order of surface from the object side to the image side, ri is a radius of curvature of an i-th surface from the object side, di is a space between the i-th surface and an i+l-th surface from the object side, and ndi and vdi are a refractive index and an Abbe number of an i-th optical member. BF is back focus in terms of air. The last three surfaces are glass blocks such as filters.

The aspherical shape is expressed by the following expression, wherein an X axis indicates the optical axis direction, an H axis indicates the perpendicular direction of the optical axis, the travelling direction of light is positive, R is a paraxial radius of curvature, k is a conic constant, and A4, A6, A8, A10, A12, A3, A5, A7, A9 and A11 are aspherical coefficients. Furthermore, "e-Z" denotes "×10$^{-z}$".

$$X = \frac{H^2/R}{1+\sqrt{1-(1+k)(H/R)^2}} + A4H^4 + A6H^6 + A8H^8 + A10H^{10} + A12H^{12} + A3H^3 + A5H^5 + A7H^7 + A9H^9 + A11H^{11}$$

Second Embodiment

Figure 7:
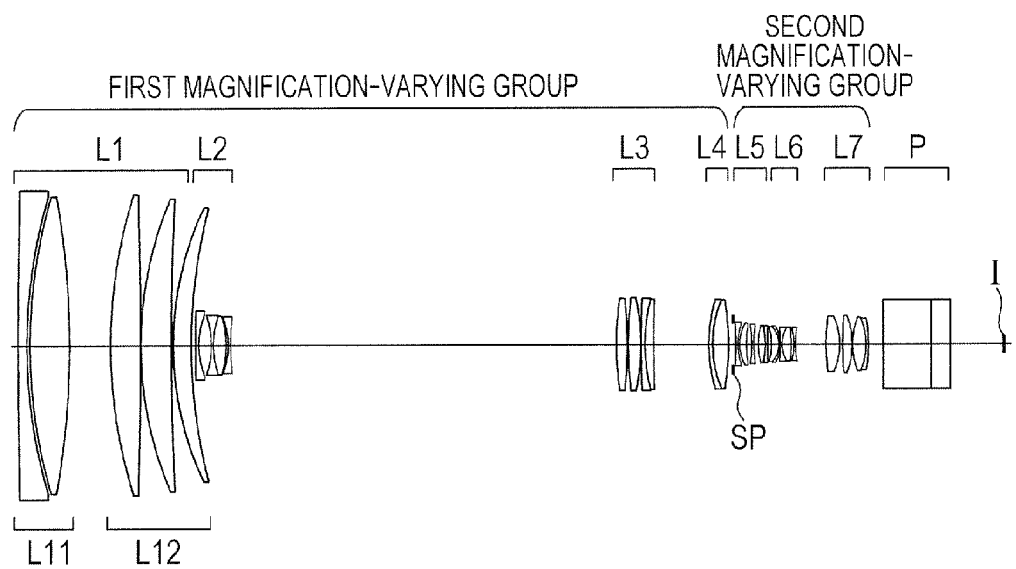
FIG. 7 is a cross-sectional view of lenses at the wide angle end with the focal length range in the reference state according to a second numerical embodiment.
Figure 8:
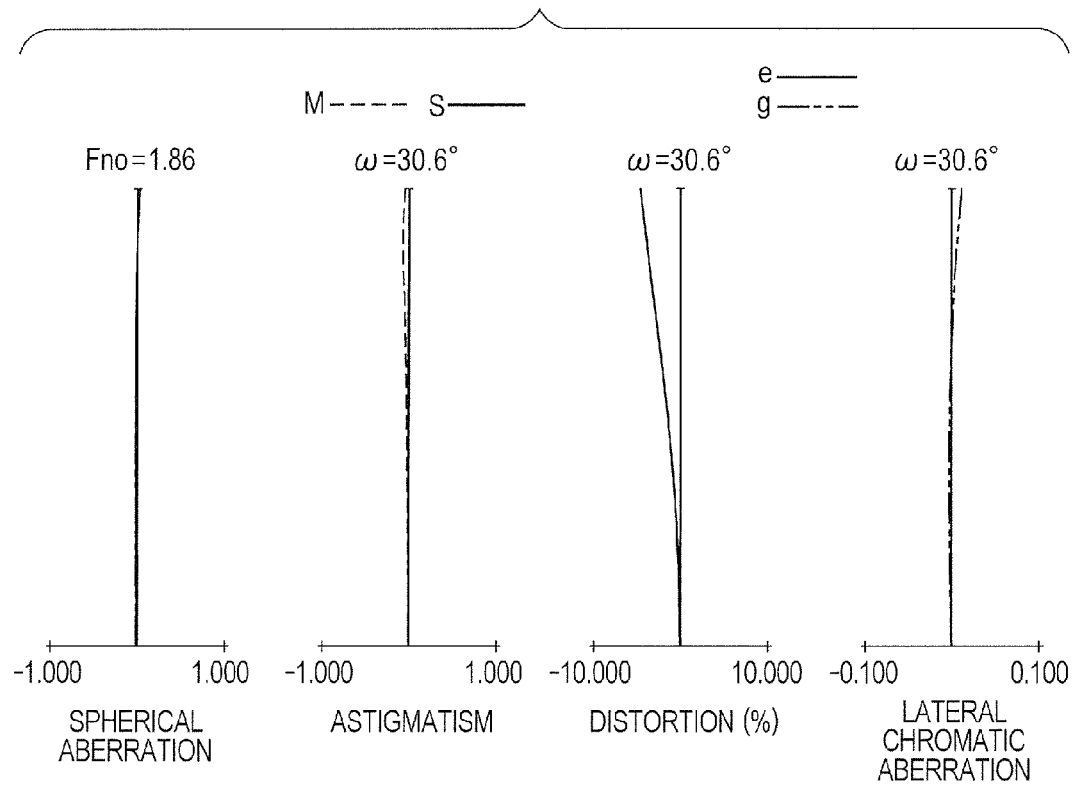
FIG. 8 is a longitudinal aberration diagram of the wide angle end with the focal length range in the reference state according to the second numerical embodiment.
Figure 9:
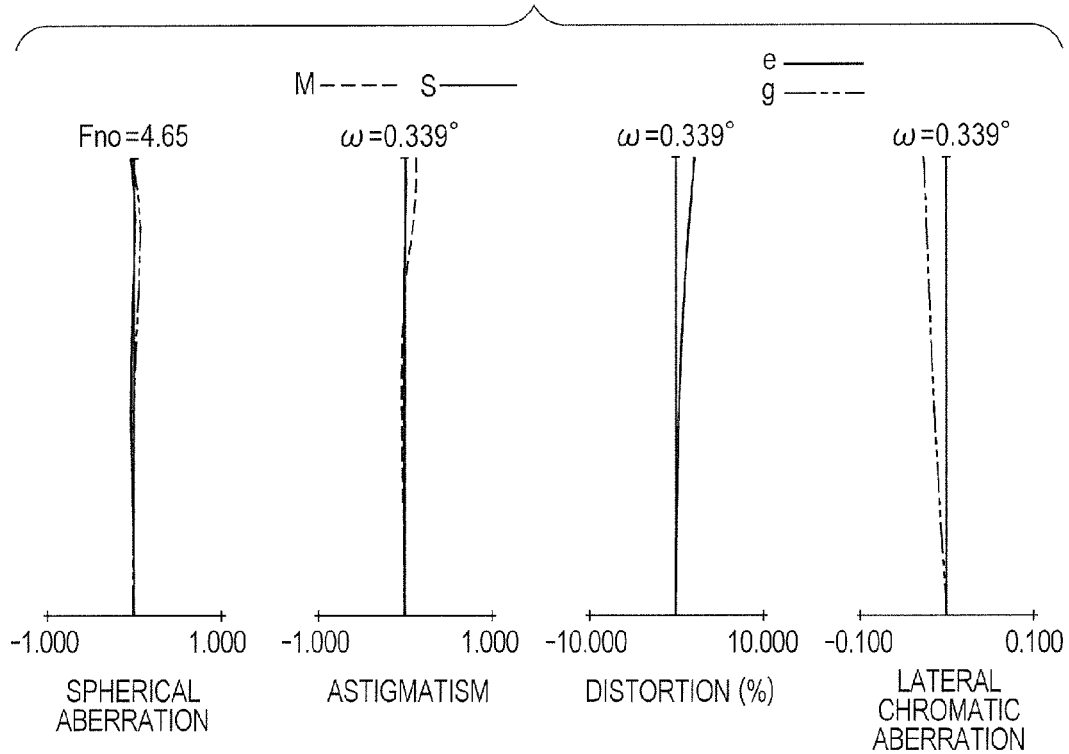
FIG. 9 is a longitudinal aberration diagram of the telephoto end with the focal length range in the reference state according to the second numerical embodiment.
Figure 10:
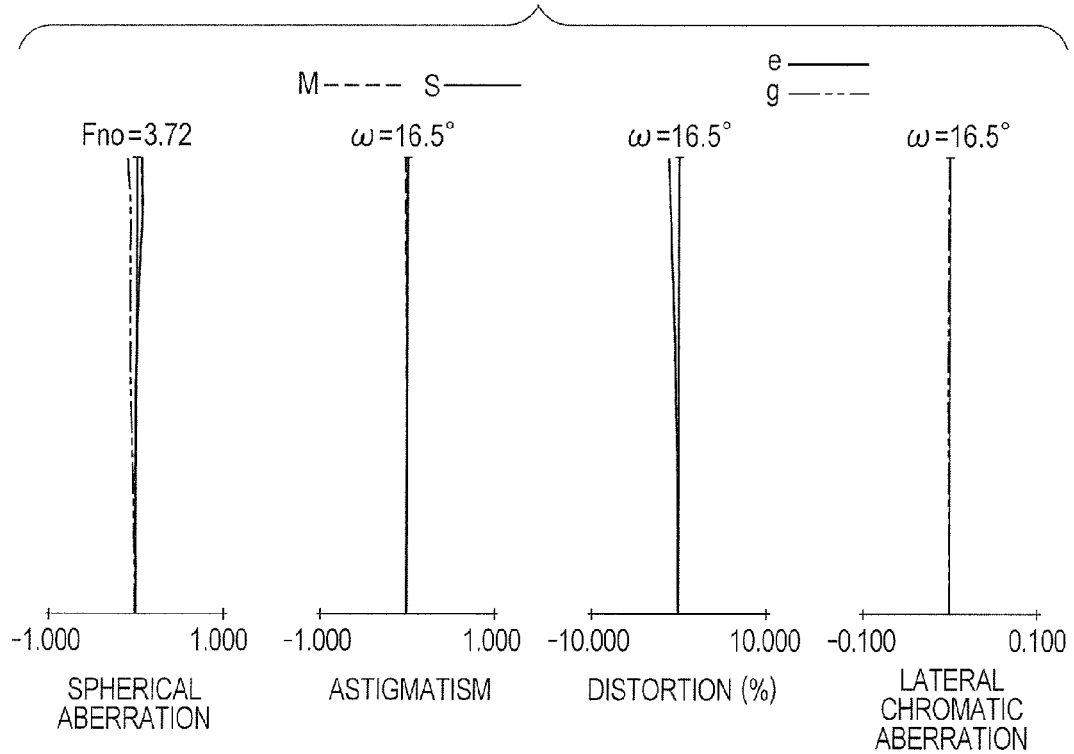
FIG. 10 is a longitudinal aberration diagram of the wide angle end in a state after displacement of the focal length range toward the long focal length side according to the second numerical embodiment.
Figure 11:
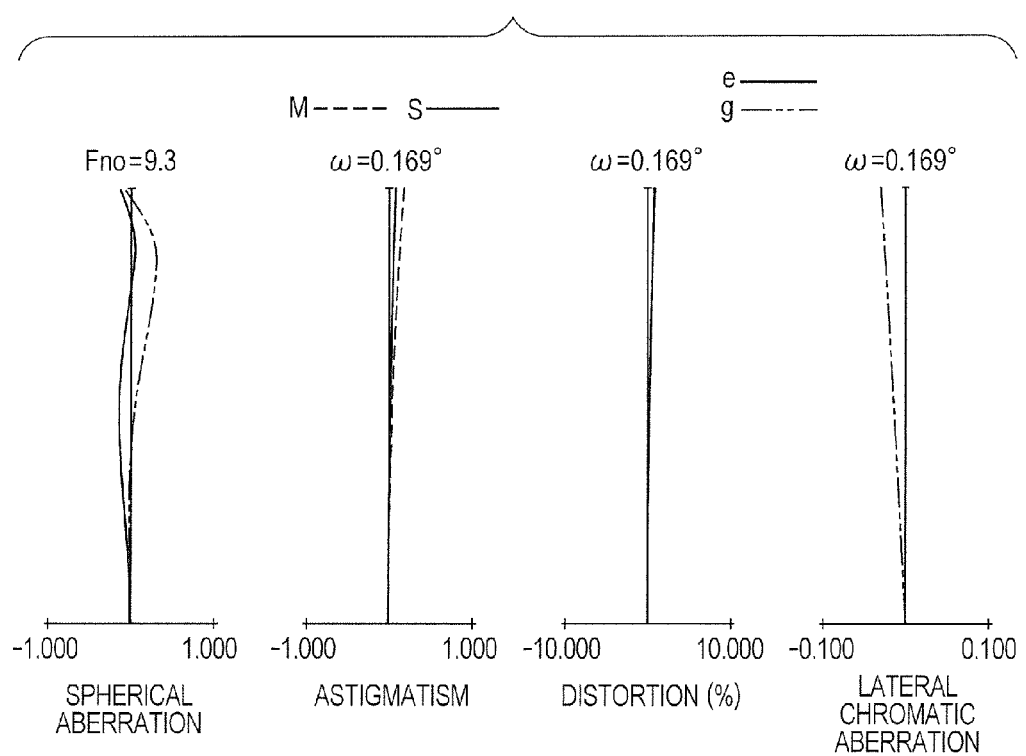
FIG. 11 is a longitudinal aberration diagram of the telephoto end in the state after the displacement of the focal length range toward the long focal length side according to the second numerical embodiment.

FIG. 7 is a cross-sectional view of lenses when focusing on an object at the infinity at the wide angle end in the zoom lenses according to the second embodiment (second numerical embodiment) of the present invention. FIGS. 8 and 9 are longitudinal aberration diagrams of the wide angle end and the telephoto end with the focal length range in the reference state according to the second numerical embodiment. FIGS. 10 and 11 are longitudinal aberration diagrams of the wide angle end and the telephoto end in a state after displacement of the focal length range toward the long focal length side according to the second numerical embodiment. The aberration diagrams are longitudinal aberration diagrams when focusing on an object at a distance of 13 m. In FIG. 7, the first magnification-varying group includes, from the object side to the image side: a first lens unit (focus lens unit) L1 having a positive refractive power; a second lens unit L2 for zooming having a negative refractive power configured to move toward the image side during zooming from the wide angle end to the telephoto end; and a third lens unit having a positive refractive power. The first magnification-varying group further includes a fourth lens unit L4 having a positive refractive power configured to non-linearly move on the optical axis in conjunction with the movement of the second lens unit L2 and the third lens unit L3 to correct an image plane variation associated with zooming. The third lens unit L3 and the fourth lens unit L4 have a positive combined refractive power (refractive power of the entire third lens unit L3 and fourth lens unit).

The second magnification-varying group includes, from the object side to the image side: a fifth lens unit L5 (first sub lens unit) having a negative refractive power; a sixth lens unit L6 (second sub lens unit) having a negative refractive power configured to move to displace the focal length range toward the long focal length side; and a seventh lens unit L7 (third sub lens unit) having a positive refractive power. The first magnification-varying group and the second magnification-varying group are magnification-varying groups independent of each other. The first to seventh lens units L1 to L7 according to the present embodiment will be described. The first lens unit L1 corresponds to first to tenth surfaces. The first lens unit L1 includes, from the object side to the image side: a first sub lens unit L11 configured not to move for focusing; and a second sub lens unit L12 configured to perform focusing by moving toward the object side in focusing from the infinity object to the short-distance object. The second lens unit L2 corresponds to eleventh to seventeenth surfaces and comprises four lenses including convex lenses and concave lenses. The third lens unit L3 corresponds to eighteenth to twenty-fourth surfaces and comprises four lenses including convex lenses and concave lenses. The fourth lens unit L4 corresponds to twenty-fifth to twenty-seventh surfaces and comprises two lenses including a convex lens and a concave lens.

The fifth lens unit L5 corresponds to twenty-ninth to thirty-eighth surfaces. The fifth lens unit L5 includes, from the object side to the image side, a biconcave lens G1, a meniscus convex lens G2 having a concave surface facing objet side, a biconcave lens G3, a biconvex lens G4 and a biconcave lens G5. The sixth lens unit L6 corresponds to thirty-ninth to forty-sixth surfaces. The sixth lens unit L6 includes, from the object side to the image side: a cemented lens of a meniscus convex lens G6 having a concave surface facing object side and a meniscus concave lens G7 having a convex surface facing image side; a cemented lens of a biconcave lens G8 and a biconvex lens G9; and a biconcave lens G10. The seventh lens unit corresponds to forty-seventh to fifty-third surfaces. The seventh lens unit L7 includes, from the object side to the image side: a biconvex lens G11; a biconvex lens G12; and a cemented lens of a biconvex lens G13 and a meniscus concave lens G14 having a convex surface facing image side.

Figure 12A:
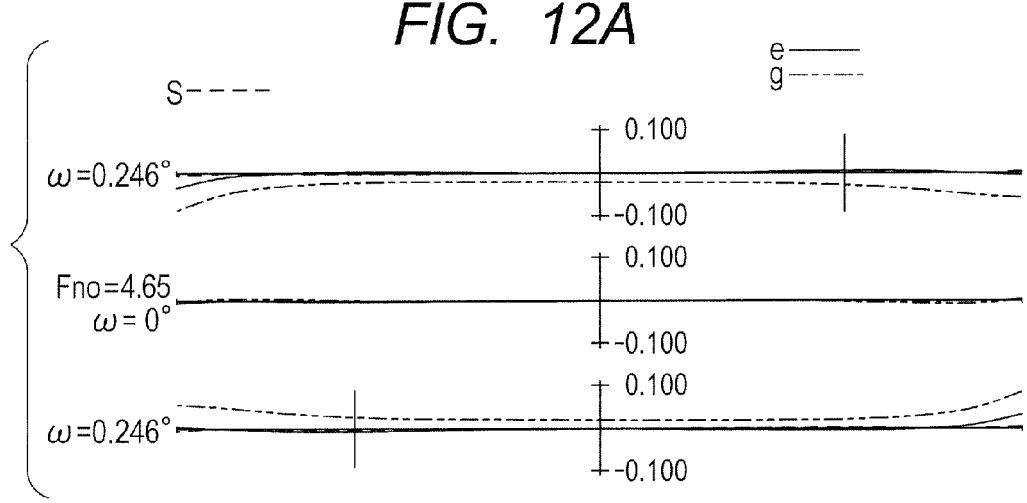
FIG. 12A is a lateral aberration diagram without anti-vibration at the telephoto end with the focal length range in the reference state according to the second numerical embodiment.
Figure 12B:
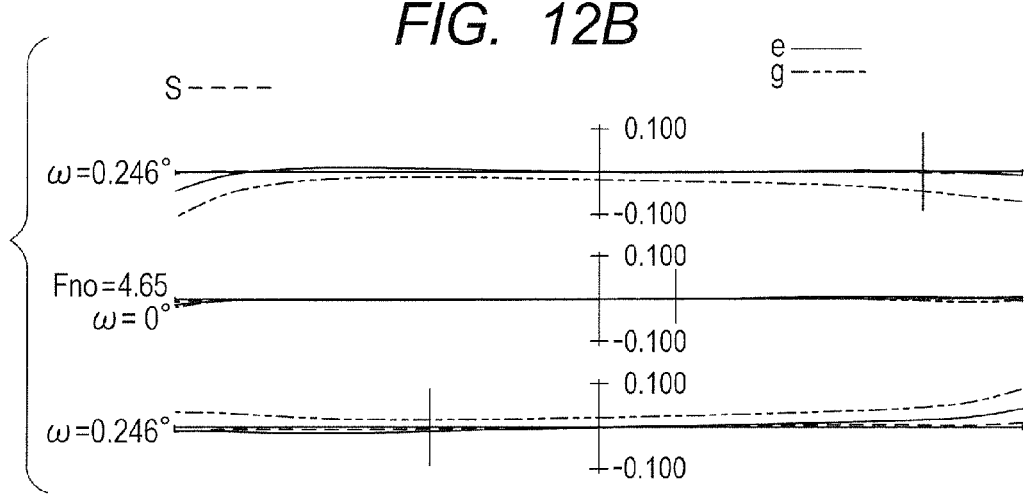
FIG. 12B is a lateral aberration diagram with anti-vibration at the telephoto end with the focal length range in the reference state according to the second numerical embodiment.

In the present numerical embodiment, the sixth lens unit L6 is moved between two positions along the optical axis to displace the focal length range of the zoom lenses toward the long focal length side by 2 times. G1 to G3 of the fifth lens unit L5 form an anti-vibration lens unit, and G1 to G3 are configured to move with components in the direction perpendicular to the optical axis to correct a blur of a photographic image when the entire zoom lenses are vibrated. FIG. 12A is a lateral aberration diagram without anti-vibration at the telephoto end with the focal length range in the reference state according to the present numerical embodiment. FIG. 12B is a lateral aberration diagram when the anti-vibration lens unit is decentered by 1.5 mm in the direction perpendicular to the optical axis, at the telephoto end with the focal length range in the reference state according to the present numerical embodiment. The aberration diagrams are lateral aberration diagrams when focusing on an object at a distance of 13 m. G12 to G14 of the seventh lens unit L7 can be moved in the optical axis direction to perform macro image taking or flange back adjustment.

Table 1 indicates values of the conditional expressions in case of the present embodiment. The present embodiment satisfies conditional expressions (1) to (4) and has a function of appropriately setting the refractive power arrangement of the second magnification-varying group and the configuration of the lens units to displace the focal length range of the zoom lenses toward the long focal length side. The present embodiment realizes small zoom lenses with high optical performance.

Third Embodiment

Figure 13:
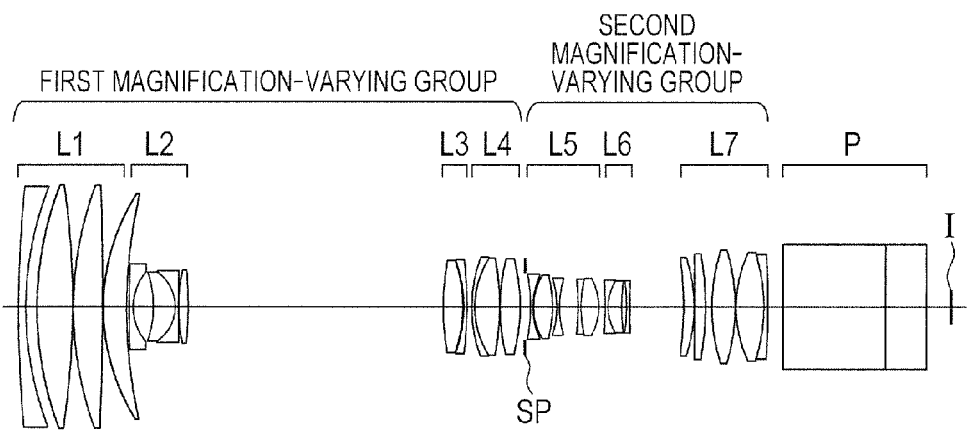
FIG. 13 is a cross-sectional view of lenses at the wide angle end with the focal length range in the reference state according to a third numerical embodiment.
Figure 14:
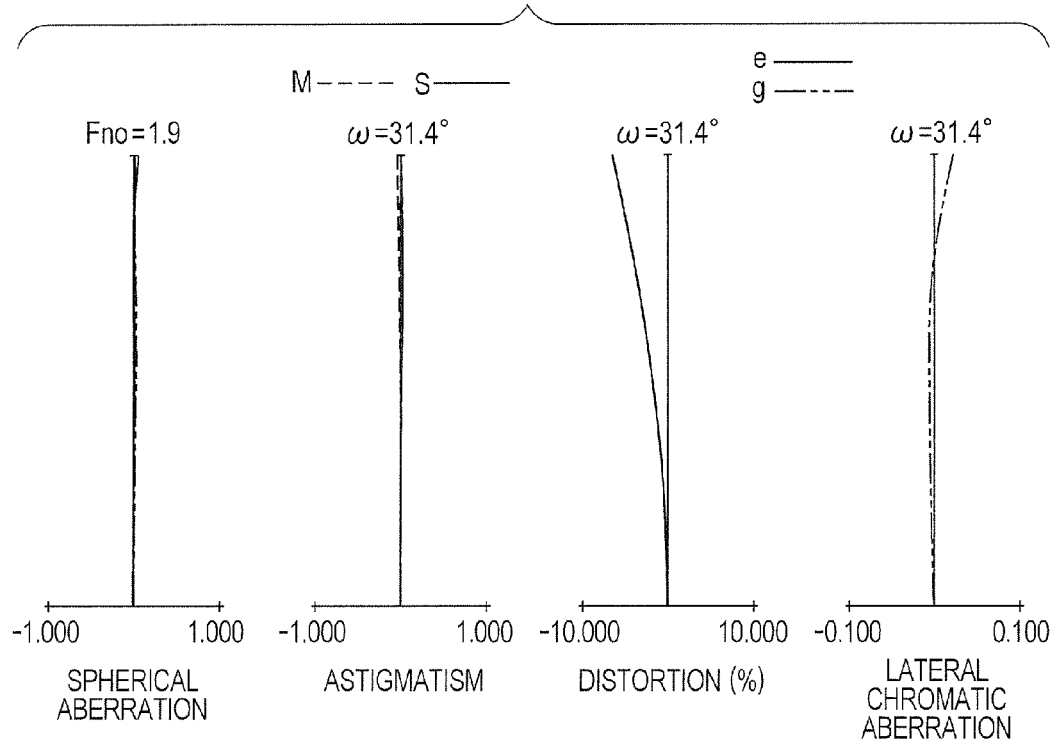
FIG. 14 is a longitudinal aberration diagram of the wide angle end with the focal length range in the reference state according to the third numerical embodiment.
Figure 15:
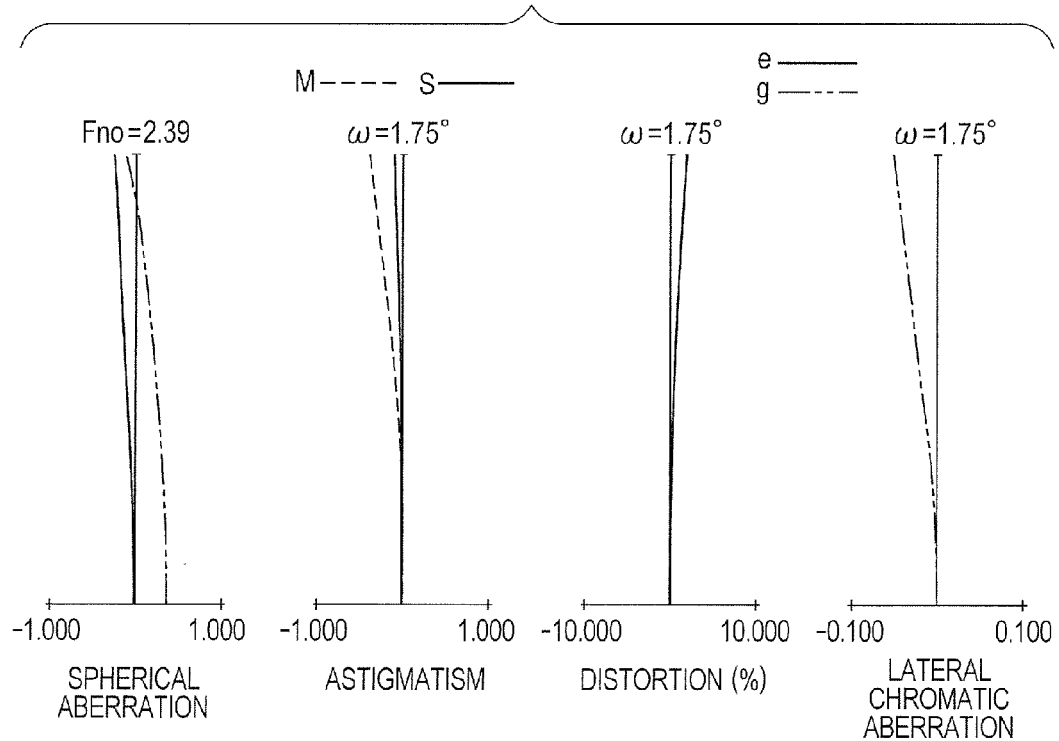
FIG. 15 is a longitudinal aberration diagram of the telephoto end with the focal length range in the reference state according to the third numerical embodiment.
Figure 16:
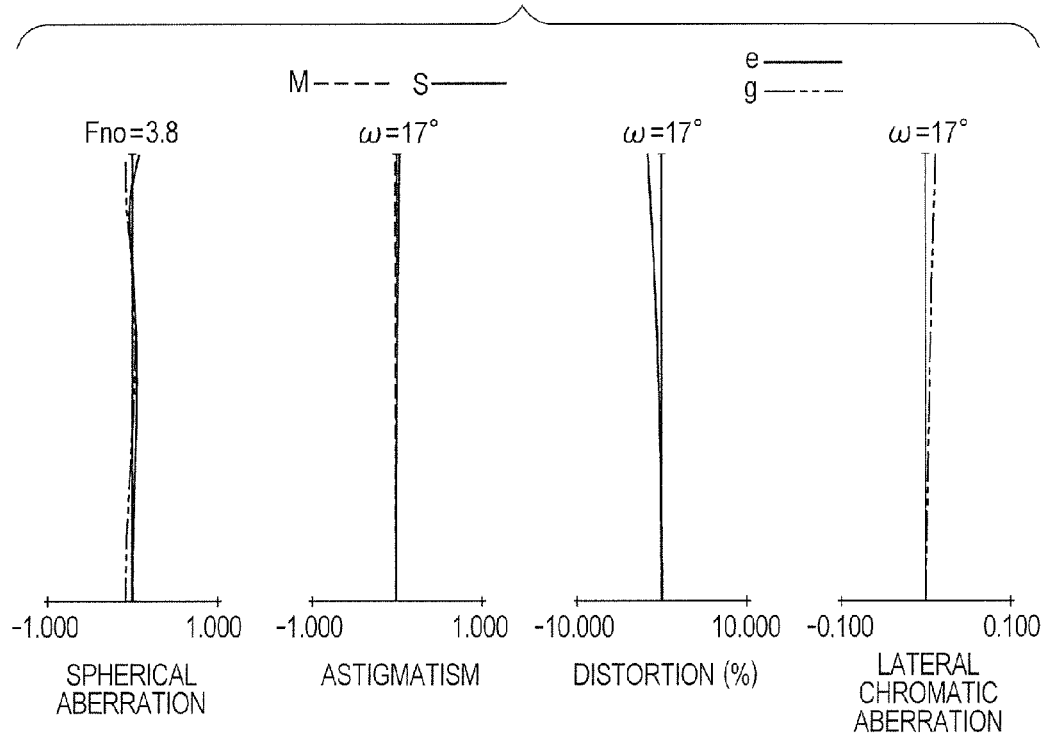
FIG. 16 is a longitudinal aberration diagram of the wide angle end in a state after displacement of the focal length range toward the long focal length side according to the third numerical embodiment.
Figure 17:
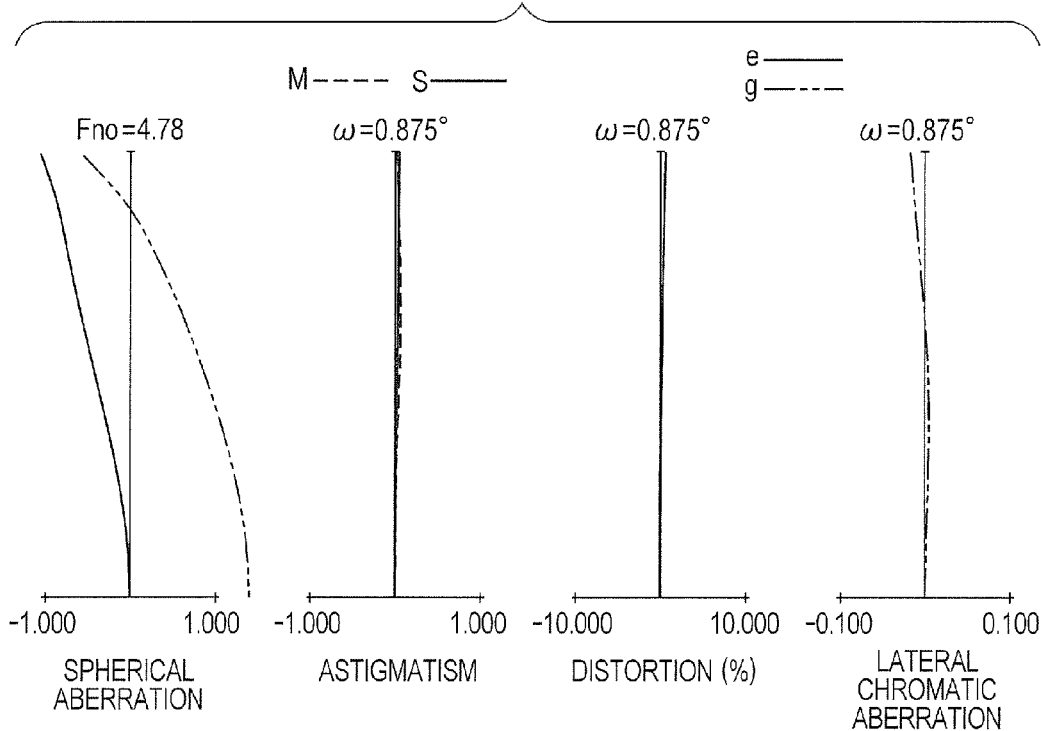
FIG. 17 is a longitudinal aberration diagram of the telephoto end in the state after the displacement of the focal length range toward the long focal length side according to the third numerical embodiment.

FIG. 13 is a cross-sectional view of lenses when focusing on an object at the infinity at the wide angle end in the zoom lenses according to the third embodiment (third numerical embodiment) of the present invention. FIGS. 14 and 15 are longitudinal aberration diagrams of the wide angle end and the telephoto end with the focal length range in the reference state according to the third numerical embodiment. FIGS. 16 and 17 are longitudinal aberration diagrams of the wide angle end and the telephoto end in a state after displacement of the focal length range toward the long focal length side according to the third numerical embodiment. The aberration diagrams are longitudinal aberration diagrams when focusing on an object at a distance of 3 m. In FIG. 13, the first magnification-varying group includes, from the object side to the image side: a first lens unit L1 having a positive refractive power; a second lens unit L2 for zooming having a negative refractive power configured to move toward the image side during zooming from the wide angle end to the telephoto end; and a third lens unit having a positive refractive power. The first magnification-varying group further includes a fourth lens unit L4 having a positive refractive power configured to non-linearly move on the optical axis in conjunction with the movement of the second lens unit L2 and the third lens unit L3 to correct an image plane variation associated with zooming. The third lens unit L3 and the fourth lens unit L4 have a positive combined refractive power (refractive power of the entire third lens unit L3 and fourth lens unit).

The second magnification-varying group includes, from the object side to the image side: a fifth lens unit L5 (first sub lens unit) having a negative refractive power; a sixth lens unit L6 (second sub lens unit) having a negative refractive power configured to move to displace the focal length range toward the long focal length side; and a seventh lens unit L7 (third sub lens unit) having a positive refractive power. The first magnification-varying group and the second magnification-varying group are magnification-varying groups independent of each other. The first to seventh lens units L1 to L7 according to the present embodiment will be described. The first lens unit L1 corresponds to first to eighth surfaces and comprises four lenses including convex lenses and concave lenses. The second lens unit L2 corresponds to ninth to fifteenth surfaces and comprises four lenses including convex lenses and concave lenses. The third lens unit L3 corresponds to sixteenth to nineteenth surfaces and comprises two lenses including a convex lens and a concave lens. The fourth lens unit L4 corresponds to twentieth to twenty-fourth surfaces and comprises three lenses including convex lenses and concave lenses. The fourth lens unit L4 performs focusing from the infinity object to the short-distance object.

The fifth lens unit L5 corresponds to twenty-sixth to thirty-fourth surfaces. The fifth lens unit L5 includes, from the object side to the image side: a biconcave lens G1; a biconvex lens G2; a biconcave lens G3; and a cemented lens of a biconcave lens G4 and a biconvex lens G5. The sixth lens unit L6 corresponds to thirty-fifth to thirty-ninth surfaces. The sixth lens unit L6 includes, from the object side to the image side: a cemented lens of a biconcave lens G6 and a meniscus convex lens G7 having a concave surface facing image side; and a biconcave lens G8. The seventh lens unit L7 corresponds to fortieth to forty-eighth surfaces. The seventh lens unit L7 includes, from the object side to the image side: a meniscus convex lens G9 having a concave surface facing object side; a meniscus convex lens G10 having a concave surface facing object side; a biconvex lens G11; and a cemented lens of a biconvex lens G12 and a meniscus concave lens G13 having a convex surface facing image side.

In the present numerical embodiment, the sixth lens unit L6 is moved between two positions along the optical axis to displace the focal length range of the zoom lenses toward the long focal length side by 2 times. G11 to G13 of the sixth lens unit L6 can be moved in the optical axis direction to perform macro image taking or flange back adjustment.

Table 1 indicates values of the conditional expressions in case of the present embodiment. The present embodiment satisfies conditional expressions (1) to (4) and has a function of appropriately setting the refractive power arrangement of the second magnification-varying group and the configuration of the lens units to displace the focal length range of the zoom lenses toward the long focal length side. The present embodiment realizes small zoom lenses with high optical performance.

Fourth Embodiment

Figure 18:
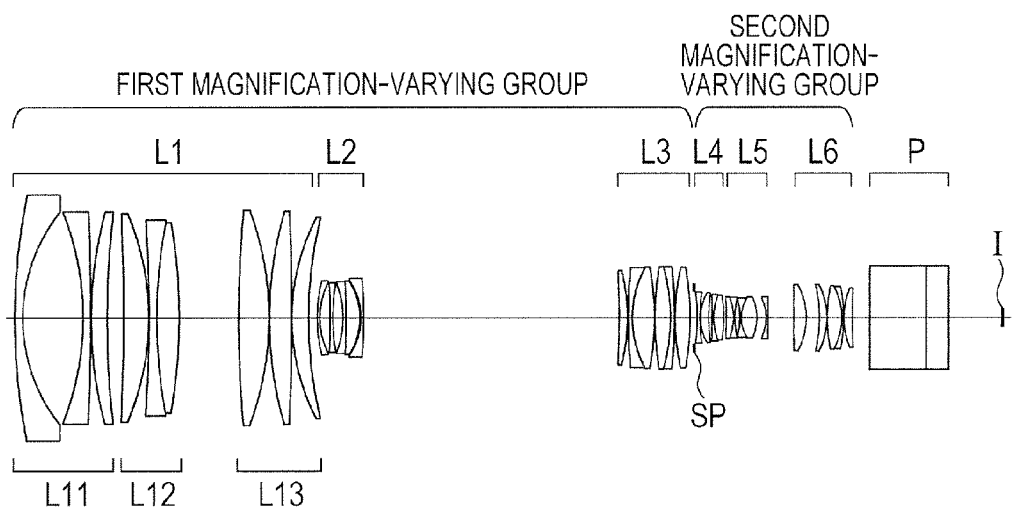
FIG. 18 is a cross-sectional view of lenses at the wide angle end with the focal length range in the reference state according to a fourth numerical embodiment.
Figure 19:
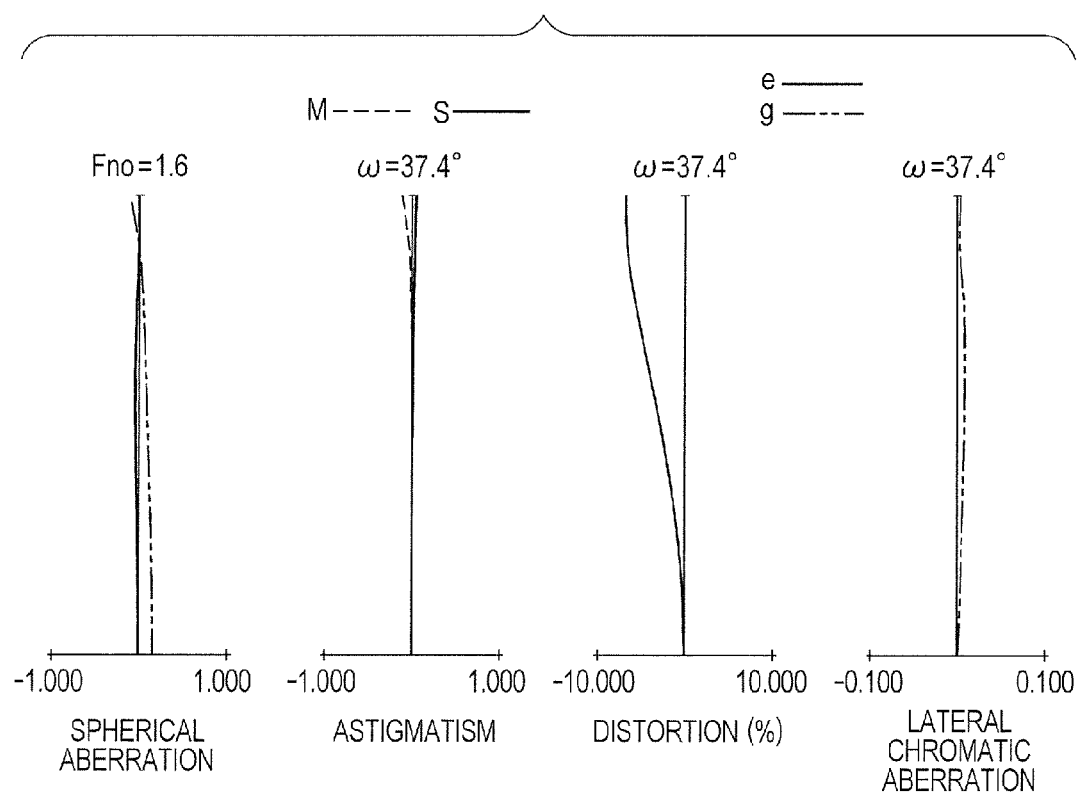
FIG. 19 is a longitudinal aberration diagram of the wide angle end with the focal length range in the reference state according to the fourth numerical embodiment.
Figure 20:
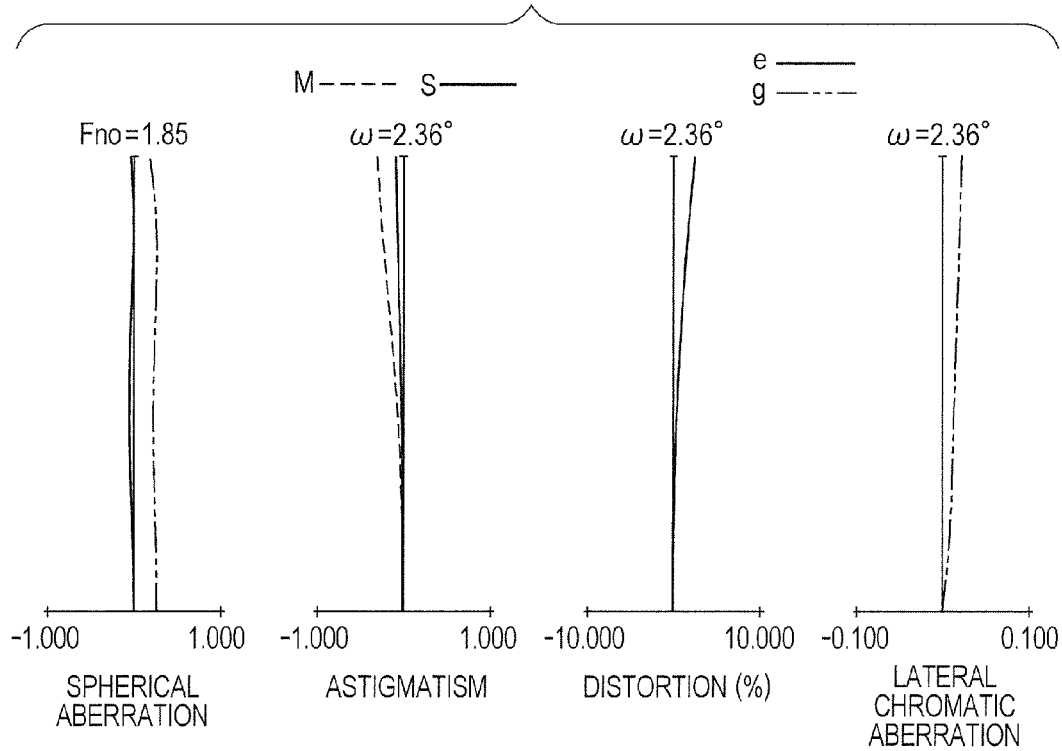
FIG. 20 is a longitudinal aberration diagram of the telephoto end with the focal length range in the reference state according to the fourth numerical embodiment.
Figure 21:
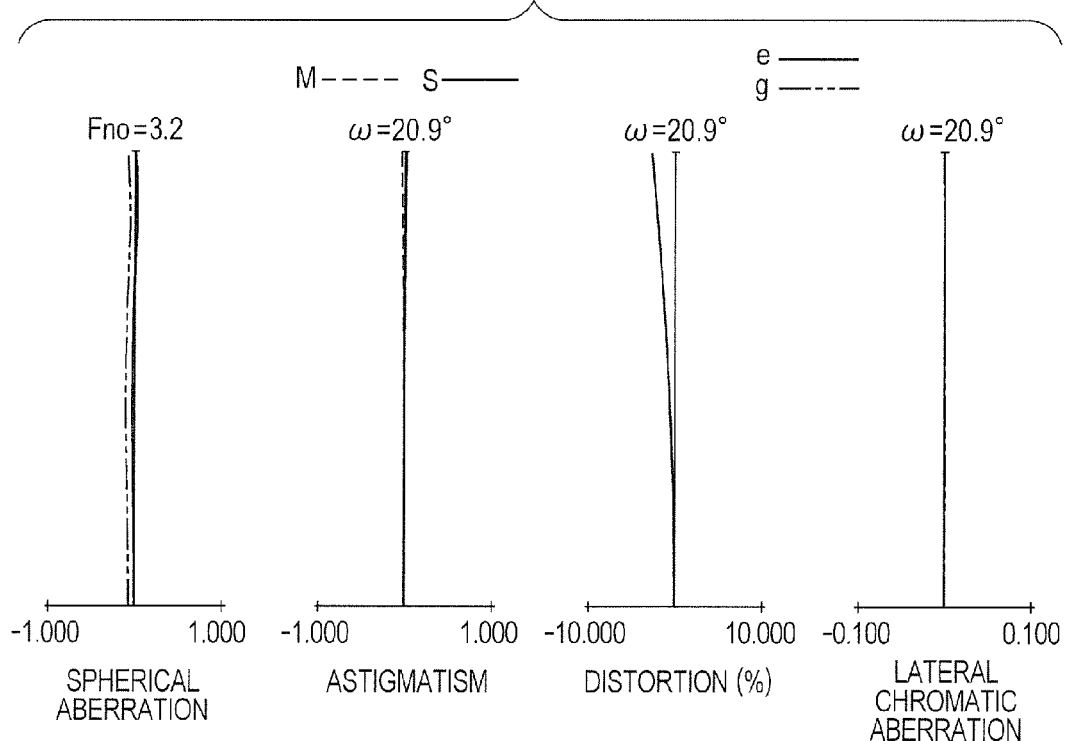
FIG. 21 is a longitudinal aberration diagram of the wide angle end in the state after the displacement of the focal length range toward the long focal length side according to the fourth numerical embodiment.
Figure 22:
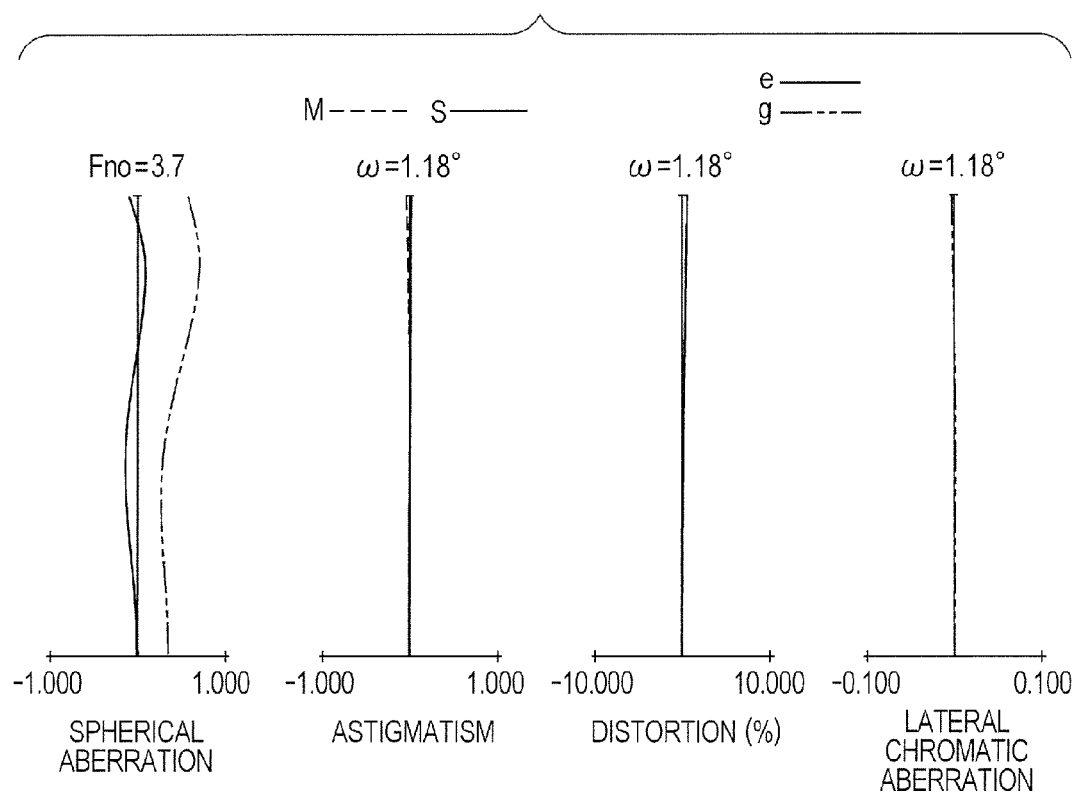
FIG. 22 is a longitudinal aberration diagram of the telephoto end in the state after the displacement of the focal length range toward the long focal length side according to the fourth numerical embodiment.

FIG. 18 is a cross-sectional view of lenses when focusing on an object at the infinity at the wide angle end in the zoom lenses according to the fourth embodiment (fourth numerical embodiment) of the present invention. FIGS. 19 and 20 are longitudinal aberration diagrams of the wide angle end and the telephoto end with the focal length range in the reference state according to the fourth numerical embodiment. FIGS. 21 and 22 are longitudinal aberration diagrams of the wide angle end and the telephoto end in a state after displacement of the focal length range toward the long focal length side according to the fourth numerical embodiment. The aberration diagrams are longitudinal aberration diagrams when focusing on an object at a distance of 2 m. In FIG. 18, the first magnification-varying group includes, from the object side to the image side: a first lens unit (focus lens unit) L1 having a positive refractive power; and a second lens unit (variator) L2 for zooming having a negative refractive power configured to move toward the image side during zooming from the wide angle end to the telephoto end. The first magnification-varying group further includes a third lens unit (compensator) L3 having a positive refractive power configured to non-linearly move on the optical axis in conjunction with the movement of the second lens unit L2 to correct an image plane variation associated with zooming.

The second magnification-varying group includes, from the object side to the image side: a fourth lens unit L4 (first sub lens unit) having a negative refractive power; a fifth lens unit L5 (second sub lens unit) having a negative refractive power configured to move to displace the focal length range toward the long focal length side; and a sixth lens unit L6 (third sub lens unit) having a positive refractive power. The first magnification-varying group and the second magnification-varying group are magnification-varying groups independent of each other. The first to sixth lens units L1 to L6 according to the present embodiment will be described. The first lens unit L1 corresponds to first to seventeenth surfaces. The first lens unit L1 includes, from the object side to the image side: a first sub lens unit L11 having a negative refractive power configured not to move for focusing; a second sub lens unit L12 having a positive refractive power configured to move toward the image side in focusing from the infinity object to the short-distance object; and a third sub lens unit L13 having a positive refractive power configured not to move for focusing. The second lens unit L2 corresponds to seventeenth to twenty-sixth surfaces and comprises five lenses including convex lenses and concave lenses. The third lens unit L3 corresponds to twenty-seventh to thirty-sixth surfaces and comprises six lenses including convex lenses and concave lenses.

The fourth lens unit L4 corresponds to thirty-eighth to forty-fourth surfaces. The fourth lens unit L4 includes, from the object side to the image side: a biconcave lens G1; a meniscus convex lens G2 having a concave surface facing object side; and a cemented lens of a biconcave lens G3 and a biconvex lens G4. The fifth lens unit L5 corresponds to forty-fifth to fifty-second surfaces. The fifth lens unit L5 includes, from the object side to the image side: a cemented lens of a meniscus convex lens G5 having a concave surface facing object side and a biconcave lens G6; a cemented lens of a biconcave lens G7 and a biconvex lens G8; and a biconcave lens G9. The sixth lens unit corresponds to fifty-third to sixty-first surfaces. The sixth lens unit L6 includes, from the object side to the image side: a biconvex lens G10; a meniscus convex lens G11 having a concave surface facing image side; a cemented lens of a biconvex lens G12 and a meniscus concave lens G13 having a convex surface facing image side; and a meniscus convex lens G14 having a concave surface facing image side.

In the present numerical embodiment, the fifth lens unit L5 is moved between two positions along the optical axis to displace the focal length range of the zoom lenses toward the long focal length side by 2 times. G11 to G14 of the sixth lens unit L6 can be moved in the optical axis direction to perform macro image taking or flange back adjustment. Table 1 indicates values of the conditional expression in case of the present embodiment. The present embodiment satisfies conditional expressions (1) to (4) and has a function of appropriately setting the refractive power arrangement of the second magnification-varying group and the configuration of the lens units to displace the focal length range of the zoom lenses toward the long focal length side. The present embodiment realizes small zoom lenses with high optical performance.

Fifth Embodiment

Figure 23:
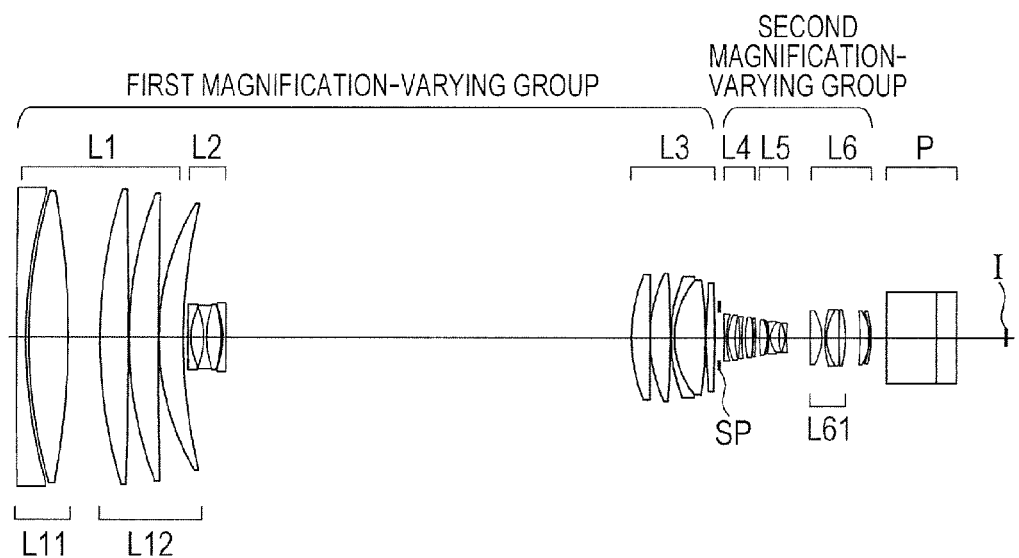
FIG. 23 is a cross-sectional view of lenses at the wide angle end with the focal length range in the reference state according to a fifth numerical embodiment.
Figure 24:
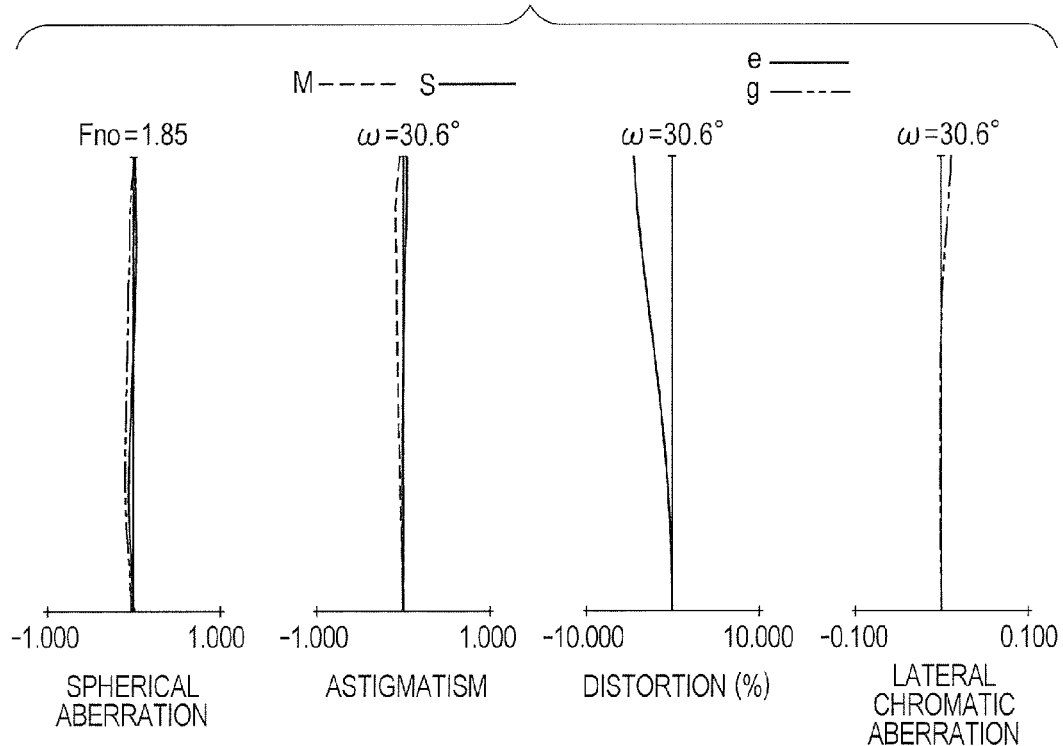
FIG. 24 is a longitudinal aberration diagram of the wide angle end with the focal length range in the reference state according to the fifth numerical embodiment.
Figure 25:
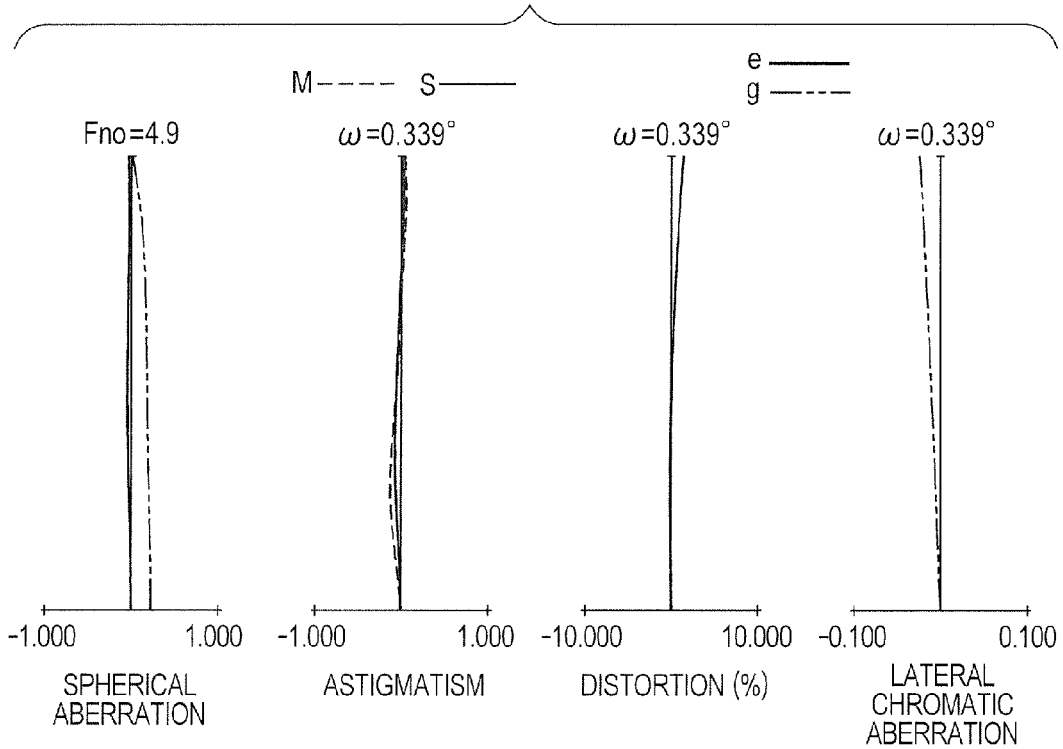
FIG. 25 is a longitudinal aberration diagram of the telephoto end with the focal length range in the reference state according to the fifth numerical embodiment.
Figure 26:
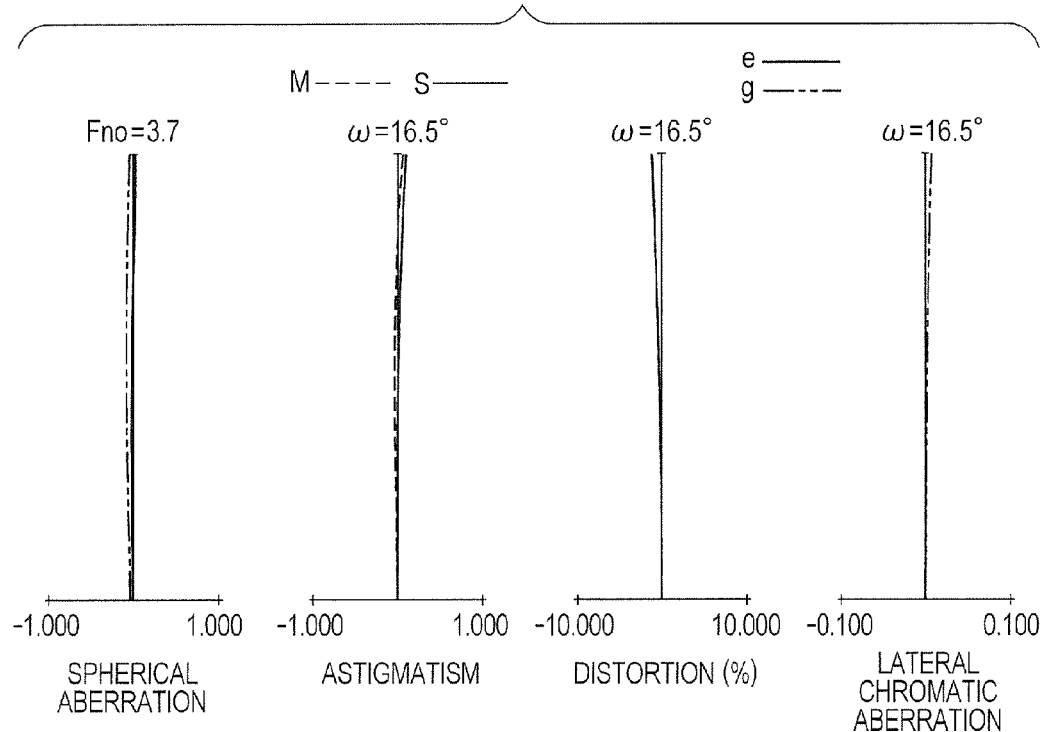
FIG. 26 is a longitudinal aberration diagram of the wide angle end in a state after displacement of the focal length range toward the long focal length side by 2 times according to the fifth numerical embodiment.
Figure 27:
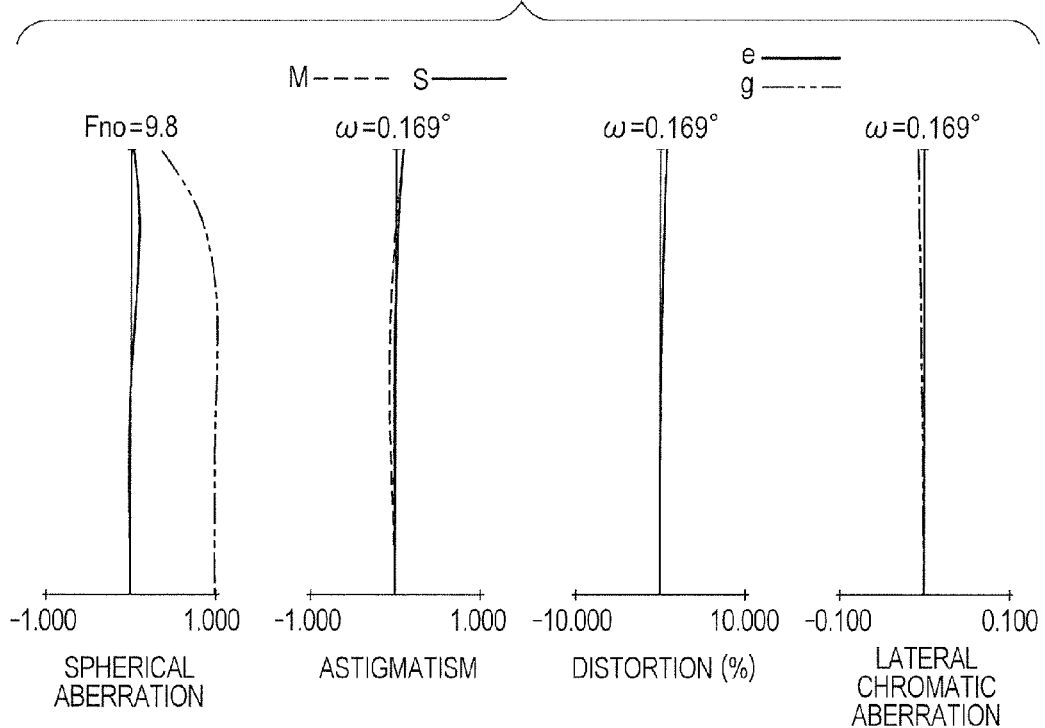
FIG. 27 is a longitudinal aberration diagram of the telephoto end in the state after the displacement of the focal length range toward the long focal length side by 2 times according to the fifth numerical embodiment.
Figure 28:
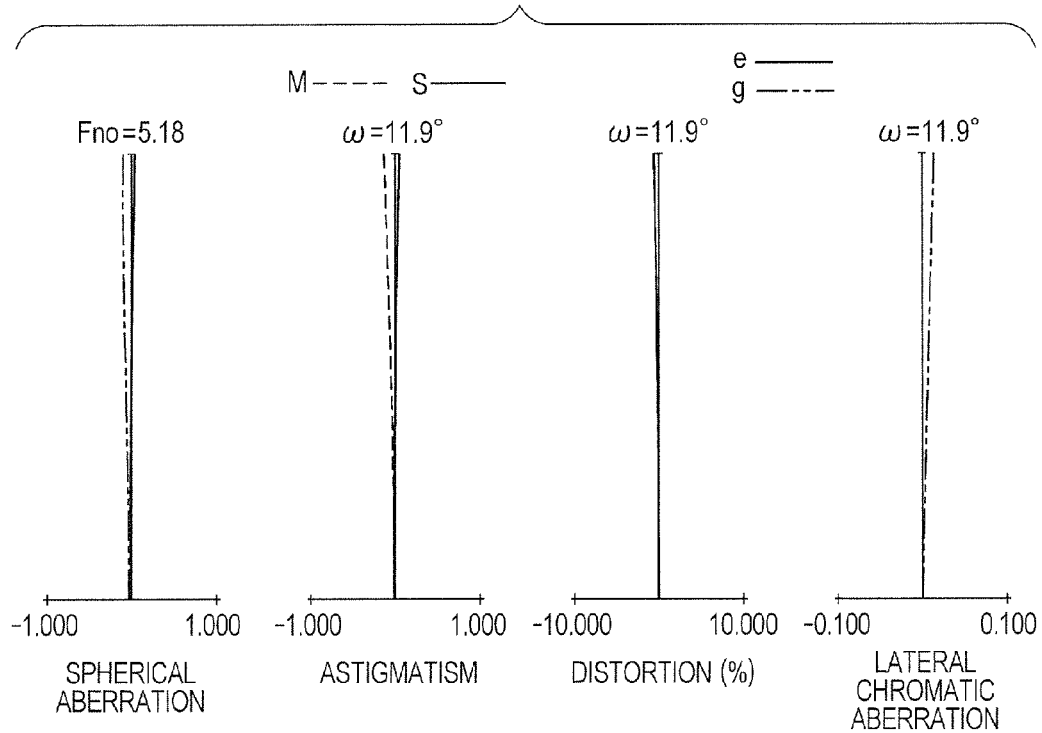
FIG. 28 is a longitudinal aberration diagram of the wide angle end in a state after displacement of the focal length range toward the long focal length side by 2.8 times according to the fifth numerical embodiment.
Figure 29:
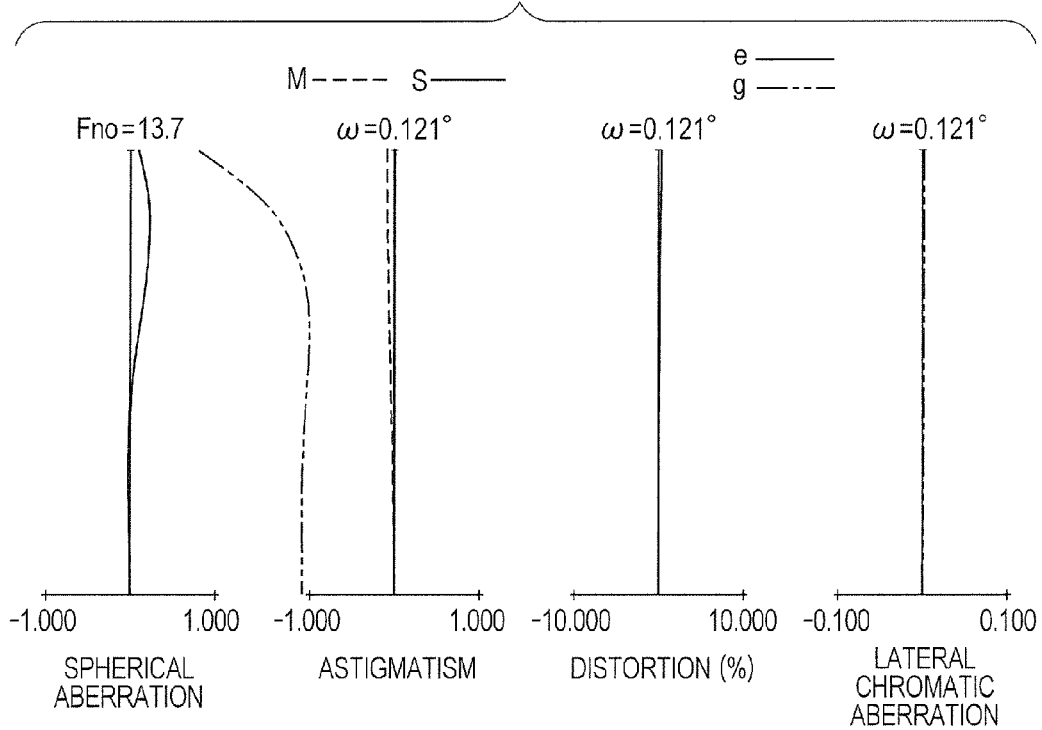
FIG. 29 is a longitudinal aberration diagram of the telephoto end in the state after the displacement of the focal length range toward the long focal length side by 2.8 times according to the fifth numerical embodiment.

FIG. 23 is a cross-sectional view of lenses when focusing on an object at the infinity at the wide angle end in the zoom lenses according to the fifth embodiment (fifth numerical embodiment) of the present invention. FIGS. 24 and 25 are longitudinal aberration diagrams of the wide angle end and the telephoto end with the focal length range in the reference state according to the fifth numerical embodiment. FIGS. 26 and 27 are longitudinal aberration diagrams of the wide angle end and the telephoto end in a state after displacement of the focal length range toward the long focal length side by 2 times according to the fifth numerical embodiment. FIGS. 28 and 29 are longitudinal aberration diagrams of the wide angle end and the telephoto end in a state after displacement of the focal length range toward the long focal length side by 2.8 times according to the fifth numerical embodiment. The aberration diagrams are longitudinal aberration diagrams when focusing on an object at a distance of 13 m.

In FIG. 23, the first magnification-varying group includes, from the object side to the image side: a first lens unit (focus lens unit) L1 having a positive refractive power; and a second lens unit (variator) L2 for zooming having a negative refractive power configured to move toward the image side during zooming from the wide angle end to the telephoto end. The first magnification-varying group further includes a third lens unit (compensator) L3 having a positive refractive power configured to non-linearly move on the optical axis in conjunction with the movement of the second lens unit L2 to correct an image plane variation associated with zooming.

The second magnification-varying group includes, from the object side to the image side: a fourth lens unit L4 (first sub lens unit) having a negative refractive power; a fifth lens unit L5 (second sub lens unit) having a negative refractive power configured to move to displace the focal length range toward the long focal length side; and a sixth lens unit L6 (third sub lens unit) having a positive refractive power. The sixth lens unit L6 includes a first sub lens unit L61 configured to move on the optical axis in conjunction with the movement of the fifth lens unit L5. The first magnification-varying group and the second magnification-varying group are magnification-varying groups independent of each other.

The first to sixth lens units L1 to L6 according to the present embodiment will be described. The first lens unit L1 corresponds to first to tenth surfaces. The first lens unit L1 includes, from the object side to the image side: a first sub lens unit L11 configured not to move for focusing; and a second sub lens unit L12 configured to perform focusing by moving toward the object side in focusing from the infinity object to the short-distance object. The second lens unit L2 corresponds to eleventh to seventeenth surfaces and comprises four lenses including convex lenses and concave lenses. The third lens unit L3 corresponds to eighteenth to twenty-sixth surfaces and comprises five lenses including convex lenses and concave lenses.

The fourth lens unit L4 corresponds to twenty-eighth to thirty-seventh surfaces. The fourth lens unit L4 includes, from the object side to the image side, a biconcave lens G1, a meniscus convex lens G2 having a concave surface facing object side, a biconcave lens G3, a biconvex lens G4, and a meniscus concave lens G5 having a convex surface facing image side. The fifth lens unit L5 corresponds to thirty-eight to forty-fifth surfaces. The fifth lens unit L5 includes, from the object side to the image side: a cemented lens of a biconvex lens G6 and a meniscus concave lens G7 having a convex surface facing image side; a cemented lens of a biconcave lens G8 and a meniscus convex lens G9 having a concave surface facing image side; and a biconcave lens G10. The sixth lens unit corresponds to forty-sixth to fifty-sixth surfaces. The sixth lens unit L6 includes, from the object side to the image side: a biconvex lens G11; a cemented lens of a meniscus concave lens G12 having a convex surface facing image side and a biconvex lens G13; a biconvex lens G14; a meniscus convex lens G15 having a concave surface facing image side; and a meniscus concave lens G16 having a convex surface facing image side. The first sub lens unit L61 includes G11 to G14.

Figure 30A:
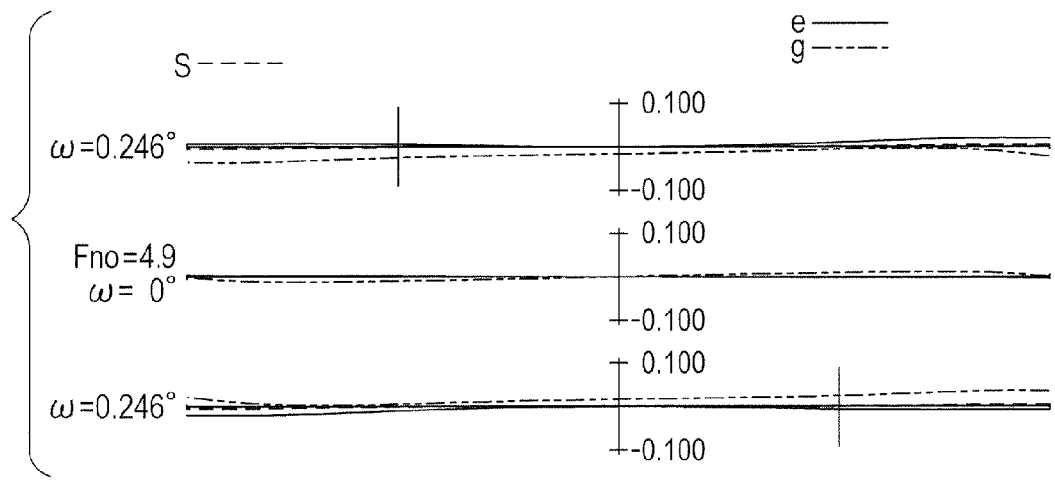
FIG. 30A is a lateral aberration diagram without anti-vibration at the telephoto end with the focal length range in the reference state according to the fifth numerical embodiment.
Figure 30B:
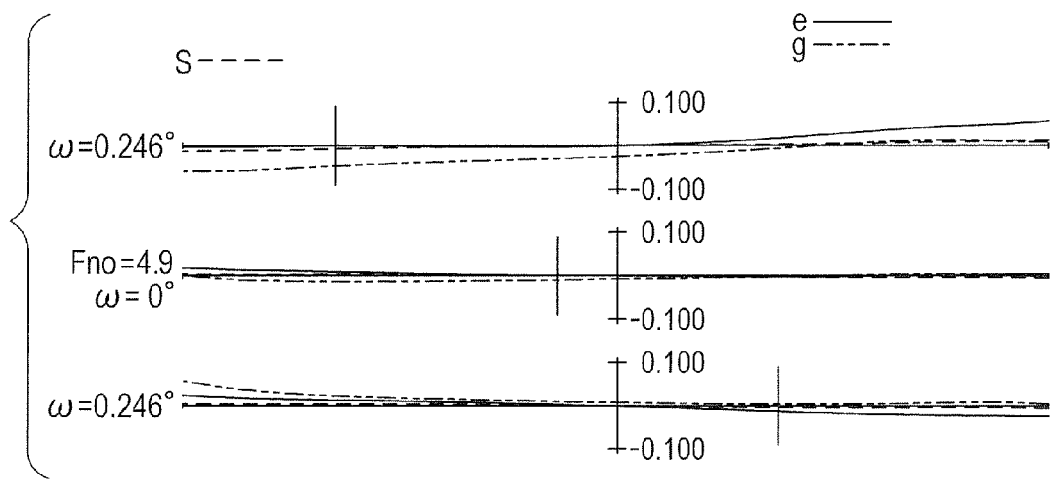
FIG. 30B is a lateral aberration diagram with anti-vibration at the telephoto end with the focal length range in the reference state according to the fifth numerical embodiment.

In the present numerical embodiment, the fifth lens unit L5 is moved in the optical axis direction to displace the focal length range of the zoom lenses toward the long focal length side. Particularly, in the present numerical embodiment, the first sub lens unit L61 can be moved in the optical axis direction in conjunction with the movement of the fifth lens unit L5 to steplessly increase the length of the focal length range of the zoom lenses from 1 times to 2.8 times. G1 to G3 of the fourth lens unit L4 form an anti-vibration lens unit, and G1 to G3 are configured to move with components in the direction perpendicular to the optical axis to correct a blur of a photographic image when the entire zoom lenses are vibrated. FIG. 30A is a lateral aberration diagram without anti-vibration at the telephoto end with the focal length range in the reference state according to the present numerical embodiment. FIG. 30B is a lateral aberration diagram when the anti-vibration lens unit is decentered by 1.5 mm in the direction perpendicular to the optical axis, at the telephoto end with the focal length range in the reference state according to the present numerical embodiment. The aberration diagrams are lateral aberration diagrams when focusing on an object at a distance of 13 m. G15 and G16 of the sixth lens unit L6 can be moved in the optical axis direction to perform macro image taking or flange back adjustment.

Table 1 indicates values of the conditional expressions in case of the present embodiment. The present embodiment satisfies conditional expressions (1) to (4) and has a function of appropriately setting the refractive power arrangement of the second magnification-varying group and the configuration of the lens units to displace the focal length range of the zoom lenses toward the long focal length side. The present embodiment realizes small zoom lenses with high optical performance.

Sixth Embodiment

Figure 31:
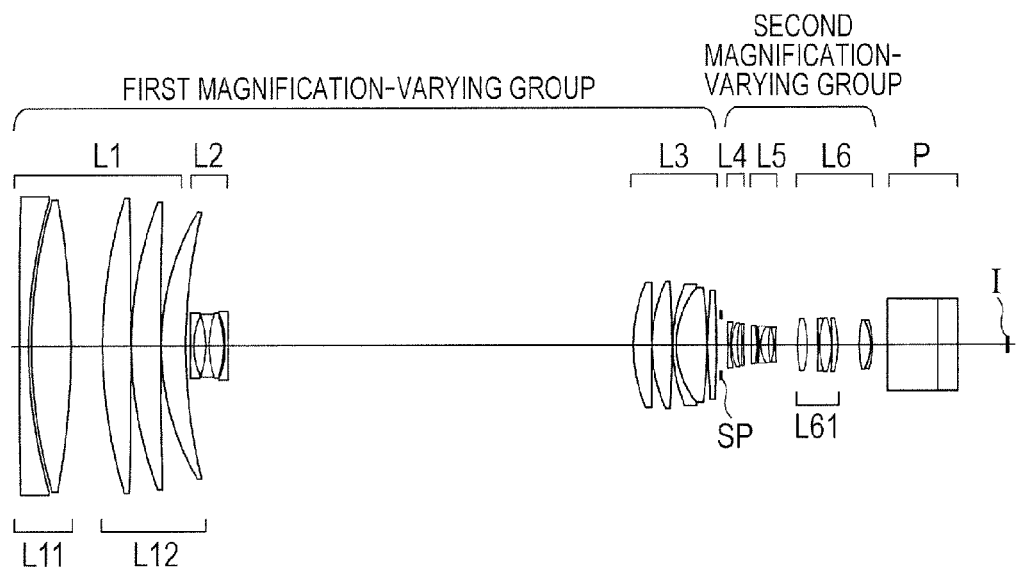
FIG. 31 is a cross-sectional view of lenses at the wide angle end with the focal length range in the reference state according to a sixth numerical embodiment.
Figure 32:
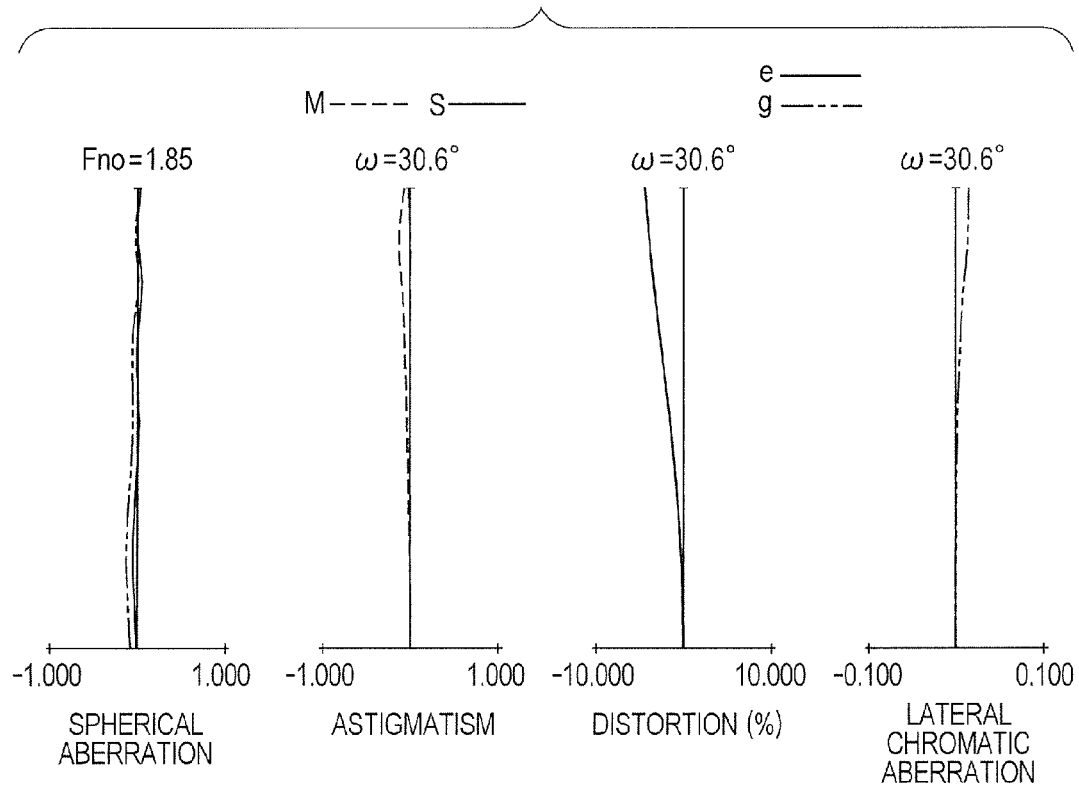
FIG. 32 is a longitudinal aberration diagram of the wide angle end with the focal length range in the reference state according to the sixth numerical embodiment.
Figure 33:
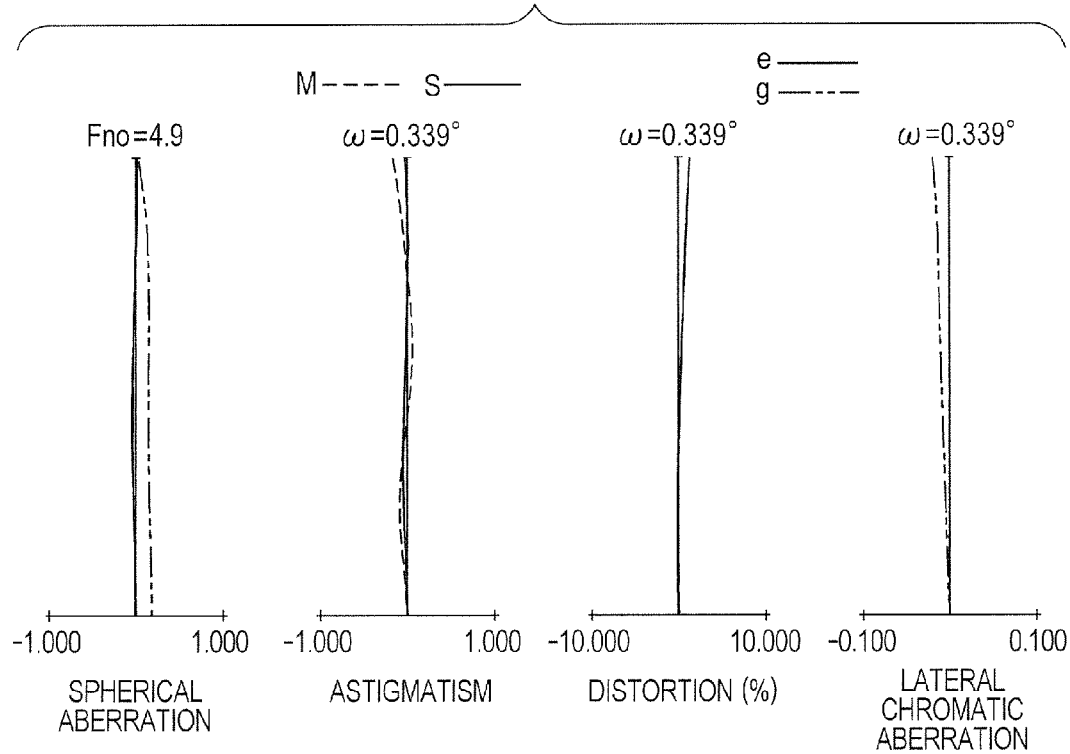
FIG. 33 is a longitudinal aberration diagram of the telephoto end with the focal length range in the reference state according to the sixth numerical embodiment.
Figure 34:
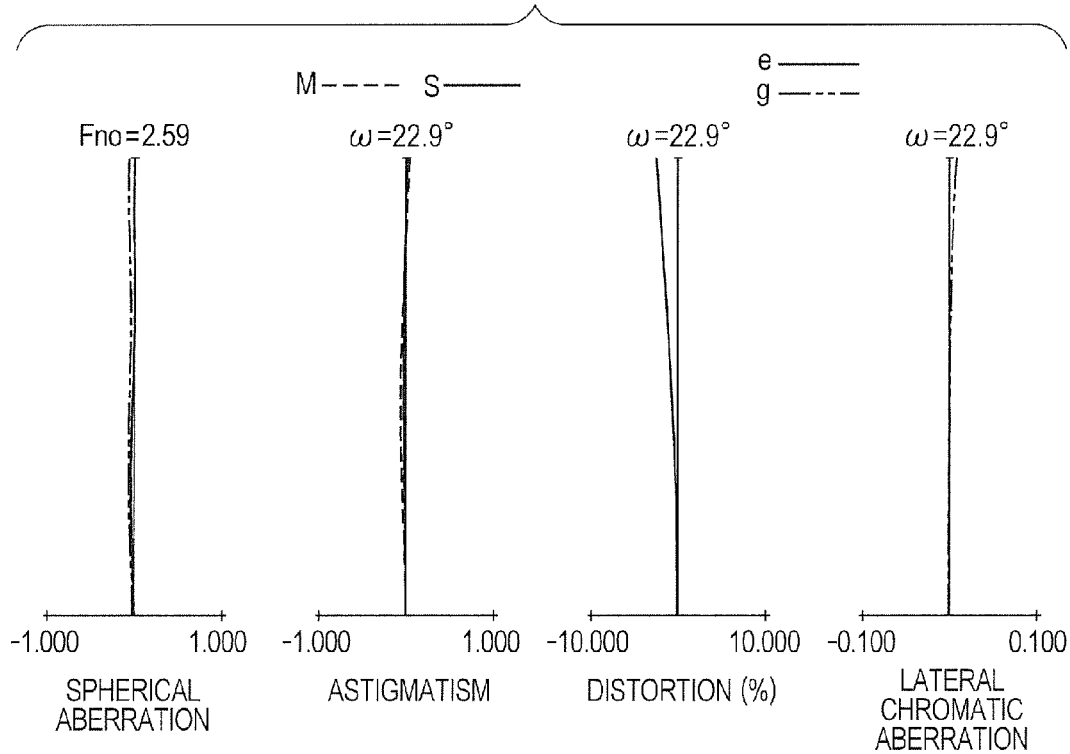
FIG. 34 is a longitudinal aberration diagram of the wide angle end in a state after displacement of the focal length range toward the long focal length side by 1.4 times according to the sixth numerical embodiment.
Figure 35:
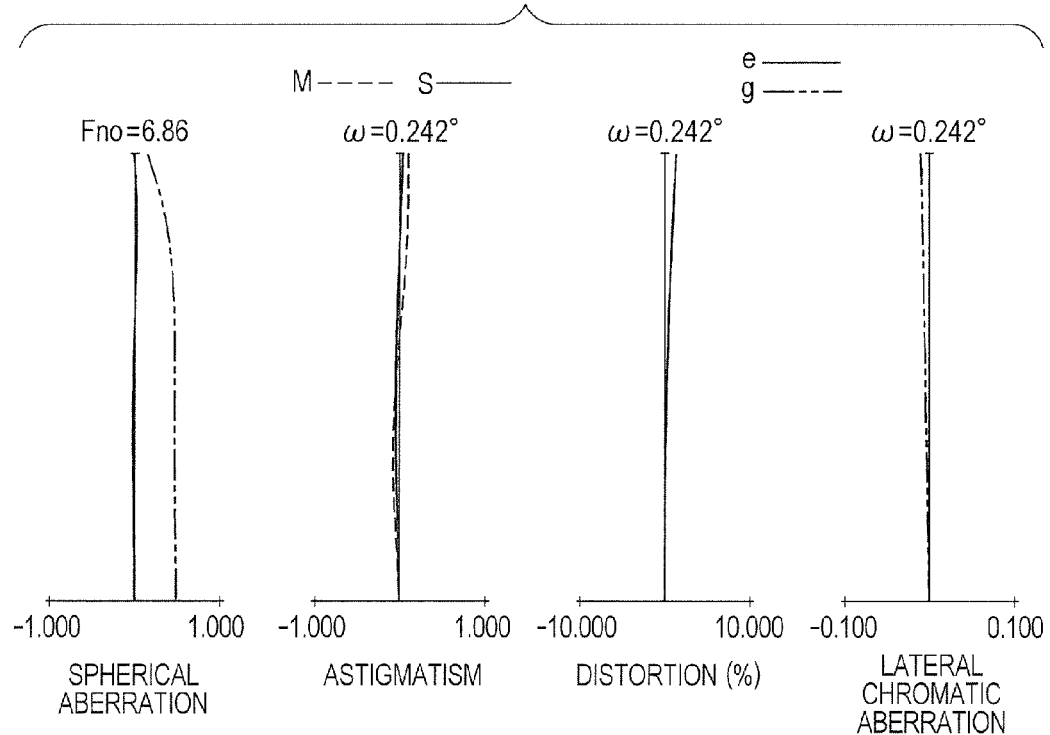
FIG. 35 is a longitudinal aberration diagram of the telephoto end in the state after the displacement of the focal length range toward the long focal length side by 1.4 times according to the sixth numerical embodiment.
Figure 36:
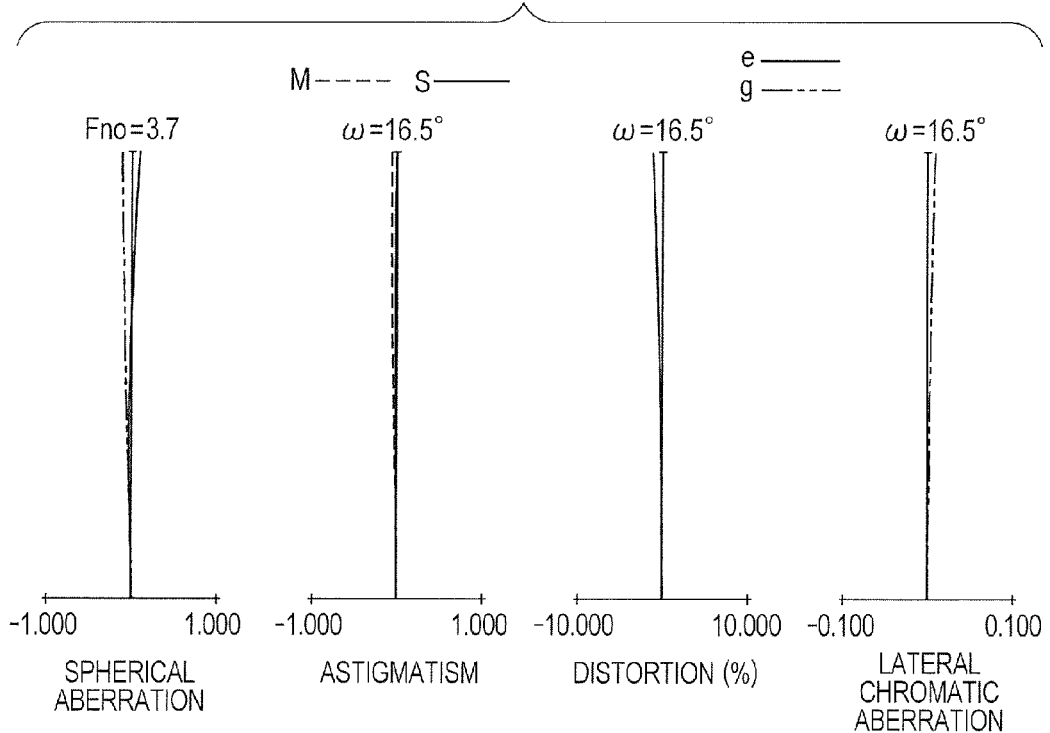
FIG. 36 is a longitudinal aberration diagram of the wide angle end in a state after displacement of the focal length range toward the long focal length side by 2 times according to the sixth numerical embodiment.
Figure 37:
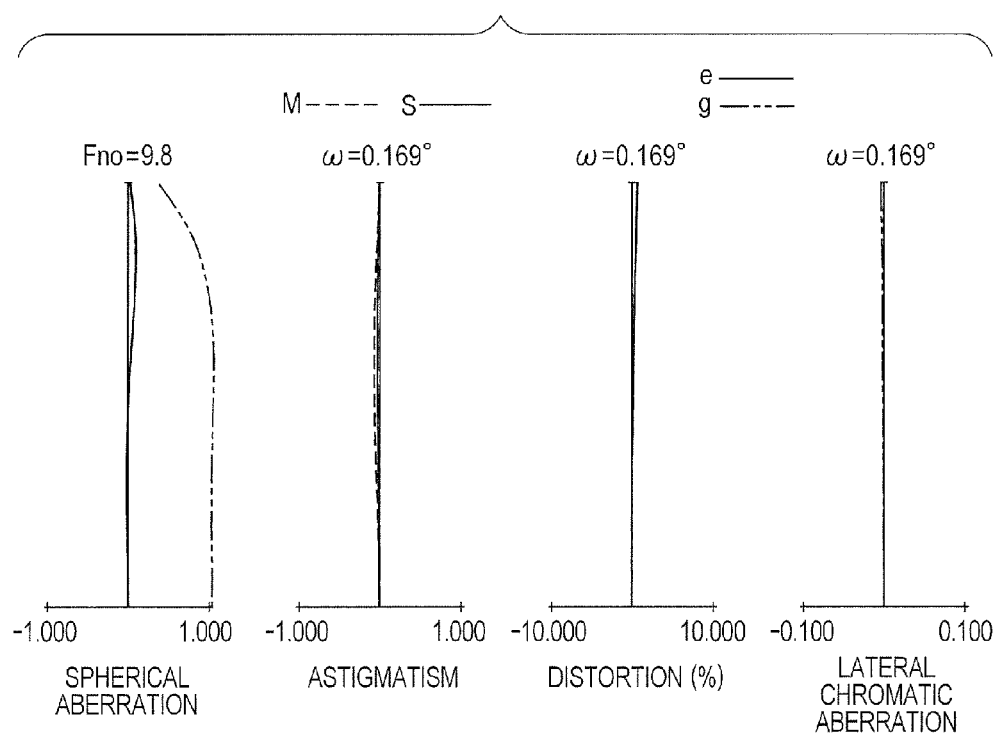
FIG. 37 is a longitudinal aberration diagram of the telephoto end in the state after the displacement of the focal length range toward the long focal length side by 2 times according to the sixth numerical embodiment.

FIG. 31 is a cross-sectional view of lenses when focusing on an object at the infinity at the wide angle end in the zoom lenses according to the sixth embodiment (sixth numerical embodiment) of the present invention. FIGS. 32 and 33 are longitudinal aberration diagrams of the wide angle end and the telephoto end with the focal length range in the reference state according to the sixth numerical embodiment. FIGS. 34 and 35 are longitudinal aberration diagrams of the wide angle end and the telephoto end in a state after displacement of the focal length range toward the long focal length side by 1.4 times according to the sixth numerical embodiment. FIGS. 36 and 37 are longitudinal aberration diagrams of the wide angle end and the telephoto end in a state after displacement of the focal length range toward the long focal length side by 2 times according to the sixth numerical embodiment. The aberration diagrams are longitudinal aberration diagrams when focusing on an object at a distance of 13 m.

In FIG. 31, the first magnification-varying group includes, from the object side to the image side: a first lens unit (focus lens unit) L1 having a positive refractive power; and a second lens unit (variator) L2 for zooming having a negative refractive power configured to move toward the image side during zooming from the wide angle end to the telephoto end. The first magnification-varying group further includes a third lens unit (compensator) L3 having a positive refractive power configured to non-linearly move on the optical axis in conjunction with the movement of the second lens unit L2 to correct an image plane variation associated with zooming.

The second magnification-varying group includes, from the object side to the image side: a fourth lens unit L4 (first sub lens unit) having a negative refractive power; a fifth lens unit L5 (second sub lens unit) having a negative refractive power configured to move to displace the focal length range toward the long focal length side; and a sixth lens unit L6 (third sub lens unit) having a positive refractive power. The sixth lens unit L6 includes a first sub lens unit L61 configured to move on the optical axis in conjunction with the movement of the fifth lens unit L5. The first magnification-varying group and the second magnification-varying group are magnification-varying groups independent of each other.

The first to sixth lens units L1 to L6 according to the present embodiment will be described. The first lens unit L1 corresponds to first to tenth surfaces. The first lens unit L1 includes, from the object side to the image side: a first sub lens unit L11 configured not to move for focusing; and a second sub lens unit L12 configured to perform focusing by moving toward the object side in focusing from the infinity object to the short-distance object. The second lens unit L2 corresponds to eleventh to seventeenth surfaces and comprises four lenses including convex lenses and concave lenses. The third lens unit L3 corresponds to eighteenth to twenty-sixth surfaces and comprises five lenses including convex lenses and concave lenses.

The fourth lens unit L4 corresponds to twenty-eighth to thirty-third surfaces. The fourth lens unit L4 includes, from the object side to the image side, a biconcave lens G1, a meniscus convex lens G2 having a concave surface facing object side, and a biconcave lens G3. The fifth lens unit L5 corresponds to thirty-fourth to forty-first surfaces. The fifth lens unit L5 includes, from the object side to the image side: a cemented lens of a biconvex lens G4 and a meniscus concave lens G5 having a convex surface facing image side; a cemented lens of a biconcave lens G6 and a meniscus convex lens G7 having a concave surface facing image side; and a biconcave lens G8. The sixth lens unit corresponds to forty-second to fifty-second surfaces. The sixth lens unit L6 includes, from the object side to the image side: a biconvex lens G9; a cemented lens of a biconcave lens G10 and a biconvex lens G11; a meniscus convex lens G12 having a concave surface facing image side; a biconvex lens G13; and a meniscus concave lens G14 having a convex surface facing image side. The first sub lens unit L61 includes G9 to G12.

Figure 38A:
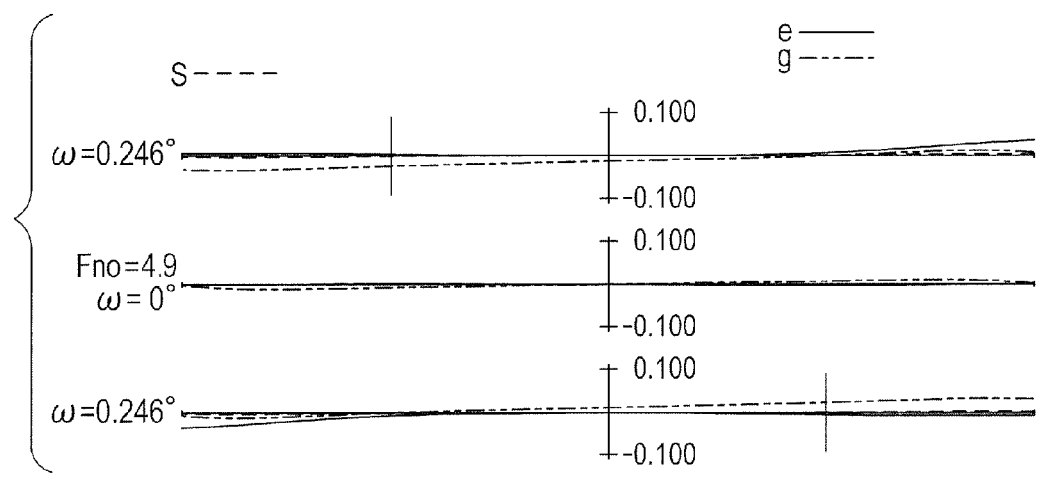
FIG. 38A is a lateral aberration diagram without anti-vibration at the telephoto end with the focal length range in the reference state according to the sixth numerical embodiment.
Figure 38B:
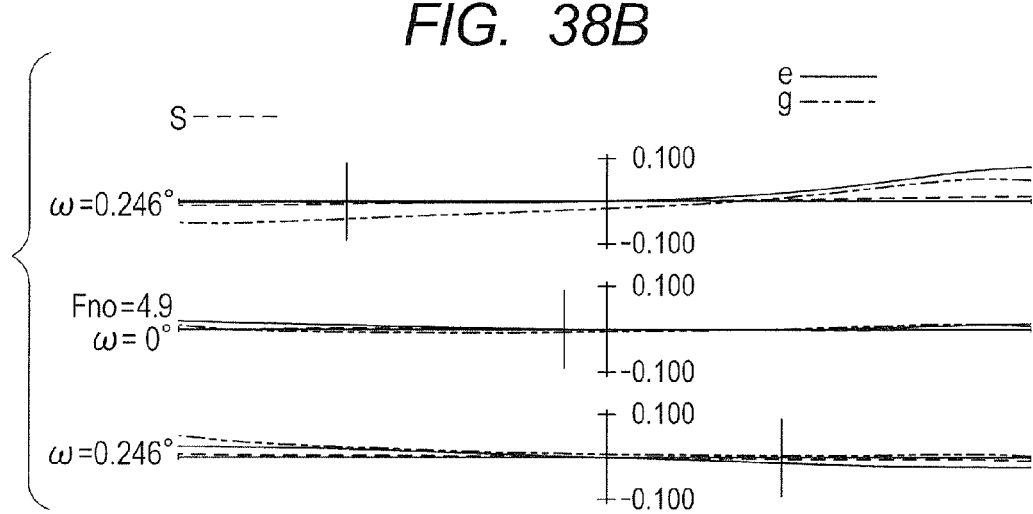
FIG. 38B is a lateral aberration diagram with anti-vibration at the telephoto end with the focal length range in the reference state according to the sixth numerical embodiment.

In the present numerical embodiment, the fifth lens unit L5 is moved in the optical axis direction to displace the focal length range of the zoom lenses toward the long focal length side. Particularly, in the present numerical embodiment, the first sub lens unit L61 can be moved in the optical axis direction in conjunction with the movement of the fifth lens unit L5 to steplessly increase the length of the focal length range of the zoom lenses from 1 times to 2 times. G1 to G3 of the fourth lens unit L4 form an anti-vibration lens unit, and G1 to G3 are configured to move with components in the direction perpendicular to the optical axis to correct a blur of a photographic image when the entire zoom lenses are vibrated. FIG. 38A is a lateral aberration diagram without anti-vibration at the telephoto end with the focal length range in the reference state according to the present numerical embodiment. FIG. 38B is a lateral aberration diagram when the anti-vibration lens unit is decentered by 1.5 mm in the direction perpendicular to the optical axis, at the telephoto end with the focal length range in the reference state according to the present numerical embodiment. The aberration diagrams are lateral aberration diagrams when focusing on an object at a distance of 13 m. G13 and G14 of the sixth lens unit L6 can be moved in the optical axis direction to perform macro image taking or flange back adjustment.

Table 1 indicates values of the conditional expressions in case of the present embodiment. The present embodiment satisfies conditional expressions (1) to (4) and has a function of appropriately setting the refractive power arrangement of the second magnification-varying group and the configuration of the lens units to displace the focal length range of the zoom lenses toward the long focal length side. The present embodiment realizes small zoom lenses with high optical performance.

Seventh Embodiment

Figure 39:
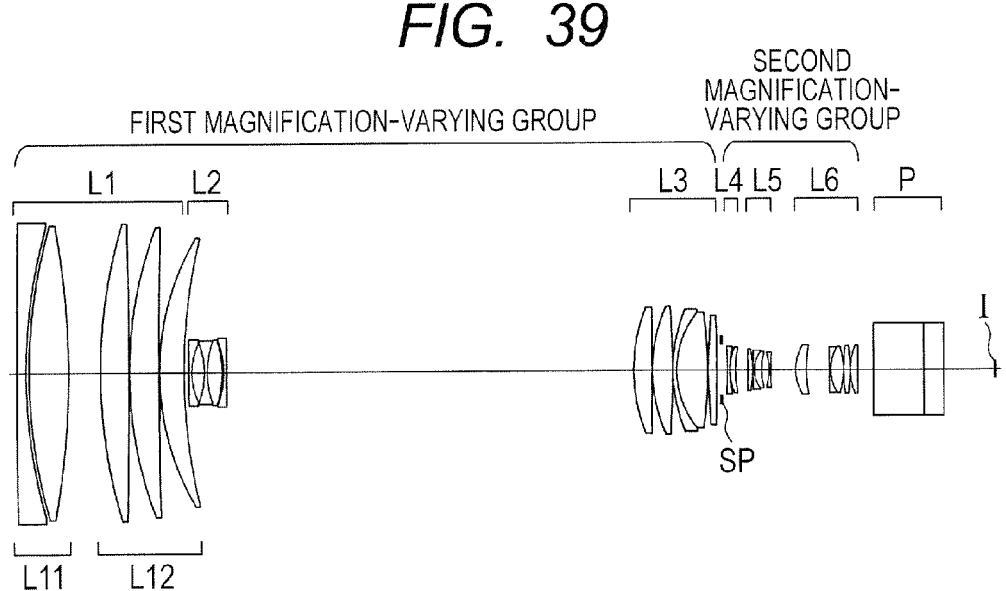
FIG. 39 is a cross-sectional view of lenses at the wide angle end with the focal length range in the reference state according to a seventh numerical embodiment.
Figure 40:
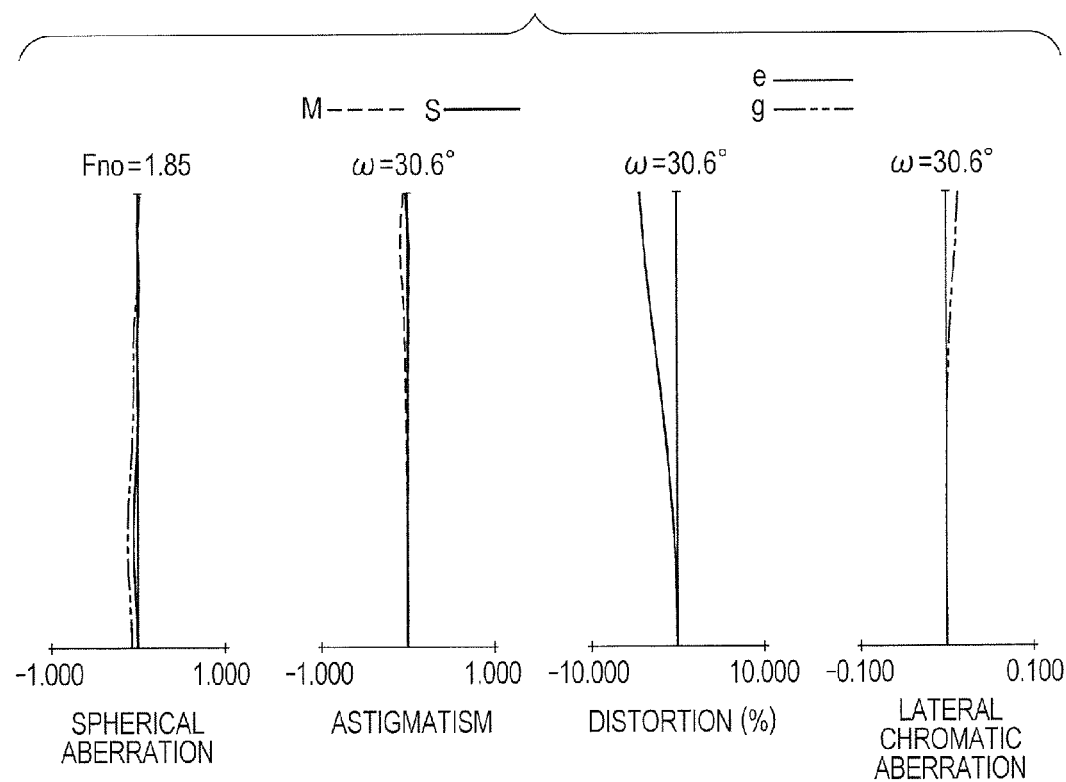
FIG. 40 is a longitudinal aberration diagram of the wide angle end with the focal length range in the reference state according to the seventh numerical embodiment.
Figure 41:
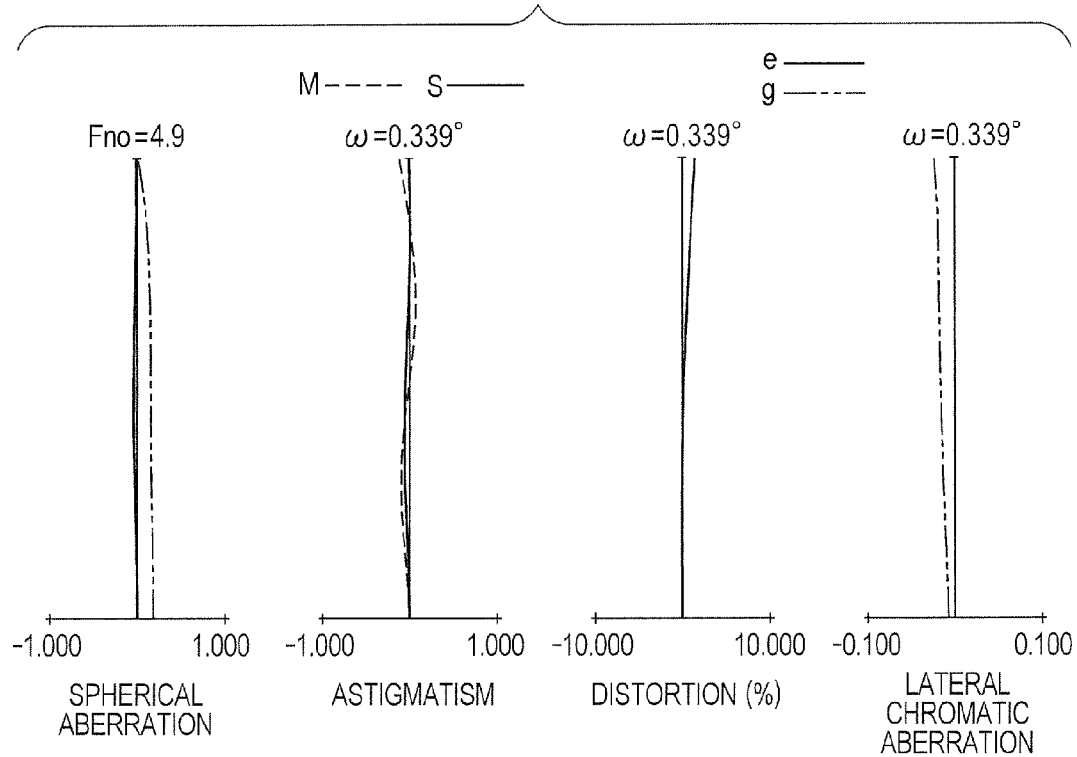
FIG. 41 is a longitudinal aberration diagram of the telephoto end with the focal length range in the reference state according to the seventh numerical embodiment.
Figure 42:
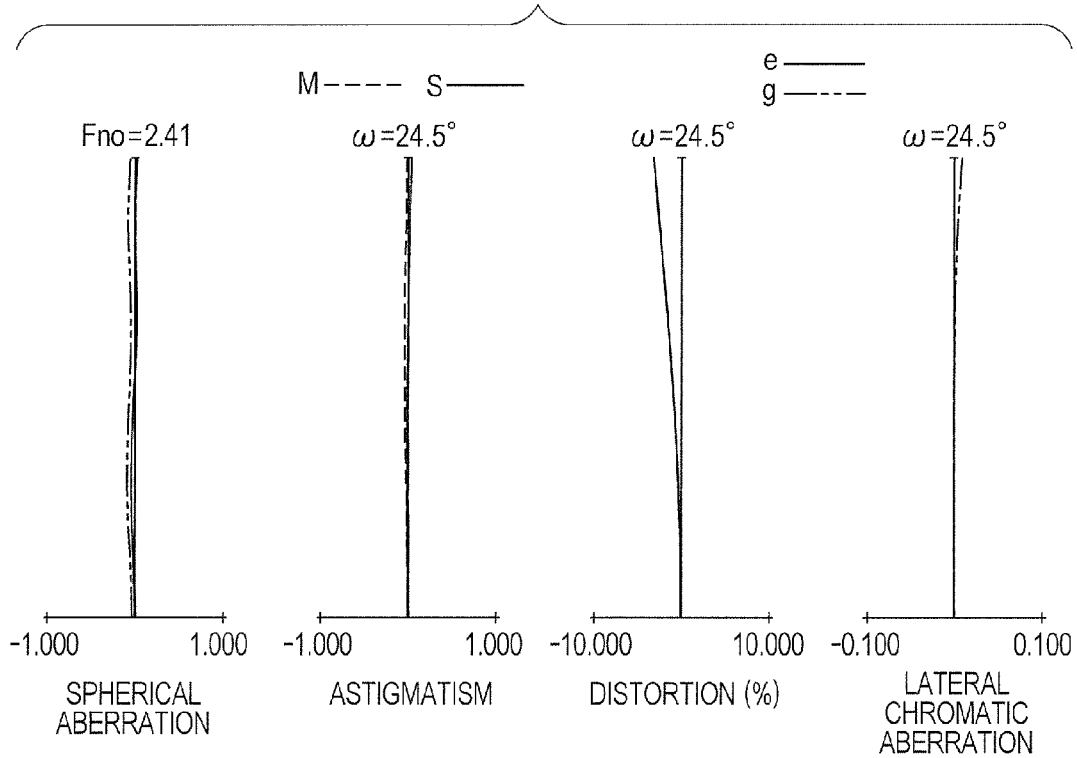
FIG. 42 is a longitudinal aberration diagram of the wide angle end in a state after displacement of the focal length range toward the long focal length side by 1.3 times according to the seventh numerical embodiment.
Figure 43:
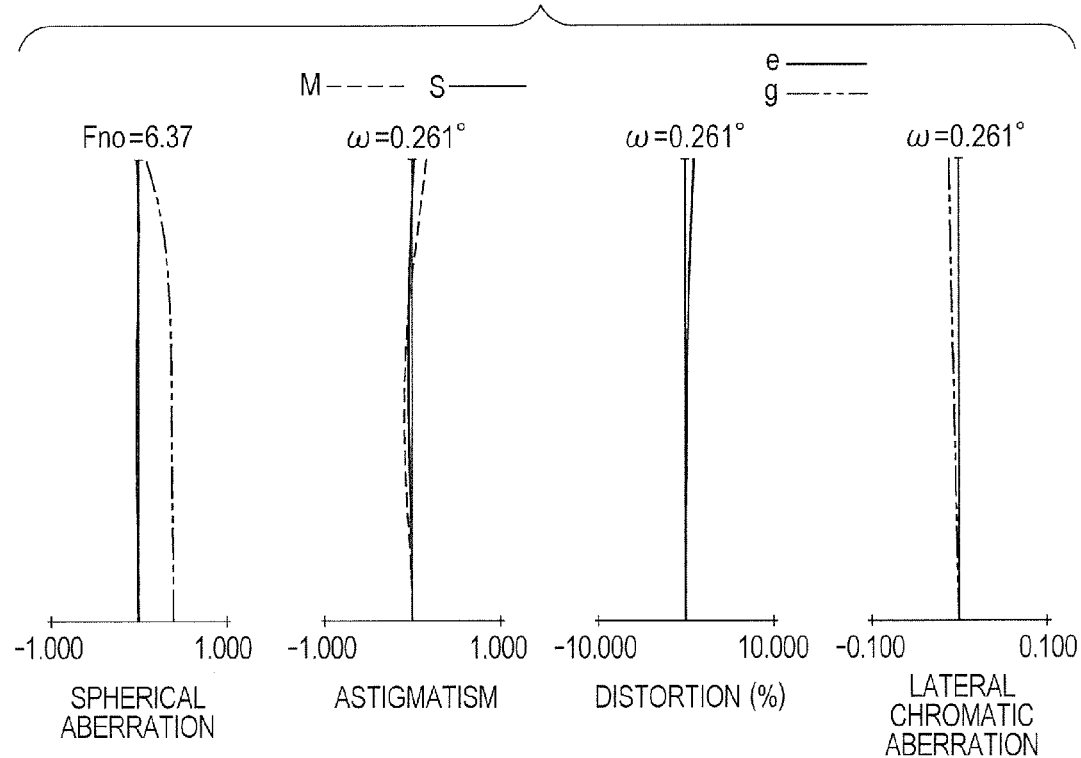
FIG. 43 is a longitudinal aberration diagram of the telephoto end in the state after the displacement of the focal length range toward the long focal length side by 1.3 times according to the seventh numerical embodiment.
Figure 44:
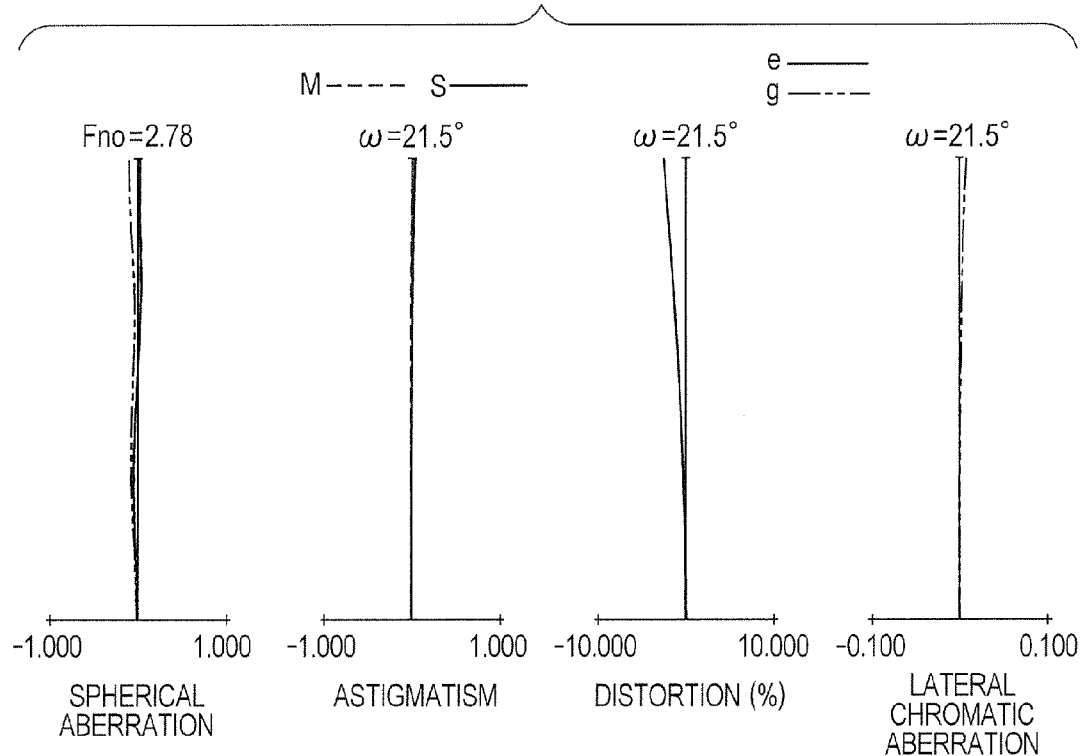
FIG. 44 is a longitudinal aberration diagram of the wide angle end in a state after displacement of the focal length range toward the long focal length side by 1.5 times according to the seventh numerical embodiment.
Figure 45:
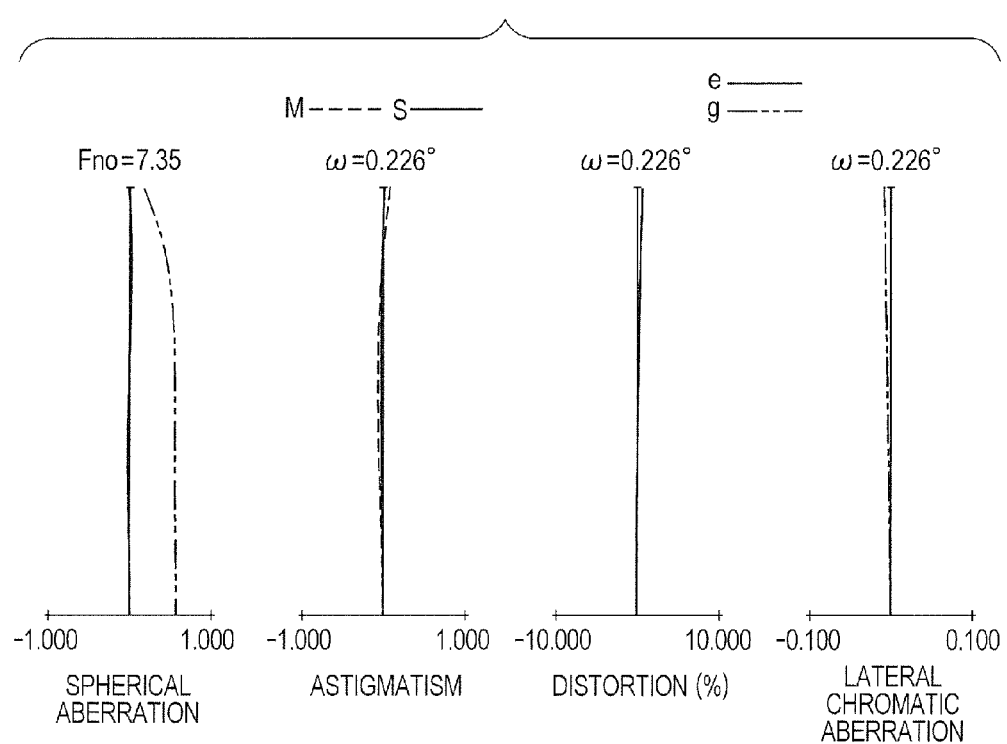
FIG. 45 is a longitudinal aberration diagram of the telephoto end in the state after the displacement of the focal length range toward the long focal length side by 1.5 times according to the seventh numerical embodiment.

FIG. 39 is a cross-sectional view of lenses when focusing on an object at the infinity at the wide angle end in the zoom lenses according to the seventh embodiment (seventh numerical embodiment) of the present invention. FIGS. 40 and 41 are longitudinal aberration diagrams of the wide angle end and the telephoto end with the focal length range in the reference state according to the seventh numerical embodiment. FIGS. 42 and 43 are longitudinal aberration diagrams of the wide angle end and the telephoto end in a state after displacement of the focal length range toward the long focal length side by 1.3 times according to the seventh numerical embodiment. FIGS. 44 and 45 are longitudinal aberration diagrams of the wide angle end and the telephoto end in a state after displacement of the focal length range toward the long focal length side by 1.5 times according to the seventh numerical embodiment. The aberration diagrams are longitudinal aberration diagrams when focusing on an object at a distance of 13 m.

In FIG. 39, the first magnification-varying group includes, from the object side to the image side: a first lens unit (focus lens unit) L1 having a positive refractive power; and a second lens unit (variator) L2 for zooming having a negative refractive power configured to move toward the image side during zooming from the wide angle end to the telephoto end. The first magnification-varying group further includes a third lens unit (compensator) L3 having a positive refractive power configured to non-linearly move on the optical axis in conjunction with the movement of the second lens unit L2 to correct an image plane variation associated with zooming.

The second magnification-varying group includes, from the object side to the image side: a fourth lens unit L4 (first sub lens unit) having a negative refractive power; a fifth lens unit L5 (second sub lens unit) having a negative refractive power configured to move to displace the focal length range toward the long focal length side; and a sixth lens unit L6 (third sub lens unit) having a positive refractive power. The sixth lens unit L6 is configured to move on the optical axis in conjunction with the movement of the fifth lens unit L5. The first magnification-varying group and the second magnification-varying group are magnification-varying groups independent of each other.

The first to sixth lens units L1 to L6 according to the present embodiment will be described. The first lens unit L1 corresponds to first to tenth surfaces. The first lens unit L1 includes, from the object side to the image side: a first sub lens unit L11 configured not to move for focusing; and a second sub lens unit L12 configured to perform focusing by moving toward the object side in focusing from the infinity object to the short-distance object. The second lens unit L2 corresponds to eleventh to seventeenth surfaces and comprises four lenses including convex lenses and concave lenses. The third lens unit L3 corresponds to eighteenth to twenty-sixth surfaces and comprises five lenses including convex lenses and concave lenses.

The fourth lens unit L4 corresponds to twenty-eighth to thirty-first surfaces. The fourth lens unit L4 includes, from the object side to the image side, a biconcave lens G1 and a meniscus convex lens G2 having a concave surface facing object side. The fifth lens unit L5 corresponds to thirty-second to thirty-eighth surfaces. The fifth lens unit L5 includes, from the object side to the image side: a cemented lens of a biconvex lens G3, a meniscus concave lens G4 having a convex surface facing object side and a meniscus convex lens G5 having a concave surface facing image side; and a biconcave lens G6. The sixth lens unit corresponds to thirty-ninth to forty-eighth surfaces. The sixth lens unit L6 includes, from the object side to the image side: a meniscus convex lens G7 having a concave surface facing image side;

a cemented lens of a biconcave lens G8 and a biconvex lens G9; a biconvex lens G10; and a meniscus convex lens G11 having a concave surface facing image side.

Figure 46A:
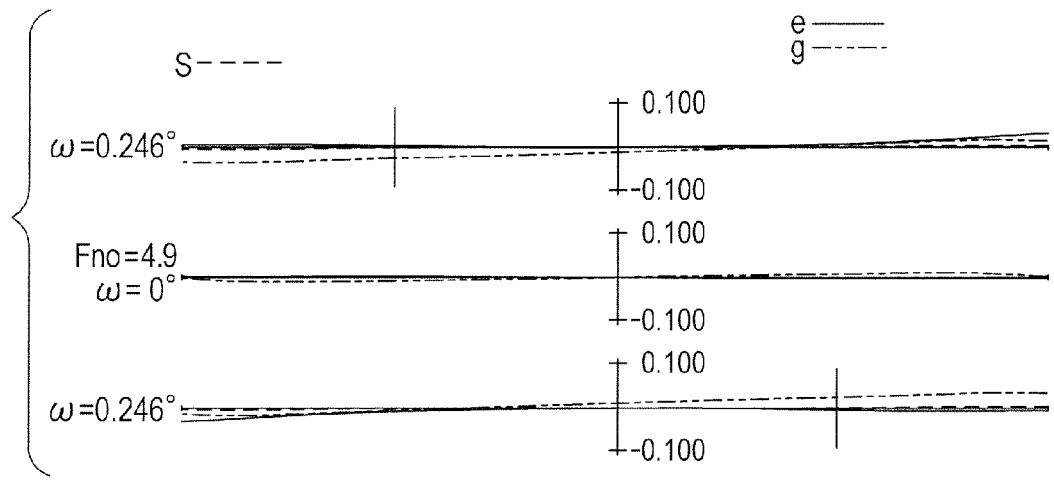
FIG. 46A is a lateral aberration diagram without anti-vibration at the telephoto end with the focal length range in the reference state according to the seventh numerical embodiment.
Figure 46B:
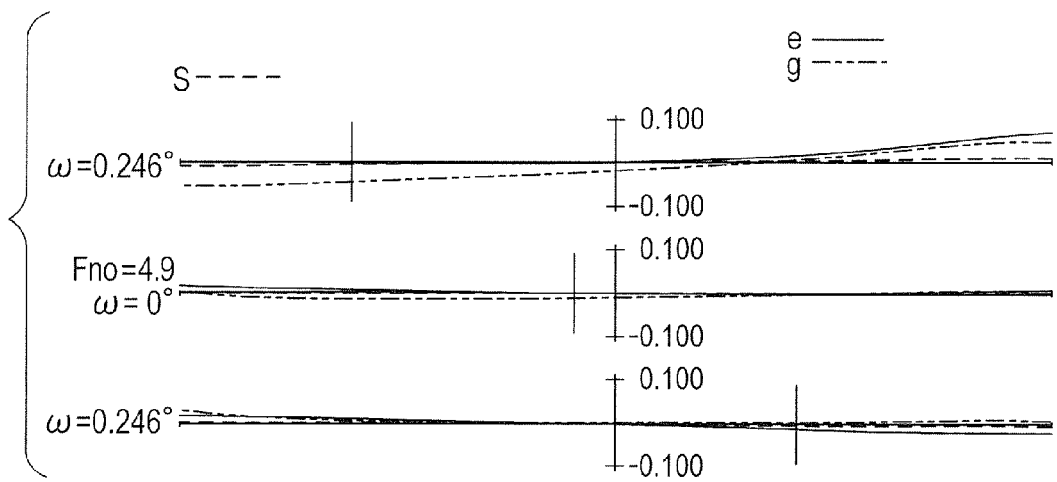
FIG. 46B is a lateral aberration diagram with anti-vibration at the telephoto end with the focal length range in the reference state according to the seventh numerical embodiment.

In the present numerical embodiment, the fifth lens unit L5 is moved in the optical axis direction to displace the focal length range of the zoom lenses toward the long focal length side. Particularly, in the present numerical embodiment, the sixth lens unit L6 can be moved in the optical axis direction in conjunction with the movement of the fifth lens unit L5 to steplessly increase the length of the focal length range of the zoom lenses from 1 times to 1.5 times. G1 and G2 of the fourth lens unit L4 form an anti-vibration lens unit, and G1 and G2 are configured to move with components in the direction perpendicular to the optical axis to correct a blur of a photographic image when the entire zoom lenses are vibrated. FIG. 46A is a lateral aberration diagram without anti-vibration at the telephoto end with the focal length range in the reference state according to the present numerical embodiment. FIG. 46B is a lateral aberration diagram when the anti-vibration lens unit is decentered by 1.5 mm in the direction perpendicular to the optical axis, at the telephoto end with the focal length range in the reference state according to the present numerical embodiment. The aberration diagrams are lateral aberration diagrams when focusing on an object at a distance of 13 m.

Table 1 indicates values of the conditional expressions in case of the present embodiment. The present embodiment satisfies conditional expressions (1) to (4) and has a function of appropriately setting the refractive power arrangement of the second magnification-varying group and the configuration of the lens units to displace the focal length range of the zoom lenses toward the long focal length side. The present embodiment realizes small zoom lenses with high optical performance.

First Numerical Embodiment

| | | Unit mm | | | |
|---|---|---|---|---|---|
| | | Surface Data | | | |
| i | ri | di | ndi | vdi | Effective Diameter |
| 1 | 7000.000 | 6.00 | 1.83400 | 37.2 | 195.69 |
| 2 | 345.379 | 2.00 | | | 189.57 |
| 3 | 345.379 | 25.91 | 1.43387 | 95.1 | 190.61 |
| 4 | −527.375 | 20.74 | | | 191.16 |
| 5 | 331.921 | 18.73 | 1.43387 | 95.1 | 193.34 |
| 6 | −4082.422 | 0.25 | | | 192.86 |
| 7 | 264.903 | 19.29 | 1.43387 | 95.1 | 188.46 |
| 8 | 3887.712 | 0.25 | | | 187.25 |
| 9 | 171.964 | 16.12 | 1.43875 | 94.9 | 174.67 |
| 10 | 367.798 | (Variable) | | | 172.80 |
| 11 | 1547.347 | 2.00 | 2.00330 | 28.3 | 42.77 |
| 12 | 43.466 | 8.24 | | | 37.79 |
| 13 | −55.129 | 2.00 | 1.88300 | 40.8 | 37.77 |
| 14 | 63.246 | 9.63 | 1.92286 | 18.9 | 41.36 |
| 15 | −66.171 | 1.02 | | | 42.37 |
| 16 | −59.413 | 2.00 | 1.77250 | 49.6 | 42.43 |
| 17* | 2736.384 | (Variable) | | | 44.72 |
| 18 | 108.766 | 12.13 | 1.56907 | 71.3 | 81.41 |
| 19* | −3543.181 | 0.20 | | | 81.81 |
| 20 | 100.674 | 13.34 | 1.49700 | 81.5 | 83.34 |
| 21 | −613.181 | 0.20 | | | 82.78 |
| 22 | 103.700 | 2.50 | 1.84666 | 23.8 | 79.37 |
| 23 | 60.132 | 20.33 | 1.43875 | 94.9 | 74.98 |
| 24 | −268.844 | 0.20 | | | 73.52 |
| 25* | 201.189 | 5.73 | 1.43875 | 94.9 | 71.02 |
| 26 | −889.802 | (Variable) | | | 69.63 |
| 27(Stop) | ∞ | 3.00 | | | 32.62 |
| 28 | −795.130 | 1.40 | 1.88300 | 40.8 | 33.85 |
| 29 | 48.746 | 1.24 | | | 32.70 |
| 30 | 33.647 | 4.67 | 1.80809 | 22.8 | 32.70 |
| 31 | 86.428 | 3.50 | | | 31.66 |
| 32 | −103.036 | 1.40 | 1.81600 | 46.6 | 30.97 |
| 33 | 144.571 | 3.00 | | | 30.54 |
| 34 | −150.404 | 1.20 | 1.92286 | 18.9 | 27.36 |
| 35 | −390.707 | 0.21 | | | 27.42 |
| 36 | 87.799 | 4.94 | 1.48749 | 70.2 | 27.42 |
| 37 | −69.407 | (Variable) | | | 27.16 |
| 38 | −99.927 | 5.77 | 1.53172 | 48.8 | 25.45 |
| 39 | −21.877 | 1.00 | 1.91082 | 35.3 | 25.09 |
| 40 | −30.678 | 1.57 | | | 25.45 |
| 41 | −52.501 | 1.00 | 1.88300 | 40.8 | 23.76 |
| 42 | 25.544 | 5.59 | 1.92286 | 18.9 | 23.44 |
| 43 | −288.507 | 1.87 | | | 23.23 |
| 44 | −61.892 | 1.00 | 2.04976 | 27.1 | 22.98 |
| 45 | 70.480 | (Variable) | | | 23.22 |
| 46 | 199.059 | 5.95 | 1.69680 | 55.5 | 34.73 |
| 47 | −61.024 | 2.50 | | | 35.59 |
| 48 | 259.198 | 5.93 | 1.48749 | 70.2 | 36.46 |
| 49 | −51.881 | 0.20 | | | 36.57 |
| 50 | 46.102 | 9.84 | 1.43875 | 94.9 | 34.52 |

-continued

| | | Unit mm | | | |
|---|---|---|---|---|---|
| 51 | −47.605 | 1.50 | 1.85478 | 24.8 | 32.93 |
| 52 | −260.698 | 10.00 | | | 32.30 |
| 53 | ∞ | 33.00 | 1.60859 | 46.4 | 60.00 |
| 54 | ∞ | 13.20 | 1.51633 | 64.2 | 60.00 |
| 55 | ∞ | 12.00 | | | 60.00 |
| Image Plane | ∞ | | | | |

Aspherical Data

Seventeenth Surface

K = −2.53234e+004 A 4 = −4.13015e−007 A 6 = −2.14627e−010
A 8 = 2.26588e−013
Nineteenth Surface K = 5.22565e+003 A 4 = 8.81676e−008 A 6 = 1.58180e−012
A 8 = 6.14872e−015
Twenty-Fifth Surface K = −9.48244e+000 A 4 = −7.57187e−007 A 6 = −1.54476e−010
A 8 = 2.42122e−014

Various Data
Zoom Ratio 100.00

| Focal Length | 9.30 | 929.99 | 18.60 | 1859.99 |
|---|---|---|---|---|
| F-Number | 1.85 | 4.90 | 3.70 | 9.80 |
| Half Angle of View | 30.60 | 0.34 | 16.47 | 0.17 |
| Image Height | 5.50 | 5.50 | 5.50 | 5.50 |
| Full Length of Lens | 622.00 | 622.00 | 622.00 | 622.00 |
| BF | 12.00 | 12.00 | 12.00 | 12.00 |
| d10 | 3.07 | 176.64 | 3.07 | 176.64 |
| d17 | 266.10 | 1.96 | 266.10 | 1.96 |
| d26 | 3.00 | 93.57 | 3.00 | 93.57 |
| d37 | 4.20 | 4.20 | 22.60 | 22.60 |
| d45 | 20.31 | 20.31 | 1.91 | 1.91 |
| Entrance Pupil Position | 124.58 | 11114.47 | 124.58 | 11114.47 |
| Exit Pupil Position | 119.58 | 119.58 | −170.21 | −170.21 |
| Front Principal Point Position | 134.68 | 20084.02 | 141.28 | −6011.66 |
| Rear Principal Point Position | 2.70 | −917.99 | −6.60 | −1847.99 |

Zoom Lens Unit Data

| Unit | Start Surface | Focal Length | Lens Configuration Length | Front Principal Point Position | Rear Principal Point Position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | −127.92 | 24.56 | −0.31 | −20.64 |
| 5 | 38 | −26.02 | 17.79 | 9.36 | −1.73 |
| 6 | 46 | 33.73 | 25.96 | 5.24 | −12.52 |
| 7 | 53 | ∞ | 46.20 | 14.58 | −14.58 |

Second Numerical Embodiment

Unit mm

Surface Data

| i | ri | di | ndi | vdi | Effective Diameter |
|---|---|---|---|---|---|
| 1 | 5434.024 | 6.00 | 1.83400 | 37.2 | 210.01 |
| 2 | 356.636 | 2.14 | | | 202.50 |
| 3 | 360.442 | 27.02 | 1.43387 | 95.1 | 202.12 |
| 4 | −580.457 | 28.08 | | | 201.30 |
| 5 | 339.842 | 20.28 | 1.43387 | 98.1 | 204.28 |
| 6 | −3786.156 | 0.25 | | | 203.80 |
| 7 | 253.961 | 20.83 | 1.43387 | 95.1 | 198.55 |

-continued

| Unit mm | | | | | |
|---|---|---|---|---|---|
| 8 | 2001.569 | 1.20 | | | 197.27 |
| 9 | 216.571 | 12.49 | 1.49700 | 81.5 | 186.08 |
| 10 | 372.539 | (Variable) | | | 184.00 |
| 11* | −73071.610 | 2.20 | 2.00330 | 28.3 | 46.74 |
| 12 | 56.188 | 8.60 | | | 41.64 |
| 13 | −63.326 | 1.40 | 1.83400 | 37.2 | 40.46 |
| 14 | 62.711 | 8.69 | 1.95906 | 17.5 | 39.57 |
| 15 | −66.787 | 1.52 | | | 39.18 |
| 16 | −51.490 | 1.60 | 1.88300 | 40.8 | 38.36 |
| 17 | 226.272 | (Variable) | | | 37.87 |
| 18 | 211.694 | 7.53 | 1.59522 | 67.7 | 61.51 |
| 19* | −243.068 | 0.50 | | | 62.18 |
| 20 | 273.486 | 8.73 | 1.59522 | 67.7 | 62.94 |
| 21 | −147.447 | 0.20 | | | 63.04 |
| 22 | 778.098 | 2.50 | 1.84666 | 23.8 | 62.12 |
| 23 | 120.295 | 6.01 | 1.43875 | 94.9 | 61.22 |
| 24 | 1046.365 | (Variable) | | | 61.10 |
| 25 | 104.799 | 2.50 | 1.84666 | 23.8 | 60.83 |
| 26 | 76.714 | 11.02 | 1.59522 | 67.7 | 59.63 |
| 27* | −169.484 | (Variable) | | | 59.08 |
| 28(Stop) | ∞ | 2.00 | | | 29.37 |
| 29 | −354.247 | 1.40 | 1.83481 | 42.7 | 32.32 |
| 30 | 44.487 | 1.24 | | | 31.25 |
| 31 | 30.398 | 4.67 | 1.84666 | 23.8 | 31.41 |
| 32 | 117.481 | 3.50 | | | 30.55 |
| 33 | −82.167 | 1.40 | 1.81600 | 46.6 | 29.56 |
| 34 | 99.048 | 3.00 | | | 28.99 |
| 35 | 48.874 | 4.85 | 1.51633 | 64.1 | 25.62 |
| 36 | −50.768 | 0.15 | | | 25.24 |
| 37 | −72.788 | 1.40 | 1.71736 | 29.5 | 24.77 |
| 38 | 1989.666 | (Variable) | | | 24.19 |
| 39 | −41.728 | 4.99 | 1.53172 | 48.8 | 23.78 |
| 40 | −17.319 | 1.00 | 1.88300 | 40.8 | 23.70 |
| 41 | −23.904 | 0.20 | | | 24.41 |
| 42 | −70.842 | 1.00 | 1.91082 | 35.3 | 23.07 |
| 43 | 22.662 | 6.14 | 1.92286 | 18.9 | 22.58 |
| 44 | −102.518 | 1.92 | | | 22.32 |
| 45 | −41.328 | 1.00 | 2.04976 | 27.1 | 23.86 |
| 46 | 60.744 | (Variable) | | | 22.16 |
| 47 | 137.341 | 9.41 | 1.51742 | 52.4 | 35.96 |
| 48 | −45.085 | 1.85 | | | 37.62 |
| 49 | 190.180 | 6.79 | 1.49700 | 81.5 | 38.67 |
| 50 | −50.246 | 0.20 | | | 38.73 |
| 51 | 51.955 | 9.25 | 1.43875 | 94.9 | 35.99 |
| 52 | −42.120 | 1.50 | 2.00069 | 25.5 | 34.89 |
| 53 | −117.044 | 10.00 | | | 34.64 |
| 54 | ∞ | 33.00 | 1.60859 | 46.4 | 60.00 |
| 55 | ∞ | 13.20 | 1.51633 | 64.2 | 60.00 |
| 56 | ∞ | 13.00 | | | 60.00 |
| Image Plane | ∞ | | | | |

Aspherical Data

Eleventh Surface

K = 1.69407e+006 A 4 = 7.95307e−007 A 6 = −9.70819e−011
A 8 = 2.85357e−013

Nineteenth Surface

K = −1.45313e+001 A 4 = 1.51572e−007 A 6 = 2.29624e−011
A 8 = −3.73357e−015

Twenty-Seventh Surface

K = 7.92880e+000 A 4 = 4.02021e−007 A 6 = 2.13607e−011
A 8 = 1.56802e−014

Various Data
Zoom Ratio 100.00

| | | | | |
|---|---|---|---|---|
| Focal Length | 9.30 | 930.07 | 18.60 | 1859.99 |
| F-Number | 1.86 | 4.65 | 3.72 | 9.30 |
| Half Angle of View | 30.60 | 0.34 | 16.47 | 0.17 |
| Image Height | 5.50 | 5.50 | 5.50 | 5.50 |
| Full Length of Lens | 650.00 | 650.00 | 650.00 | 649.99 |
| BF | 13.00 | 13.00 | 13.00 | 12.99 |
| d10 | 2.78 | 206.13 | 2.78 | 206.13 |
| d17 | 263.53 | 2.12 | 263.53 | 2.12 |

-continued

| Unit mm | | | | |
|---|---|---|---|---|
| d24 | 37.64 | 9.45 | 37.64 | 9.45 |
| d27 | 3.00 | 89.26 | 3.00 | 89.26 |
| d38 | 2.83 | 2.83 | 18.71 | 18.71 |
| d46 | 20.88 | 20.88 | 5.00 | 5.00 |
| Entrance Pupil Position | 133.88 | 13226.99 | 133.88 | 13226.99 |
| Exit Pupil Position | 93.70 | 93.70 | −335.79 | −335.79 |
| Front Principal Point Position | 144.25 | 24875.67 | 151.49 | 5167.95 |
| Rear Principal Point Position | 3.70 | −917.07 | −5.60 | −1847.00 |

| Zoom Lens Unit Data | | | | | |
|---|---|---|---|---|---|
| Unit | Start Surface | Focal Length | Lens Configuration Length | Front Principal Point Position | Rear Principal Point Position |
| 1 | 1 | 268.44 | 118.28 | 68.00 | −19.95 |
| 2 | 11 | −24.98 | 24.01 | 6.61 | −9.08 |
| 3 | 18 | 115.10 | 25.47 | 3.39 | −13.00 |
| 4 | 25 | 121.89 | 13.52 | 3.00 | −5.41 |
| 5 | 28 | −144.68 | 23.61 | 4.18 | −13.93 |
| 6 | 39 | −22.46 | 16.26 | 7.08 | −2.14 |
| 7 | 47 | 33.38 | 29.00 | 7.90 | −12.29 |
| 8 | 54 | ∞ | 46.20 | 14.58 | −14.58 |

Third Numerical Embodiment

| Unit mm | | | | |
|---|---|---|---|---|
| Surface Data | | | | |
| i | ri | di | ndi | vdi | Effective Diameter |
|---|---|---|---|---|---|
| 1 | 404.629 | 2.30 | 1.85478 | 24.8 | 77.24 |
| 2 | 105.179 | 3.61 | | | 76.32 |
| 3 | 108.777 | 11.50 | 1.43875 | 94.9 | 78.09 |
| 4 | −269.292 | 0.15 | | | 78.20 |
| 5 | 111.678 | 9.05 | 1.53775 | 74.7 | 77.99 |
| 6 | −982.312 | 0.15 | | | 77.53 |
| 7 | 67.290 | 7.50 | 1.76385 | 48.5 | 72.19 |
| 8 | 161.936 | (Variable) | | | 71.40 |
| 9* | 5000.00 | 1.20 | 1.88300 | 40.8 | 27.49 |
| 10 | 17.616 | 6.50 | | | 22.45 |
| 11 | −35.109 | 7.00 | 1.80809 | 22.8 | 22.11 |
| 12 | −13.732 | 1.00 | 1.88300 | 40.8 | 22.23 |
| 13 | 709.372 | 0.15 | | | 23.16 |
| 14 | 60.062 | 3.00 | 1.60342 | 38.0 | 23.51 |
| 15 | −133.969 | (Variable) | | | 23.54 |
| 16* | 78.483 | 6.31 | 1.60311 | 60.6 | 29.31 |
| 17 | −46.489 | 0.30 | | | 29.61 |
| 18 | −44.453 | 1.00 | 1.80000 | 29.8 | 29.57 |
| 19 | −133.060 | (Variable) | | | 30.08 |
| 20 | 45.097 | 1.00 | 1.85478 | 24.8 | 31.70 |
| 21 | 29.152 | 8.00 | 1.43875 | 94.9 | 31.03 |
| 22 | −83.546 | 0.16 | | | 31.09 |
| 23 | 66.593 | 6.45 | 1.60311 | 60.6 | 30.65 |
| 24* | −53.784 | (Variable) | | | 29.94 |
| 25(Stop) | ∞ | 1.75 | | | 21.52 |
| 26 | −55.700 | 0.80 | 1.81600 | 46.6 | 20.93 |
| 27 | 24.618 | 0.20 | | | 20.09 |
| 28 | 20.370 | 6.00 | 1.80809 | 22.8 | 20.37 |
| 29 | −44.187 | 1.50 | | | 19.66 |
| 30 | −29.303 | 0.80 | 1.75500 | 52.3 | 18.34 |
| 31 | 30.662 | 5.95 | | | 17.47 |
| 32 | −106.467 | 1.00 | 1.92286 | 18.9 | 17.54 |
| 33 | 39.036 | 5.72 | 1.58913 | 61.1 | 17.76 |
| 34 | −19.434 | (Variable) | | | 18.27 |
| 35 | −231.927 | 1.00 | 1.88300 | 40.8 | 17.02 |
| 36 | 15.709 | 4.36 | 1.80809 | 22.8 | 16.59 |
| 37 | 68.046 | 1.68 | | | 16.39 |
| 38 | −49.798 | 1.00 | 2.00100 | 29.1 | 16.41 |
| 39 | 393.495 | (Variable) | | | 16.76 |

-continued

| Unit mm | | | | | |
|---|---|---|---|---|---|
| 40 | −111.985 | 3.37 | 1.62041 | 60.3 | 30.33 |
| 41 | −51.110 | 0.20 | | | 31.51 |
| 42 | −2541.019 | 3.53 | 1.51633 | 64.1 | 33.08 |
| 43 | −91.131 | 2.00 | | | 33.86 |
| 44 | 60.098 | 7.55 | 1.49700 | 81.5 | 36.38 |
| 45 | −62.540 | 0.20 | | | 36.45 |
| 46 | 41.567 | 9.02 | 1.49700 | 81.5 | 34.76 |
| 47 | −57.111 | 1.20 | 1.85478 | 24.8 | 33.50 |
| 48 | −345.579 | 5.00 | | | 32.71 |
| 49 | ∞ | 33.00 | 1.60859 | 46.4 | 40.00 |
| 50 | ∞ | 13.20 | 1.51633 | 64.1 | 40.00 |
| 51 | ∞ | 6.00 | | | 40.00 |
| Image Plane | ∞ | | | | |

Aspherical Data

Ninth Surface

K = 0.00000e+000 A 4 = 6.78173e−006 A 6 = −1.64418e−008
A 8 = 4.33099e−011 A10 = −8.06613e−014

Sixteenth Surface

K = 0.00000e+000 A 4 = −1.20290e−006 A 6 = 3.64208e−010
A 8 = −5.87647e−013 A10 = −3.85828e−015

Twenty-Fourth Surface

K = 0.00000e+000 A 4 = 5.44605e−006 A 6 = −5.69542e−009
A 8 = 1.00557e−011 A10 = −2.04577e−014

Various Data
Zoom Ratio 20.00

| Focal Length | 9.00 | 180.01 | 18.00 | 360.01 |
|---|---|---|---|---|
| F-Number | 1.90 | 2.39 | 3.80 | 4.78 |
| Half Angle of View | 31.43 | 1.75 | 16.99 | 0.88 |
| Image Height | 5.50 | 5.50 | 5.50 | 5.50 |
| Full Length of Lens | 298.00 | 298.00 | 298.00 | 298.00 |
| BF | 6.00 | 6.00 | 6.00 | 6.00 |
| d8 | 0.95 | 56.06 | 0.95 | 56.06 |
| d15 | 81.91 | 4.56 | 81.91 | 4.56 |
| d19 | 1.52 | 22.78 | 1.52 | 22.78 |
| d24 | 1.55 | 2.52 | 1.55 | 2.52 |
| d34 | 2.00 | 2.00 | 17.77 | 17.77 |
| d39 | 17.27 | 17.27 | 1.50 | 1.50 |
| Entrance Pupil Position | 45.67 | 1132.10 | 45.67 | 1132.10 |
| Exit Pupil Position | 59.49 | 59.49 | −309.32 | −309.32 |
| Front Principal Point Position | 56.19 | 1917.83 | 62.64 | 1081.07 |
| Rear Principal Point Position | −3.00 | −174.01 | −12.00 | −354.01 |

Zoom Lens Unit Data

| Unit | Start Surface | Focal Length | Lens Configuration Length | Front Principal Point Position | Rear Principal Point Position |
|---|---|---|---|---|---|
| 1 | 1 | 81.00 | 34.71 | 17.32 | −5.40 |
| 2 | 9 | −15.10 | 18.85 | 1.26 | −12.67 |
| 3 | 16 | 115.00 | 7.61 | 0.43 | −4.37 |
| 4 | 20 | 35.00 | 15.61 | 6.80 | −3.96 |
| 5 | 25 | −60.72 | 23.73 | −6.80 | −31.71 |
| 6 | 35 | −22.30 | 8.04 | 3.25 | −1.74 |
| 7 | 40 | 28.56 | 27.06 | 7.62 | −10.98 |
| 8 | 49 | ∞ | 46.20 | 14.58 | −14.58 |

Fourth Numerical Embodiment

| | | Unit mm | | | |
|---|---|---|---|---|---|
| | | Surface Data | | | |
| i | ri | di | ndi | vdi | Effective Diameter |
| 1 | 359.009 | 4.79 | 1.77250 | 49.6 | 142.99 |
| 2 | 99.087 | 35.13 | | | 123.68 |
| 3 | −166.026 | 4.50 | 1.77250 | 49.6 | 122.62 |
| 4 | −1358.605 | 0.15 | | | 123.14 |
| 5 | 237.232 | 9.26 | 1.71736 | 29.5 | 123.07 |
| 6 | 511.569 | 9.56 | | | 121.98 |
| 7 | −1374.841 | 14.80 | 1.49700 | 81.5 | 120.97 |
| 8 | −153.882 | 0.20 | | | 120.53 |
| 9* | −776.309 | 4.40 | 1.80518 | 25.4 | 113.49 |
| 10 | 298.186 | 13.12 | 1.49700 | 81.5 | 110.15 |
| 11 | −327.968 | 34.74 | | | 109.23 |
| 12 | 680.477 | 17.74 | 1.49700 | 81.5 | 124.00 |
| 13 | −179.036 | 0.15 | | | 124.74 |
| 14 | 219.533 | 12.99 | 1.49700 | 81.5 | 123.41 |
| 15 | −1580.265 | 0.15 | | | 122.72 |
| 16* | 126.169 | 9.69 | 1.62041 | 60.3 | 116.49 |
| 17 | 244.229 | (Variable) | | | 115.03 |
| 18 | 88.720 | 1.50 | 1.88300 | 40.8 | 42.77 |
| 19 | 45.850 | 6.07 | | | 40.55 |
| 20 | −326.193 | 1.50 | 1.77250 | 49.6 | 40.33 |
| 21 | 114.162 | 6.05 | | | 39.87 |
| 22 | −54.325 | 1.50 | 1.77250 | 49.6 | 39.90 |
| 23 | −742.511 | 8.27 | 1.80809 | 22.8 | 41.78 |
| 24 | −39.850 | 0.69 | | | 42.65 |
| 25 | −37.414 | 1.50 | 1.81600 | 46.6 | 42.56 |
| 26 | −296.245 | (Variable) | | | 45.59 |
| 27 | −818.587 | 5.05 | 1.49831 | 65.0 | 53.50 |
| 28* | −102.240 | 0.20 | | | 54.37 |
| 29 | 270.496 | 2.50 | 1.64769 | 33.8 | 56.53 |
| 30 | 60.983 | 13.04 | 1.58913 | 61.2 | 57.88 |
| 31 | −154.937 | 0.20 | | | 58.50 |
| 32 | 177.531 | 9.06 | 1.60311 | 60.7 | 59.11 |
| 33 | −111.935 | 2.50 | 1.84666 | 23.9 | 58.95 |
| 34 | −246.081 | 0.20 | | | 59.06 |
| 35 | 130.889 | 8.80 | 1.48749 | 70.2 | 58.19 |
| 36 | −161.923 | (Variable) | | | 57.42 |
| 37(Stop) | ∞ | 2.00 | | | 30.07 |
| 33 | −125.520 | 1.40 | 1.88300 | 40.8 | 29.42 |
| 39 | 80.252 | 0.50 | | | 28.78 |
| 40 | 29.650 | 4.67 | 1.92286 | 18.9 | 28.74 |
| 41 | 99.491 | 2.00 | | | 27.73 |
| 42 | −3026.600 | 1.00 | 1.92286 | 18.9 | 26.96 |
| 43 | 34.888 | 5.80 | 1.51633 | 64.1 | 25.67 |
| 44 | −96.815 | (Variable) | | | 25.01 |
| 45 | −390.434 | 4.23 | 1.92286 | 18.9 | 23.82 |
| 46 | −30.603 | 0.80 | 1.77250 | 49.6 | 23.30 |
| 47 | 49.596 | 3.00 | | | 21.78 |
| 48 | −38.202 | 0.80 | 1.88300 | 40.8 | 21.72 |
| 49 | 21.587 | 9.00 | 1.71736 | 29.5 | 22.47 |
| 50 | −29.030 | 5.41 | | | 23.40 |
| 51 | −26.327 | 1.00 | 2.00100 | 29.1 | 22.57 |
| 52 | 740.877 | (Variable) | | | 23.99 |
| 53 | 1454.889 | 7.49 | 1.76385 | 48.5 | 37.38 |
| 54 | −40.132 | 7.64 | | | 38.32 |
| 55 | −83.962 | 4.45 | 1.48749 | 70.2 | 38.29 |
| 56 | −41.974 | 0.20 | | | 38.59 |
| 57 | 93.344 | 8.57 | 1.43875 | 94.9 | 36.63 |
| 58 | −37.668 | 1.00 | 1.92286 | 20.9 | 35.92 |
| 59 | −90.086 | 0.20 | | | 36.10 |
| 60 | 46.984 | 5.01 | 1.48749 | 70.2 | 34.53 |
| 61 | 533.449 | 10.00 | | | 33.63 |
| 62 | ∞ | 33.00 | 1.60859 | 46.4 | 60.00 |
| 63 | ∞ | 13.20 | 1.51633 | 64.2 | 60.00 |
| 64 | ∞ | 13.00 | | | 60.00 |
| Image Plane | ∞ | | | | |

-continued

| Unit mm |
|---|
| Aspherical Data |

Twenty-Eighth Surface

K = 0.00000e+000 A 4 = 2.21807e−007 A 6 = 2.81772e−010
A 8 = −3.88958e−013 A10 = 2.11872e−016

| Various Data Zoom Ratio 18.50 | | | | |
|---|---|---|---|---|
| Focal Length | 7.20 | 133.20 | 14.40 | 266.40 |
| F-Number | 1.60 | 1.85 | 3.20 | 3.70 |
| Half Angle of View | 37.38 | 2.36 | 20.90 | 1.18 |
| Image Height | 5.50 | 5.50 | 5.50 | 5.50 |
| Full Length of Lens | 558.00 | 558.00 | 558.00 | 558.00 |
| BF | 13.00 | 13.00 | 13.00 | 13.00 |
| d17 | 5.15 | 105.39 | 5.15 | 105.39 |
| d26 | 148.94 | 4.49 | 148.94 | 4.49 |
| d36 | 2.15 | 46.35 | 2.15 | 46.35 |
| d44 | 1.50 | 1.50 | 12.02 | 12.02 |
| d52 | 14.99 | 14.99 | 4.47 | 4.47 |
| Entrance Pupil Position | 96.21 | 505.86 | 96.21 | 505.86 |
| Exit Pupil Position | 69.46 | 69.46 | 686.86 | 686.86 |
| Front Principal Point Position | 104.33 | 953.32 | 110.92 | 877.58 |
| Rear Principal Point Position | 5.80 | −120.20 | −1.40 | −253.40 |

| Zoom Lens Unit Data | | | | | |
|---|---|---|---|---|---|
| Unit | Start Surface | Focal Length | Lens Configuration Length | Front Principal Point Position | Rear Principal Point Position |
| 1 | 1 | 103.68 | 171.30 | 115.93 | 63.15 |
| 2 | 18 | −29.50 | 27.07 | 8.01 | −11.83 |
| 3 | 27 | 52.50 | 41.54 | 15.18 | −12.83 |
| 4 | 37 | −506.28 | 17.37 | 13.38 | 1.13 |
| 5 | 45 | −14.88 | 24.24 | 8.77 | −5.91 |
| 6 | 53 | 31.31 | 34.56 | 12.08 | −15.36 |
| 7 | 62 | ∞ | 46.20 | 14.58 | −14.58 |

Fifth Numerical Embodiment

| Unit mm |
|---|
| Surface Data |

| i | ri | di | ndi | vdi | Effective Diameter |
|---|---|---|---|---|---|
| 1 | 7000.000 | 6.00 | 1.83400 | 37.2 | 195.69 |
| 2 | 345.379 | 2.00 | | | 189.57 |
| 3 | 345.379 | 25.91 | 1.43387 | 95.1 | 190.61 |
| 4 | −527.375 | 20.74 | | | 191.16 |
| 5 | 331.921 | 18.73 | 1.43387 | 95.1 | 193.34 |
| 6 | −4082.422 | 0.25 | | | 192.86 |
| 7 | 264.903 | 19.29 | 1.43387 | 95.1 | 188.46 |
| 8 | 3887.712 | 0.25 | | | 187.25 |
| 9 | 171.964 | 16.12 | 1.43875 | 94.9 | 174.67 |
| 10 | 367.798 | (Variable) | | | 172.80 |
| 11 | 1547.347 | 2.00 | 2.00330 | 28.3 | 42.77 |
| 12 | 43.466 | 8.24 | | | 37.79 |
| 13 | −55.129 | 2.00 | 1.88300 | 40.8 | 37.77 |
| 14 | 63.246 | 9.63 | 1.92286 | 18.9 | 41.36 |
| 15 | −66.171 | 1.02 | | | 42.37 |
| 16 | −59.413 | 2.00 | 1.77250 | 49.6 | 42.43 |
| 17* | 2736.384 | (Variable) | | | 44.72 |
| 18 | 108.766 | 12.13 | 1.56907 | 71.3 | 81.41 |
| 19* | −3543.181 | 0.20 | | | 81.81 |
| 20 | 100.674 | 13.34 | 1.49700 | 81.5 | 83.34 |
| 21 | −613.181 | 0.20 | | | 82.78 |
| 22 | 103.700 | 2.50 | 1.84666 | 23.8 | 79.37 |
| 23 | 60.132 | 20.33 | 1.43875 | 94.9 | 74.98 |

-continued

| Unit mm | | | | | |
|---|---|---|---|---|---|
| 24 | −268.844 | 0.20 | | | 73.52 |
| 25* | 201.189 | 5.73 | 1.43875 | 94.9 | 71.02 |
| 26 | −889.802 | (Variable) | | | 69.63 |
| 27 (Stop) | ∞ | 3.42 | | | 32.62 |
| 28 | −1650.792 | 1.40 | 1.91082 | 35.3 | 33.54 |
| 29 | 57.062 | 1.00 | | | 32.51 |
| 30 | 33.200 | 4.67 | 1.80809 | 22.8 | 32.28 |
| 31 | 67.683 | 3.00 | | | 30.97 |
| 32 | −181.486 | 1.40 | 1.81600 | 46.6 | 30.43 |
| 33 | 131.712 | 2.50 | | | 29.88 |
| 34 | 78.186 | 4.43 | 1.49700 | 81.5 | 26.24 |
| 35 | −104.475 | 0.82 | | | 25.59 |
| 36 | −166.917 | 1.20 | 1.80518 | 25.4 | 24.99 |
| 37 | −504.812 | (Variable) | | | 24.66 |
| 38 | 109.214 | 4.83 | 1.51633 | 64.1 | 23.12 |
| 39 | −31.250 | 1.00 | 1.88300 | 40.8 | 22.35 |
| 40 | −38.884 | 0.20 | | | 22.17 |
| 41 | −82.999 | 1.00 | 1.88300 | 40.8 | 21.15 |
| 42 | 13.533 | 5.64 | 1.92286 | 18.9 | 19.39 |
| 43 | 49.831 | 3.81 | | | 18.56 |
| 44 | −23.157 | 1.00 | 2.04976 | 27.1 | 18.23 |
| 45 | 82.736 | (Variable) | | | 19.23 |
| 46* | 281.118 | 7.71 | 1.76385 | 48.5 | 33.89 |
| 47 | −33.153 | 2.00 | | | 35.18 |
| 48 | 76.120 | 1.00 | 1.85478 | 24.8 | 36.60 |
| 49 | 31.385 | 8.18 | 1.49700 | 81.5 | 35.95 |
| 50 | −405.633 | 0.20 | | | 36.29 |
| 51 | 291.033 | 4.00 | 1.51633 | 64.1 | 36.51 |
| 52 | −78.755 | (Variable) | | | 36.62 |
| 53 | −216.793 | 6.03 | 1.53172 | 48.8 | 35.26 |
| 54 | −35.103 | 0.20 | | | 35.22 |
| 55 | −45.533 | 1.00 | 1.88300 | 40.8 | 33.90 |
| 56 | −69.742 | 10.00 | | | 33.94 |
| 57 | ∞ | 33.00 | 1.60859 | 46.4 | 60.00 |
| 58 | ∞ | 13.20 | 1.51633 | 64.2 | 60.00 |
| 59 | ∞ | 12.00 | | | 60.00 |
| Image Plane | ∞ | | | | |

Aspherical Data

Seventeenth Surface

| K = −2.53234e+004 | A4 = −4.13015e−007 | A6 = −2.14627e−010 |
|---|---|---|
| A8 = 2.26588e−013 | | |

Nineteenth Surface

| K = 5.22565e+003 | A4 = 8.81676e−008 | A6 = 1.58180e−012 |
|---|---|---|
| A8 = 6.14872e−015 | | |

Twenty-Fifth Surface

| K = −9.48244e+000 | A4 = −7.57187e−007 | A6 = −1.54476e−010 |
|---|---|---|
| A8 = 2.42122e−014 | | |

Forty-Sixth Surface

| K = 0.00000e+000 | A4 = −2.76561e−006 | A6 = 4.54960e−008 |
|---|---|---|
| A8 = −2.93127e−011 | A10 = 5.58575e−014 | A12 = −1.11726e−016 |
| A5 = −4.65406e−007 | A7 = −1.28256e−009 | A9 = 9.09704e−013 |
| A11 = 9.64150e−016 | | |

Various Data
Zoom Ratio 100.00

| Focal Length | 9.30 | 930.01 | 18.60 | 1860.01 | 26.04 | 2603.98 |
|---|---|---|---|---|---|---|
| F-Number | 1.85 | 4.90 | 3.70 | 9.80 | 5.18 | 13.72 |
| Half Angle of View | 30.60 | 0.34 | 16.47 | 0.17 | 11.93 | 0.12 |
| Image Height | 5.50 | 5.50 | 5.50 | 5.50 | 5.50 | 5.50 |
| Full Length of Lens | 629.00 | 629.00 | 629.01 | 629.01 | 629.00 | 629.00 |
| BF | 12.00 | 12.00 | 12.00 | 12.00 | 12.00 | 12.00 |
| d10 | 3.07 | 176.64 | 3.07 | 176.64 | 3.07 | 176.64 |
| d17 | 266.10 | 1.96 | 266.10 | 1.96 | 266.10 | 1.96 |
| d26 | 3.00 | 93.57 | 3.00 | 93.57 | 3.00 | 93.57 |
| d37 | 2.78 | 2.78 | 18.68 | 18.68 | 21.67 | 21.67 |
| d45 | 15.77 | 15.77 | 8.02 | 8.02 | 1.49 | 1.49 |
| d52 | 9.63 | 9.63 | 1.49 | 1.49 | 5.01 | 5.01 |
| Entrance Pupil Position | 124.58 | 11114.47 | 124.58 | 11114.47 | 124.58 | 11114.47 |
| Exit Pupil Position | 79.76 | 79.76 | 755.68 | 755.68 | −188.14 | −188.14 |

-continued

| Unit mm | | | | | | |
|---|---|---|---|---|---|---|
| Front Principal Point Position | 135.15 | 24808.70 | 143.64 | 17626.51 | 147.23 | −20160.86 |
| Rear Principal Point Position | 2.70 | −918.01 | −6.60 | −1848.00 | −14.04 | −2591.98 |

| Zoom Lens Unit Data | | | | | |
|---|---|---|---|---|---|
| Unit | Start Surface | Focal Length | Lens Configuration Length | Front Principal Point Position | Rear Principal Point Position |
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | −161.97 | 23.85 | 5.78 | −12.86 |
| 5 | 38 | −14.70 | 17.48 | 11.80 | −0.31 |
| 6 | 46 | 30.76 | 23.09 | 6.81 | −9.26 |
| 7 | 53 | 163.12 | 7.23 | 6.33 | 1.74 |
| 8 | 57 | ∞ | 46.20 | 14.58 | −14.58 |

Sixth Numerical Embodiment

| Unit mm | | | | | |
|---|---|---|---|---|---|
| Surface Data | | | | | |
| i | ri | di | ndi | vdi | Effective Diameter |
| 1 | 7000.000 | 6.00 | 1.83400 | 37.2 | 195.69 |
| 2 | 345.379 | 2.00 | | | 189.57 |
| 3 | 345.379 | 25.91 | 1.43387 | 95.1 | 190.61 |
| 4 | −527.375 | 20.74 | | | 191.16 |
| 5 | 331.921 | 18.73 | 1.43387 | 95.1 | 193.34 |
| 6 | −4082.422 | 0.25 | | | 192.86 |
| 7 | 264.903 | 19.29 | 1.43387 | 95.1 | 188.46 |
| 8 | 3887.712 | 0.25 | | | 187.25 |
| 9 | 171.964 | 16.12 | 1.43875 | 94.9 | 174.67 |
| 10 | 367.798 | (Variable) | | | 172.80 |
| 11 | 1547.347 | 2.00 | 2.00330 | 28.3 | 42.77 |
| 12 | 43.466 | 8.24 | | | 37.79 |
| 13 | −55.129 | 2.00 | 1.88300 | 40.8 | 37.77 |
| 14 | 63.246 | 9.63 | 1.92286 | 18.9 | 41.36 |
| 15 | −66.171 | 1.02 | | | 42.37 |
| 16 | −59.413 | 2.00 | 1.77250 | 49.6 | 42.43 |
| 17* | 2736.384 | (Variable) | | | 44.72 |
| 18 | 108.766 | 12.13 | 1.56907 | 71.3 | 81.41 |
| 19* | −3543.181 | 0.20 | | | 81.81 |
| 20 | 100.674 | 13.34 | 1.49700 | 81.5 | 83.34 |
| 21 | −613.181 | 0.20 | | | 82.78 |
| 22 | 103.700 | 2.50 | 1.84666 | 23.8 | 79.37 |
| 23 | 60.132 | 20.33 | 1.43875 | 94.9 | 74.98 |
| 24 | −268.844 | 0.20 | | | 73.52 |
| 25* | 201.189 | 5.73 | 1.43875 | 94.9 | 71.02 |
| 26 | −889.802 | (Variable) | | | 69.63 |
| 27 (Stop) | ∞ | 4.78 | | | 32.62 |
| 28 | −575.099 | 1.40 | 1.91082 | 35.3 | 32.78 |
| 29 | 58.997 | 1.00 | | | 31.81 |
| 30 | 34.806 | 3.59 | 1.80809 | 22.8 | 31.61 |
| 31 | 62.262 | 3.00 | | | 30.69 |
| 32 | −397.914 | 1.40 | 1.75500 | 52.3 | 30.16 |
| 33 | 527.379 | (Variable) | | | 26.78 |
| 34 | 13421.777 | 3.71 | 1.51742 | 52.4 | 25.14 |
| 35 | −47.212 | 1.00 | 1.88300 | 40.8 | 24.68 |
| 36 | −63.046 | 0.20 | | | 24.58 |
| 37 | −232.168 | 1.00 | 1.88300 | 40.8 | 24.02 |
| 38 | 19.758 | 5.39 | 1.92286 | 18.9 | 22.96 |
| 39 | 83.875 | 3.31 | | | 22.36 |
| 40 | −40.783 | 1.00 | 2.04976 | 27.1 | 22.14 |
| 41 | 96.509 | (Variable) | | | 22.74 |
| 42* | 71.843 | 6.54 | 1.65160 | 58.5 | 33.36 |
| 43 | −64.417 | 7.17 | | | 33.96 |
| 44 | −344.118 | 1.00 | 1.88300 | 40.8 | 34.31 |
| 45 | 59.510 | 7.81 | 1.49700 | 81.5 | 34.58 |

-continued

| \multicolumn{6}{c}{Unit mm} |
|---|---|---|---|---|---|
| 46 | −50.291 | 0.20 | | | 35.10 |
| 47 | −303.561 | 4.08 | 1.51633 | 64.1 | 35.12 |
| 48 | −61.151 | (Variable) | | | 35.21 |
| 49 | 85.500 | 7.26 | 1.43875 | 94.9 | 31.97 |
| 50 | −35.921 | 0.20 | | | 31.62 |
| 51 | −36.849 | 1.20 | 1.83400 | 37.2 | 31.33 |
| 52 | −56.357 | 10.00 | | | 31.49 |
| 53 | ∞ | 33.00 | 1.60859 | 46.4 | 60.00 |
| 54 | ∞ | 13.20 | 1.51633 | 64.2 | 60.00 |
| 55 | ∞ | 12.00 | | | 60.00 |
| Image Plane | ∞ | | | | |

Aspherical Data

Seventeenth Surface

| K = −2.53234e+004 | A4 = −4.13015e−007 | A6 = −2.14627e−010 |
|---|---|---|
| A8 = 2.26588e−013 | | |

Nineteenth Surface

| K = 5.22565e+003 | A4 = 8.81676e−008 | A6 = 1.58180e−012 |
|---|---|---|
| A8 = 6.14872e−015 | | |

Twenty-Fifth Surface

| K = −9.48244e+000 | A4 = −7.57187e−007 | A6 = −1.54476e−010 |
|---|---|---|
| A8 = 2.42122e−014 | | |

Forty-Second Surface

| K = 0.00000e+000 | A4 = −1.12695e−006 | A6 = 7.98419e−008 |
|---|---|---|
| A8 = −1.43675e−010 | A10 = 3.12705e−014 | A12 = −1.28269e−015 |
| A5 = −8.18010e−007 | A7 = −1.08788e−009 | A9 = 6.95331e−014 |
| A11 = 3.44801e−014 | | |

Various Data
Zoom Ratio 100.00

| | | | | | | |
|---|---|---|---|---|---|---|
| Focal Length | 9.30 | 930.00 | 13.02 | 1302.00 | 18.60 | 1860.00 |
| F-Number | 1.85 | 4.90 | 2.59 | 6.86 | 3.70 | 9.80 |
| Half Angle of View | 30.60 | 0.34 | 22.90 | 0.24 | 16.47 | 0.17 |
| Image Height | 5.50 | 5.50 | 5.50 | 5.50 | 5.50 | 5.50 |
| Full Length of Lens | 629.00 | 629.00 | 629.00 | 629.00 | 629.00 | 629.00 |
| BF | 12.00 | 12.00 | 12.00 | 12.00 | 12.00 | 12.00 |
| d10 | 3.07 | 176.64 | 3.07 | 176.64 | 3.07 | 176.64 |
| d17 | 266.10 | 1.96 | 266.10 | 1.96 | 266.10 | 1.96 |
| d26 | 3.00 | 93.57 | 3.00 | 93.57 | 3.00 | 93.57 |
| d33 | 5.00 | 5.00 | 20.66 | 20.66 | 28.78 | 28.78 |
| d41 | 14.59 | 14.59 | 9.80 | 9.80 | 1.50 | 1.50 |
| d48 | 14.00 | 14.00 | 3.12 | 3.12 | 3.30 | 3.30 |
| Entrance Pupil Position | 124.58 | 11114.47 | 124.58 | 11114.47 | 124.58 | 11114.47 |
| Exit Pupil Position | 106.07 | 106.07 | 149.03 | 149.03 | −2892.45 | −2892.45 |
| Front Principal Point Position | 134.79 | 21238.48 | 138.83 | 24787.79 | 143.06 | 11783.33 |
| Rear Principal Point Position | 2.70 | −918.00 | −1.02 | −1290.00 | −6.60 | −1848.00 |

Zoom Lens Unit Data

| Unit | Start Surface | Focal Length | Lens Configuration Length | Front Principal Point Position | Rear Principal Point Position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | −101.19 | 15.16 | 9.04 | −3.14 |
| 5 | 34 | −22.97 | 15.61 | 9.77 | −0.55 |
| 6 | 42 | 42.29 | 26.80 | 10.23 | −12.30 |
| 7 | 49 | 105.62 | 8.66 | 3.25 | −2.75 |
| 8 | 53 | ∞ | 46.20 | 14.58 | −14.58 |

Seventh Numerical Embodiment

| | | Unit mm | | | |
|---|---|---|---|---|---|
| | | Surface Data | | | |
| i | ri | di | ndi | vdi | Effective Diameter |
| 1 | 7000.000 | 6.00 | 1.83400 | 37.2 | 195.69 |
| 2 | 345.379 | 2.00 | | | 189.57 |
| 3 | 345.379 | 25.91 | 1.43387 | 95.1 | 190.61 |
| 4 | −527.375 | 20.74 | | | 191.16 |
| 5 | 331.921 | 18.73 | 1.43387 | 95.1 | 193.34 |
| 6 | −4082.422 | 0.25 | | | 192.86 |
| 7 | 264.903 | 19.29 | 1.43387 | 95.1 | 188.46 |
| 8 | 3887.712 | 0.25 | | | 187.25 |
| 9 | 171.964 | 16.12 | 1.43875 | 94.9 | 174.67 |
| 10 | 367.798 | (Variable) | | | 172.80 |
| 11 | 1547.347 | 2.00 | 2.00330 | 28.3 | 42.77 |
| 12 | 43.466 | 8.24 | | | 37.79 |
| 13 | −55.129 | 2.00 | 1.88300 | 40.8 | 37.77 |
| 14 | 63.246 | 9.63 | 1.92286 | 18.9 | 41.36 |
| 15 | −66.171 | 1.02 | | | 42.37 |
| 16 | −59.413 | 2.00 | 1.77250 | 49.6 | 42.43 |
| 17* | 2736.384 | (Variable) | | | 44.72 |
| 18 | 108.766 | 12.13 | 1.56907 | 71.3 | 81.41 |
| 19* | −3543.181 | 0.20 | | | 81.81 |
| 20 | 100.674 | 13.34 | 1.49700 | 81.5 | 83.34 |
| 21 | −613.181 | 0.20 | | | 82.78 |
| 22 | 103.700 | 2.50 | 1.84666 | 23.8 | 79.37 |
| 23 | 60.132 | 20.33 | 1.43875 | 94.9 | 74.98 |
| 24 | −268.844 | 0.20 | | | 73.52 |
| 25* | 201.189 | 5.73 | 1.43875 | 94.9 | 71.02 |
| 26 | −889.802 | (Variable) | | | 69.63 |
| 27 (Stop) | ∞ | 3.96 | | | 32.62 |
| 28 | −192.055 | 1.40 | 1.91082 | 35.3 | 33.54 |
| 29 | 62.674 | 0.30 | | | 32.67 |
| 30 | 38.939 | 3.45 | 1.80809 | 22.8 | 32.67 |
| 31 | 74.580 | (Variable) | | | 31.97 |
| 32 | 453.715 | 3.30 | 1.58144 | 40.8 | 26.72 |
| 33 | −81.444 | 0.20 | | | 26.25 |
| 34 | 272.517 | 1.00 | 1.77250 | 49.6 | 25.32 |
| 35 | 20.147 | 4.65 | 1.84666 | 23.8 | 23.66 |
| 36 | 42.365 | 5.04 | | | 22.70 |
| 37 | −36.731 | 1.00 | 1.88300 | 40.8 | 22.19 |
| 38 | 134.786 | (Variable) | | | 22.67 |
| 39* | 28.095 | 7.06 | 1.65160 | 58.5 | 31.77 |
| 40 | 84.875 | 15.00 | | | 30.94 |
| 41 | −4312.302 | 1.00 | 1.88300 | 40.8 | 29.45 |
| 42 | 28.518 | 8.23 | 1.49700 | 81.5 | 29.17 |
| 43 | −54.698 | 0.20 | | | 29.71 |
| 44 | 109.128 | 4.19 | 1.49700 | 81.5 | 30.52 |
| 45 | −107.513 | 0.20 | | | 30.73 |
| 46 | 39.940 | 5.01 | 1.48749 | 70.2 | 30.80 |
| 47 | 1540.146 | (Variable) | | | 30.28 |
| 48 | ∞ | 33.00 | 1.60859 | 46.4 | 60.00 |
| 49 | ∞ | 13.20 | 1.51633 | 64.2 | 60.00 |
| 50 | ∞ | 12.00 | | | 60.00 |
| Image Plane | ∞ | | | | |

Aspherical Data

Seventeenth Surface $K = -2.53234e+004$   $A4 = -4.13015e-007$   $A6 = -2.14627e-010$
$A8 = 2.26588e-013$ Nineteenth Surface $K = 5.22565e+003$   $A4 = 8.81676e-008$   $A6 = 1.58180e-012$
$A8 = 6.14872e-015$ Twenty-Fifth Surface $K = -9.48244e+000$   $A4 = -7.57187e-007$   $A6 = -1.54476e-010$
$A8 = 2.42122e-014$ -continued

| Unit mm | | |
|---|---|---|
| Thirty-Ninth Surface | | |
| K = 0.00000e+000 | A4 = −3.23335e−006 | A6 = −7.97706e−009 |
| A8 = −4.52384e−11 | A10 = −2.84828e−013 | A12 = −3.59470e−015 |
| A5 = −3.62512e−007 | A7 = 4.28236e−009 | A9 = −2.02499e−011 |
| A11 = 1.20128e−013 | | |

Various Data
Zoom Ratio 150.00

| Focal Length | 9.30 | 930.00 | 12.09 | 1209.00 | 13.95 | 1395.00 |
|---|---|---|---|---|---|---|
| F-Number | 1.85 | 4.90 | 2.41 | 6.37 | 2.78 | 7.35 |
| Half Angle of View | 30.60 | 0.34 | 24.46 | 0.26 | 21.52 | 0.23 |
| Image Height | 5.50 | 5.50 | 5.50 | 5.50 | 5.50 | 5.50 |
| Full Length of Lens | 618.56 | 618.56 | 618.56 | 618.56 | 618.56 | 618.56 |
| BF | 12.00 | 12.00 | 12.00 | 12.00 | 12.00 | 12.00 |
| d10 | 3.07 | 176.64 | 3.07 | 176.64 | 3.07 | 176.64 |
| d17 | 266.10 | 1.96 | 266.10 | 1.96 | 266.10 | 1.96 |
| d26 | 3.00 | 93.57 | 3.00 | 93.57 | 3.00 | 93.57 |
| d31 | 7.92 | 7.92 | 12.57 | 12.57 | 13.60 | 13.60 |
| d38 | 16.26 | 16.26 | 6.93 | 6.93 | 1.50 | 1.50 |
| d47 | 10.00 | 10.00 | 14.67 | 14.67 | 19.08 | 19.08 |
| Entrance Pupil Position | 124.58 | 11114.47 | 124.58 | 11114.47 | 124.58 | 11114.47 |
| Exit Pupil Position | 109.73 | 109.73 | 353.16 | 353.16 | −1761.93 | −1761.93 |
| Front Principal Point Position | 134.76 | 20894.11 | 137.09 | 16607.88 | 138.42 | 11412.45 |
| Rear Principal Point Position | 2.70 | −918.00 | −0.09 | −1197.00 | −1.95 | −1383.00 |

Zoom Lens Unit Data

| Unit | Start Surface | Focal Length | Lens Configuration Length | Front Principal Point Position | Rear Principal Point Position |
|---|---|---|---|---|---|
| 1 | 1 | 238.05 | 109.29 | 59.18 | −20.74 |
| 2 | 11 | −25.00 | 24.89 | 4.19 | −12.46 |
| 3 | 18 | 66.50 | 54.63 | 13.57 | −26.05 |
| 4 | 27 | −107.45 | 9.11 | 6.20 | −0.65 |
| 5 | 32 | −29.38 | 15.20 | 11.95 | 0.40 |
| 6 | 39 | 40.14 | 40.89 | 22.78 | −21.19 |
| 7 | 48 | ∞ | 46.20 | 14.58 | −14.58 |

(Image Pickup Apparatus)

TABLE 1

| Conditional Expression | Numerical Embodiment | | | | | | |
|---|---|---|---|---|---|---|---|
| | 1 | 2 | 3 | 4 | 5 | 6 | 7 |
| (1) βn1 | 1.758 | 1.540 | 2.495 | 1.089 | 1.435 | 1.828 | 1.828 |
| (2) fn2/fn | −0.696 | −0.686 | −1.122 | −0.540 | −0.482 | −0.649 | −0.817 |
| (3) n2 | 1.948 | 1.948 | 1.942 | 1.885 | 1.939 | 1.939 | 1.828 |
| (4) βn31 | 0.023 | −0.005 | −0.199 | −0.013 | 0.697 | 0.489 | — |
| fn | 37.356 | 32.746 | 19.878 | 27.562 | 30.485 | 35.406 | 35.966 |
| fn2 | −26.015 | −22.458 | −22.297 | −14.876 | −14.702 | −22.974 | −29.382 |
| βn2w | −0.707 | −0.707 | −0.707 | −0.707 | −0.520 | −0.536 | −0.753 |
| βn2t | −1.414 | −1.414 | −1.414 | −1.414 | −1.566 | −1.204 | −0.881 |

Figure 47:
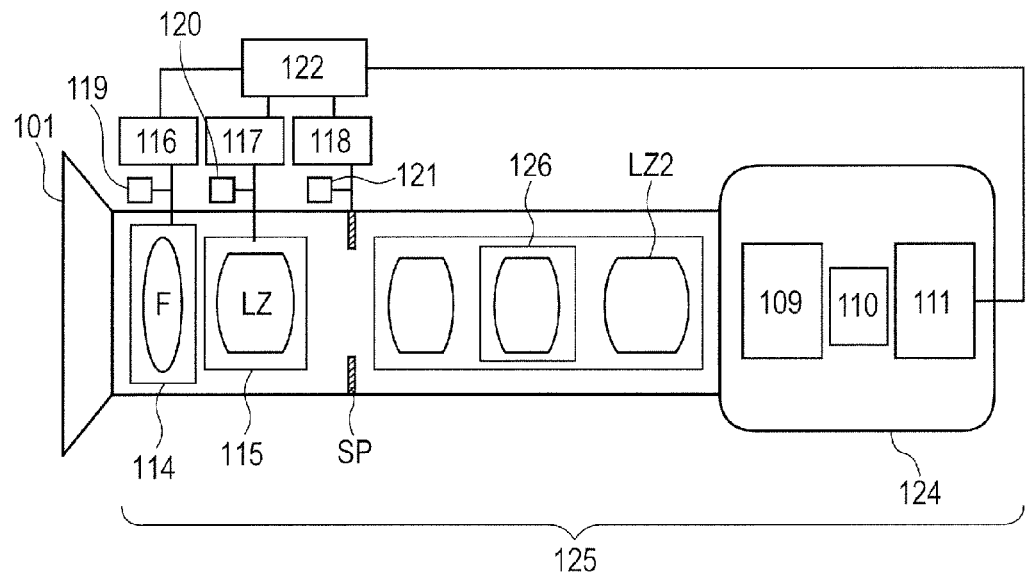
FIG. 47 is a schematic diagram of main parts of an image pickup apparatus according to the present invention.

FIG. 47 is a schematic diagram of an image pickup apparatus (TV camera system) using the zoom lenses according to the embodiments as an optical system. In FIG. 47, zoom lenses 101 are the zoom lenses according to any of the first to seventh embodiments. The apparatus includes a camera 124. The zoom lenses 101 can be attached to and detached from the camera 124. An image pickup apparatus 125 is formed by attaching the zoom lenses 101 to the camera 124. The zoom lenses 101 include: a first lens unit F; a magnification-varying unit LZ; and LZ2 of the second magnification-varying group. The first lens unit F includes a lens unit for focusing. The magnification-varying unit LZ includes: a second lens unit configured to move on the optical axis during zooming; and a third lens unit configured to move on the optical axis to correct an image plane variation associated with zooming. The apparatus 125 also includes an aperture stop SP. Drive mechanisms 114 and 115, such as helicoids and cams, are configured to drive the first unit F and the magnification-varying unit LZ in the optical axis direction, respectively. Motors (drive units) 116 to 118 are configured to electrically drive the drive mechanisms 114 and 115 and the aperture stop SP. Detectors 119 to 121, such as encoders, potentiometers and photosensors, are configured to detect the positions of the first unit F and the magnification-varying unit LZ on the optical axis and to detect the stop diameter of the aperture stop SP.

The second magnification-varying group LZ2 includes: a fourth lens unit; a fifth lens unit configured to move to displace the focal length range of the zoom lenses toward the long focal length side; and a sixth lens unit. A drive mechanism 126, such as a helicoid and a cam, is configured to drive the fifth lens unit in the optical axis direction. The camera 124 includes: a glass block 109 equivalent to an optical filter or a color separation optical system in the camera 124; and a solid-state image pickup element (photoelectric conversion element) 110, such as a CCD sensor and a CMOS sensor, configured to receive a subject image formed by the zoom lenses 101. CPUs 111 and 122 are configured to control various drives of the camera 124 and the zoom lenses 101.

In this way, the zoom lenses of the present invention are applied to a TV camera to realize an image pickup apparatus with high optical performance, having a function of displacing the focal length range toward the long focal length side and including small zoom lenses with high optical performance.

Although the exemplary embodiments of the present invention have been described, the present invention is not limited to the embodiments, and various modifications and changes can be made within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-248569, filed Dec. 9, 2014, which is hereby incorporated by reference herein in its entirety.

What is claimed is:

1. A zoom lens comprising, from an object side to an image side, a first magnification-varying group, an aperture stop and a second magnification-varying group,
   the first magnification-varying group comprising, from the object side to the image side: a first lens unit having a positive refractive power configured not to move for zooming; a second lens unit having a negative refractive power configured to move during zooming; and one or more magnification-varying lens units configured to move during zooming, the one or more magnification-varying lens units having a positive combined refractive power,
   the second magnification-varying group comprising, from the object side to the image side: a first sub lens unit having a negative refractive power configured not to move for zooming; a second sub lens unit having a negative refractive power configured to move during zooming; and a third sub lens unit having a positive refractive power, the second magnification-varying group moving the second sub lens unit from the object side to the image side to displace a focal length range of the zoom lenses toward a long focal length side.

2. The zoom lens according to claim 1, wherein the third sub lens unit is configured not to move for zooming.

3. The zoom lens according to claim 1, wherein the third sub lens unit or a part of the third sub lens unit moves when the second sub lens unit moves during zooming.

4. The zoom lens according to claim 1, wherein $$1.0 < \beta n1 < 3.0$$

is satisfied, where $\beta n1$ is a lateral magnification of the first sub lens unit when an axial ray enters from infinity while focusing on the infinity.

5. The zoom lens according to claim 1, wherein $$-1.5 < fn2/fn < -0.3$$

is satisfied, where fn is a focal length of the second magnification-varying group when the second sub lens unit is arranged closest to an object, and fn2 is a focal length of the second sub lens unit.

6. The zoom lens according to claim 1, wherein $$1.75 < n2$$

is satisfied, where n2 is an average value of refractive indexes of concave lenses included in the second sub lens unit.

7. The zoom lens according to claim 1, wherein
   the third sub lens unit comprises a N31 sub lens unit configured to move in an optical axis direction for macro image taking or flange back adjustment, and $$-0.30 < \beta n31 < 0.75$$

is satisfied, where $\beta n31$ is a lateral magnification of the N31 sub lens unit when a ray enters from the infinity.

8. The zoom lens according to claim 1, wherein
   one of the first sub lens unit and the part of the first sub lens unit is configured to move in a direction having a component perpendicular to an optical axis to correct a blur of a photographic image when the zoom lenses are vibrated.

9. An image pickup apparatus comprising:
   a zoom lens comprising, from an object side to an image side, a first magnification-varying group, an aperture stop and a second magnification-varying group,
   the first magnification-varying group comprising, from the object side to the image side: a first lens unit having a positive refractive power configured not to move for zooming; a second lens unit having a negative refractive power configured to move during zooming; and one or more magnification-varying lens units configured to move during zooming, the one or more magnification-varying lens units having a positive combined refractive power,
   the second magnification-varying group comprising, from the object side to the image side: a first sub lens unit having a negative refractive power configured not to move for zooming; a second sub lens unit having a negative refractive power configured to move during zooming; and a third sub lens unit having a positive refractive power, the second magnification-varying group moving the second sub lens unit from the object side to the image side to displace a focal length range of the zoom lenses toward a long focal length side; and
   a solid-state image pickup element configured to receive an image formed by the zoom lenses.

* * * * *